US008688796B1

(12) United States Patent
Lavian et al.

(10) Patent No.: US 8,688,796 B1
(45) Date of Patent: Apr. 1, 2014

(54) RATING SYSTEM FOR DETERMINING WHETHER TO ACCEPT OR REJECT OBJECTION RAISED BY USER IN SOCIAL NETWORK

(76) Inventors: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 185 days.

(21) Appl. No.: 13/412,647

(22) Filed: Mar. 6, 2012

Related U.S. Application Data

(63) Continuation-in-part of application No. 13/412,619, filed on Mar. 6, 2012.

(51) Int. Cl.
*G06F 15/16* (2006.01)
(52) U.S. Cl.
USPC ........ 709/207; 709/206; 705/7.32; 705/14.44
(58) Field of Classification Search
USPC ................. 709/207, 206, 204, 203; 705/7.32, 705/14.44, 14.46, 7.29, 14.49, 14, 10; 434/362; 707/732, 741; 706/54
See application file for complete search history.

(56) References Cited

U.S. PATENT DOCUMENTS

| | | | |
|---|---|---|---|
| 7,069,308 B2 | 6/2006 | Abrams | |
| 8,010,459 B2 | 8/2011 | Buyukkokten et al. | |
| 8,019,875 B1 | 9/2011 | Nielsen | |
| 8,037,093 B2 | 10/2011 | Tiu, Jr. et al. | |
| 8,055,664 B2 | 11/2011 | Baluja et al. | |
| 8,090,666 B2 | 1/2012 | Sarbaev et al. | |
| 8,150,844 B2 | 4/2012 | Redstone et al. | |
| 8,156,064 B2 | 4/2012 | Brown | |
| 8,190,681 B2 | 5/2012 | Markus et al. | |
| 2002/0116466 A1 | 8/2002 | Trevithick et al. | |
| 2004/0088325 A1 | 5/2004 | Elder et al. | |
| 2004/0122803 A1 | 6/2004 | Dom et al. | |
| 2004/0267604 A1* | 12/2004 | Gross | 705/10 |
| 2006/0021009 A1 | 1/2006 | Lunt | |

(Continued)

FOREIGN PATENT DOCUMENTS

| | | |
|---|---|---|
| CA | 2685758 A1 | 5/2011 |
| EP | 1782604 B1 | 5/2011 |

(Continued)

OTHER PUBLICATIONS

Alan E. Mislove, "Online Social Networks: Measurement, Analysis, and Applications to Distributed Information Systems," Rice University, A thesis submitted in partial fulfillment of the requirements for the degree, Doctor of Philosophy, Apr. 2009, Houston, Texas.

(Continued)

*Primary Examiner* — Le H Luu

(57) ABSTRACT

Embodiments of the invention provide means to the users of the system to provide ratings and corresponding feedback for enhancing the genuineness in the ratings. The system includes a memory coupled to a processor. The memory includes one or more instructions executable by the processor to enable the users of the system to rate each other based on at least one of sharing, exchanging, and selling one of activity, service or product. The system may provide a mechanism to encourage genuineness in ratings provided by the users. Furthermore, the instructions facilitate the rating receivers to provide feedbacks corresponding to the received ratings. The feedback includes accepting or objecting to a particular rating. Moreover, the memory includes instructions executable by the processor to enable the system to determine genuineness of an objection raised by a rating receiver.

20 Claims, 34 Drawing Sheets

(56) References Cited

U.S. PATENT DOCUMENTS

| | | |
|---|---|---|
| 2006/0247940 A1 | 11/2006 | Zhu et al. |
| 2007/0250483 A1 | 10/2007 | Blue et al. |
| 2007/0288312 A1* | 12/2007 | Wang .............................. 705/14 |
| 2007/0288464 A1 | 12/2007 | Silver |
| 2008/0091834 A1 | 4/2008 | Norton |
| 2008/0120411 A1 | 5/2008 | Eberle |
| 2008/0214149 A1 | 9/2008 | Ramer et al. |
| 2008/0214162 A1 | 9/2008 | Ramer et al. |
| 2008/0215428 A1 | 9/2008 | Ramer et al. |
| 2008/0215429 A1 | 9/2008 | Ramer et al. |
| 2008/0270220 A1 | 10/2008 | Ramer et al. |
| 2008/0301112 A1 | 12/2008 | Wu |
| 2009/0037527 A1* | 2/2009 | Hodges et al. ................ 709/203 |
| 2009/0077062 A1 | 3/2009 | Spivack et al. |
| 2009/0077124 A1 | 3/2009 | Spivack et al. |
| 2009/0150166 A1 | 6/2009 | Leite et al. |
| 2009/0171686 A1 | 7/2009 | Eberstadt |
| 2009/0217196 A1 | 8/2009 | Neff et al. |
| 2009/0222329 A1 | 9/2009 | Ramer et al. |
| 2009/0234711 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0299824 A1 | 12/2009 | Barnes, Jr. |
| 2009/0319288 A1 | 12/2009 | Slaney et al. |
| 2010/0063877 A1 | 3/2010 | Soroca et al. |
| 2010/0076994 A1 | 3/2010 | Soroca et al. |
| 2010/0094878 A1 | 4/2010 | Soroca et al. |
| 2010/0153832 A1 | 6/2010 | Markus et al. |
| 2010/0180032 A1 | 7/2010 | Lunt |
| 2010/0198773 A1* | 8/2010 | Wallisch ......................... 706/54 |
| 2010/0198834 A1* | 8/2010 | Petras et al. .................. 707/741 |
| 2010/0235776 A1 | 9/2010 | Brown |
| 2010/0292000 A1 | 11/2010 | Hornik et al. |
| 2011/0022506 A1 | 1/2011 | Luo et al. |
| 2011/0066507 A1 | 3/2011 | Iyer et al. |
| 2011/0066605 A1 | 3/2011 | Elbaz |
| 2011/0112957 A1 | 5/2011 | Ingram et al. |
| 2011/0125783 A1 | 5/2011 | Whale et al. |
| 2011/0196927 A1 | 8/2011 | Vance |
| 2011/0202406 A1 | 8/2011 | Suomela |
| 2011/0208822 A1* | 8/2011 | Rathod .......................... 709/206 |
| 2011/0218854 A1* | 9/2011 | Shamlian ................... 705/14.49 |
| 2011/0258049 A1 | 10/2011 | Ramer et al. |
| 2011/0270774 A1 | 11/2011 | Varshavsky et al. |
| 2011/0313853 A1 | 12/2011 | Ramer et al. |
| 2012/0010980 A1 | 1/2012 | Ramer et al. |
| 2012/0010981 A1 | 1/2012 | Ramer et al. |
| 2012/0010982 A1 | 1/2012 | Ramer et al. |
| 2012/0010983 A1 | 1/2012 | Ramer et al. |
| 2012/0010984 A1 | 1/2012 | Ramer et al. |
| 2012/0010985 A1 | 1/2012 | Ramer et al. |
| 2012/0010986 A1 | 1/2012 | Ramer et al. |
| 2012/0010987 A1 | 1/2012 | Ramer et al. |
| 2012/0010988 A1 | 1/2012 | Ramer et al. |
| 2012/0010989 A1 | 1/2012 | Ramer et al. |
| 2012/0010990 A1 | 1/2012 | Ramer et al. |
| 2012/0010991 A1 | 1/2012 | Ramer et al. |
| 2012/0016739 A1 | 1/2012 | Ramer et al. |
| 2012/0016740 A1 | 1/2012 | Ramer et al. |
| 2012/0016750 A1 | 1/2012 | Ramer et al. |
| 2012/0016751 A1 | 1/2012 | Ramer et al. |
| 2012/0036127 A1* | 2/2012 | Work et al. .................... 707/732 |
| 2012/0047147 A1 | 2/2012 | Redstone et al. |
| 2012/0117351 A1 | 5/2012 | Motwani et al. |
| 2012/0150629 A1* | 6/2012 | Ramer et al. ............... 705/14.46 |
| 2012/0156668 A1* | 6/2012 | Zelin .............................. 434/362 |
| 2012/0173358 A1 | 7/2012 | Soroca et al. |
| 2012/0173359 A1 | 7/2012 | Soroca et al. |
| 2012/0173360 A1 | 7/2012 | Soroca et al. |
| 2012/0173361 A1 | 7/2012 | Soroca et al. |
| 2012/0173362 A1 | 7/2012 | Soroca et al. |
| 2012/0173363 A1 | 7/2012 | Soroca et al. |
| 2012/0173364 A1 | 7/2012 | Soroca et al. |
| 2012/0173365 A1 | 7/2012 | Soroca et al. |
| 2012/0173366 A1 | 7/2012 | Soroca et al. |
| 2012/0173367 A1 | 7/2012 | Soroca et al. |
| 2012/0173368 A1 | 7/2012 | Soroca et al. |
| 2012/0173369 A1 | 7/2012 | Soroca et al. |
| 2012/0173370 A1 | 7/2012 | Soroca et al. |
| 2012/0173371 A1 | 7/2012 | Soroca et al. |
| 2012/0173372 A1 | 7/2012 | Soroca et al. |
| 2012/0173373 A1 | 7/2012 | Soroca et al. |
| 2012/0173374 A1 | 7/2012 | Soroca et al. |
| 2012/0173375 A1 | 7/2012 | Soroca et al. |
| 2012/0173376 A1 | 7/2012 | Soroca et al. |
| 2012/0173377 A1 | 7/2012 | Soroca et al. |
| 2012/0173378 A1 | 7/2012 | Soroca et al. |
| 2012/0173379 A1 | 7/2012 | Soroca et al. |
| 2012/0173628 A1* | 7/2012 | Briere et al. .................. 709/204 |
| 2012/0173655 A1 | 7/2012 | McEntee |
| 2012/0179562 A1 | 7/2012 | Soroca et al. |
| 2012/0179563 A1 | 7/2012 | Soroca et al. |
| 2012/0179564 A1 | 7/2012 | Soroca et al. |
| 2012/0179565 A1 | 7/2012 | Soroca et al. |
| 2012/0179566 A1 | 7/2012 | Soroca et al. |
| 2012/0179567 A1 | 7/2012 | Soroca et al. |
| 2012/0179568 A1 | 7/2012 | Soroca et al. |
| 2012/0185349 A1 | 7/2012 | Soroca et al. |
| 2012/0197724 A1 | 8/2012 | Kendall |
| 2012/0209705 A1 | 8/2012 | Ramer et al. |
| 2012/0209706 A1 | 8/2012 | Ramer et al. |
| 2012/0209707 A1 | 8/2012 | Ramer et al. |
| 2012/0209708 A1 | 8/2012 | Ramer et al. |
| 2012/0209709 A1 | 8/2012 | Ramer et al. |
| 2012/0209710 A1 | 8/2012 | Ramer et al. |
| 2012/0209912 A1 | 8/2012 | Brown |
| 2012/0215602 A1 | 8/2012 | Ramer et al. |
| 2012/0215612 A1 | 8/2012 | Ramer et al. |
| 2012/0215622 A1 | 8/2012 | Ramer et al. |
| 2012/0215623 A1 | 8/2012 | Ramer et al. |
| 2012/0215624 A1 | 8/2012 | Ramer et al. |
| 2012/0215625 A1 | 8/2012 | Ramer et al. |
| 2012/0215626 A1 | 8/2012 | Ramer et al. |
| 2012/0215635 A1 | 8/2012 | Ramer et al. |
| 2012/0215639 A1 | 8/2012 | Ramer et al. |
| 2012/0215640 A1 | 8/2012 | Ramer et al. |
| 2012/0216035 A1 | 8/2012 | Leggette et al. |
| 2012/0221357 A1 | 8/2012 | Krause et al. |
| 2012/0278127 A1* | 11/2012 | Kirakosyan et al. ......... 705/7.29 |
| 2012/0296965 A1* | 11/2012 | Srivastava .................... 709/204 |

FOREIGN PATENT DOCUMENTS

| | | |
|---|---|---|
| EP | 2296342 B1 | 6/2012 |
| WO | 2011068974 A1 | 6/2011 |
| WO | 2011094734 A2 | 8/2011 |
| WO | 2012017384 A1 | 2/2012 |
| WO | 2012024156 A2 | 2/2012 |
| WO | 2012024157 A2 | 2/2012 |
| WO | 2012047669 A2 | 4/2012 |
| WO | 2012064663 A1 | 5/2012 |
| WO | 2012097171 A2 | 7/2012 |
| WO | 2012106450 A2 | 8/2012 |
| WO | 2012112921 A2 | 8/2012 |

OTHER PUBLICATIONS

Alex Tsow et al. "Net Trust: A Privacy-Aware Architecture for Sharing Web Histories," Technical Report TR651, 11 pages, Aug. 2007.

Flanigan, A., & Metzger, M., "Perceptions of Internet information credibility," Journalism & Mass Communication Quarterly, 77(3), 515-540, 2000.

Bernhard Debatin et al., "Facebook and Online Privacy: Attitudes, Behaviors, and Unintended Consequences," Journal of Computer-Mediated Communication, vol. 15, Nr. 1 (2009), p. 83-108.

Bimal Viswanath et al. "Keeping Information Safe from Social Networking Apps," WOSN '12 Proceedings of the 2012 ACM workshop on Workshop on online social networks, pp. 49-54, ACM, New York, USA, Aug. 2012.

James Caverlee et al., "SocialTrust: Tamper-Resilient Trust Establishment in Online Communities," In JCDL '08: Proceedings of the 8th ACM/IEEE-CS joint conference on Digital libraries (2008), pp. 104-114.

(56) References Cited

OTHER PUBLICATIONS

Jennifer Ann Golbeck, "Computing and applying trust in web-based social networks," PhD thesis, University of Maryland, College Park (2005).

Juan Li and Qingrui Li, "Decentralized Self-management of Trust for Mobile Ad Hoc Social Networks", International Journal of Computer Networks & Communications (IJCNC) vol. 3, No. 6, Nov. 2011.

Lada A. Adamic et al., "Rating friends without making enemies," Proceedings of the Fifth International AAAI Conference on Weblogs and Social Media (Apr. 2011), pp. 1-8, University of Michigan, Ann Arbor, MI 48109, USA.

Moo Nam Ko et al., "Social-networks connect services," IEEE Computer, vol. 43, Issue: 8 pp. 37-43, Product Type: Journals & Magazines, Aug. 2010.

Sibel Adali et al., "Measuring Behavioral Trust in Social Networks," IEEE 2010, pp. 150-152 Product Type: Conference Publications, Date of Conference: May 23-26, 2010.

Thomas Karagiannis et al., "Online social networks," IEEE network 2010, vol. 24, Issue: 5, pp. 4-5 Product Type: Journals & Magazines, Date of Publication: Sep.-Oct. 2010.

Tom Heath, "Information-seeking on the web with trusted social networks—from Theory to Systems," PhD thesis, The Open University, Milton Keynes, UK, Jan. 2008.

Yarden Katz and Jennifer Golbeck, "Social network-based trust in prioritized default logic," Proceedings of the 21st National Conference on Artificial Intelligence (AAAI), pp. 1345-1350, 2006.

* cited by examiner

| User ID 402 | Profile Information 404 | | Announcement / Request 406 | | Average Rating 408 | Over-all Profile Points 410 |
|---|---|---|---|---|---|---|
| | Personal Details 418 | Qualification and other info 420 | Activity/ service/ Product 422 | Condition 424 | | |
| User 1 412 | A | Q1 | House Keeping | 6am-7pm | 3 | 25 |
| | L1 | | | Sunday | | |
| | H1 | | | 1 person required | | |
| User 2 414 | B | Q2 | Baby Sitting | 5am-11am | 5 | 9 |
| | L2 | | | Monday | | |
| | H1 | | | 1 Female required | | |
| User 3 416 | C | Q3 | Cricket | 6pm-10pm | 1 | -10 |
| | L3 | | | 22-Feb-2012 | | |
| | H2 | | | 10 Males required | | |

Database 400

Fig-4

| User ID | Profile Information 504 | | Announcement / Acceptance 506 | | | Rating or Review | Earned Points (if 5 points for each sharing) |
|---|---|---|---|---|---|---|---|
| 502 | Personal Details 518 | Qualification and other info. 520 | Activity/ service/ Product sharing 522 | Condition 524 | status 526 | 508 | 510 |
| User 1 512 | A | Q1 | Biking Riding | 6-7am Sunday 1 person required | Completed | 5 | +5 |
| | L1 | | | | | | |
| | H1 | | | | | | |
| User 2 514 | B | Q2 | — | — | Accepted | 4 | −5 |
| | L2 | | | | | | |
| | H1 | | | | | | |
| User 3 516 | C | Q3 | Kid Care | Between 8am to 7pm | Pending | — | 0 |
| | L3 | | | | | | |
| | H2 | | | | | | |

Database 500

Fig-5

| Database 600 | | | | | | |
|---|---|---|---|---|---|---|
| User ID 602 | Profile Information 622 | | Announcement / Acceptance 606 | | | |
| | Personal Details 618 | Qualification and other info. 620 | Activity/ service/ Product sharing 622 | Condition 624 | status 626 | Activity Specific Rating (given to the second user) 608 610 | Accepter IDs |
| User 1 612 | A | Q1 | House Keeping | 6am-7pm Sunday 1 person required | Completed | 5 | User 2 |
| | L1 | | | | | | |
| | H1 | | | | | | |
| User 2 614 | B | Q2 | Baby Sitting | 5am-11am Monday 1 Female required | Accepted | — 628 | User 1 |
| | L2 | | | | | | |
| | H1 | | | | | | |
| User 3 616 | C | Q3 | Cricket | 6pm-10pm 22-Feb-2012 10 Males required | Pending | — 630 | — 632 |
| | L3 | | | | | | |
| | H2 | | | | | | |

Fig-6

User's Recommendation Database 800

| User ID 802 | Number of social activities 804 | Individual ratings 806 ||||| Number of recommendations | Recommenders 810 | Public Rating 812 |
|---|---|---|---|---|---|---|---|---|---|
| | | 5 | 4 | 3 | 2 | 1 | | | |
| 201 | 124 | 63 | 51 | 05 | 05 | 1 | 5 | 203, 207, 211, 219, 233 | 5 |
| 202 | 77 | 12 | 60 | 04 | 01 | 0 | 2 | 222, 211 | 4 |
| 203 | 28 | 09 | 09 | 09 | 01 | 0 | 1 | 221 | 5 |

Fig-8

User's Rater's Rating Database 900

| User ID 902 | No. of users rated 904 | No. of ratings accepted 906 | No. of ratings objected 908 | No. of ratings rejected 910 | Rater's Rating 912 |
|---|---|---|---|---|---|
| 201 | 124 | 100 | 84 | 24 | 4 |
| 202 | 77 | 7 | 70 | 70 | 1 |
| 203 | 71 | 51 | 44 | 20 | 3 |

Fig-9

How was the experience with the user?

1004 ◉ The user was excellent to work with, I will recommend the user to others

1006 ○ The user was good, I want to work again in future with the user

1008 ○ The user was average, I am satisfied but not happy to work with the user

1010 ○ The user was below average, I may not prefer to work with the user again

1012 ○ The user was bad to deal with, I will never work with the user again

[Confirm] 1014

Fig-10A

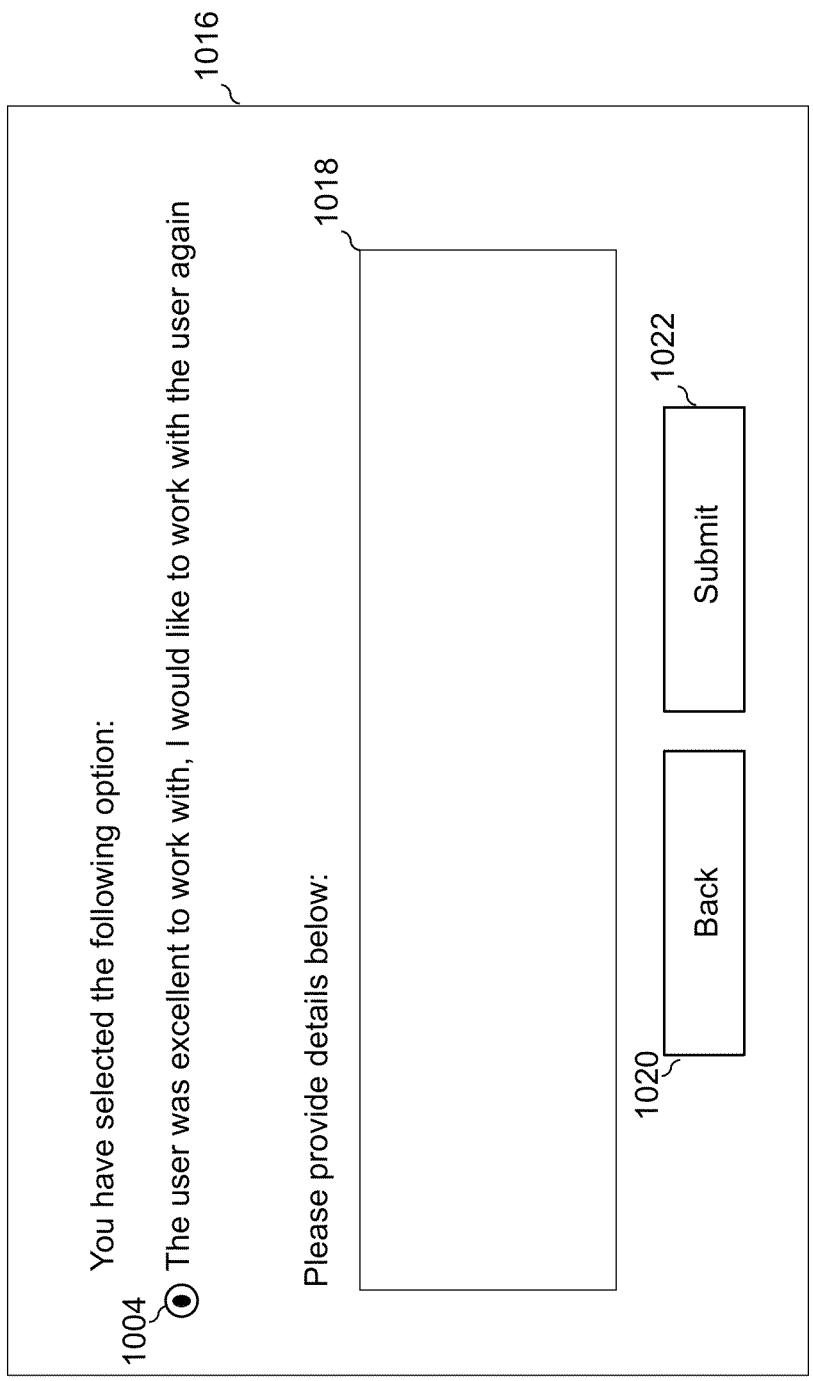

You have successfully rated the xyz user as excellent. Would you like to recommend the user xyz to other members of the system?

◉ Yes   ○ No
1026    1028

Write a testimonial below:

[text box 1030]

[Submit 1032]

How was the experience with the user?

1004 ○ The user was excellent to work with, I would like to work with the user again
1006 ○ The user was good, I may work with the user again
1008 ○ The user was average, I am satisfied but not happy
1010 ○ The user was below average, I may not work with the user again
1012 ● The user was bad to deal with, I will never work with the user again

[Confirm] ~1104

You have objected on ratings given by user ABC. Please select a reason:

1208

◉ I deserve a better rating because my performance was good  
1210

○ I deserve a better rating because my behavior was good  
1212

○ The rating is incorrect because of a miscommunication/misunderstanding  
1214

○ The rating is incorrect because the rater is not genuine  
1216

Please provide details below:

1218

[ Submit ] 1220

Fig-12B

Objection Rejected

Your objection on the rating provided by the user abc has been analyzed and rejected. Rating provided by the user abc will be considered as genuine and will be considered in overall public rating.

To object further, Please select the following option

◉ I want to contact rating agencies

[Submit]

RATING SYSTEM FOR DETERMINING WHETHER TO ACCEPT OR REJECT OBJECTION RAISED BY USER IN SOCIAL NETWORK

CROSS REFERENCE TO RELATED APPLICATIONS

This application is a Continuation-In-Part (CIP) of U.S. Non-Provisional application Ser. No. 13/412,619 entitled 'Systems and methods to support sharing and exchanging in a network' filed on Mar. 6, 2012.

FIELD OF THE INVENTION

The invention relates to social networking applications and more specifically the invention relates to enhancing reliability of ratings provided to users in a social network.

BACKGROUND OF THE INVENTION

In current scenario of global inflation, resource management is increasingly required to cut the cost and to overcome many other problems. For example, the prevalent use of single occupancy vehicles is known to be a significant cause of several major economic, social and environmental problems. The problems embrace increasing cost due to usage of energy resource for each vehicle, higher parking-space issues, traffic congestion, increased level of air pollution and the like. Further, an alternative to the usage of single occupancy vehicles is the use of multi-occupancy vehicles, where multiple individuals can share a single vehicle.

For sharing a resource such as a vehicle, an individual needs to search for people who are willing to join for sharing a vehicle for riding together to a particular location. This requires spending time in searching reliable people to share the ride. Further, in existing systems, a user can post a query for vehicle sharing. Corresponding to the post, other users of the system those are interested in sharing the vehicle for the ride (hereinafter may be referred to as "interested users") can reply to that query regarding their interests in sharing the vehicle. However, in these systems, the interested users may be completely unknown to the user who posts the query. Thus, the main problem in such systems is the lack of credibility, in the interested people, which typically is the pre-requisite for many users. Further, in these systems, the user has to wait until any interested user respond corresponding to the query of the user. Furthermore, the user may need to contact the other interested users, either personally or telephonically, to discuss various parameters for sharing the vehicle. Such parameters may include, but are not restricted to, compensation/expense that may be shared between the users, timings, and various conditions corresponding to the sharing of vehicle for a ride. This wastes a significant amount of time on the user's part.

Further, in addition to vehicle sharing, there are some other resources that may not be shared, generally, with others such as house, machinery etc. Further, such non-sharable resources may be expensive to possess. An individual may think of providing or receiving such resource in exchange of any other resource or any service. However, exchanging such expensive resources, with any other resource or service offered by any other person, require a high level of credibility in the offer of the other person and vice versa. Further, if an individual decides to exchange a resource with a service offered by the other person then the individual may be required to keep an eye on the activities performed (corresponding to the service) by the other person. This wastes a significant time of the individual to track the service provided by the other person. For example, a user may think of reducing a cost by borrowing a machinery from any other person (possessing the machinery) in exchange of providing some service to the other person such as pets' keeping in the absence of the other person. Here, the other person has to have trust on the individual so as to allow the individual to handle the pets in the absence of the other person. Thus, credibility of any unknown users for exchanging the product/service remains always under stake.

In addition to resource sharing and exchanging, many individuals like to look for people for some collective activities, such as recreational activities. For any recreational activity, such as playing, riding etc., an individual usually searches for like-minded people. For example, an individual may be willing to go out to dine with someone or may be willing to play chess with someone who is good at (or interested in) playing chess. For this, the individual may be required to spend a considerable amount of time to search any person around who is like-minded and also credible to go along with for any such collective activity. In such cases, credibility of any unknown person is always a question for the individual.

Based on the aforementioned, there is a need of a system and a corresponding method to support resource sharing with credible users and without requiring much time consumption at a user's end. Further, the system should provide support for combined or exchangeable activities with credible and suitable users based on the interest of a user. Furthermore, the system should support a user for sharing and/or exchanging services or products. Thus, the system is required for providing support to a user in sharing/exchanging resources/services and to overcome the shortcoming of the related arts.

SUMMARY

Embodiments of the present invention provide a system for enhancing reliability of ratings provided to users in a social network. The system includes a processor and a memory coupled to the processor. The memory includes a database and instructions executable by the processor. The database includes profile information (corresponding to each user) that may include information corresponding to one or more types of ratings received by each user based on at least one of sharing, exchanging, and selling at least one of activity, service or product. Furthermore, the instructions enable the second user to raise an objection on the rating provided by the first user. Also, the objection raised by the second user may be accepted or rejected by analyzing the information corresponding to at least one of the one or more types of ratings corresponding to the first user and the second user. Additionally, at least one of the types of ratings, corresponding to the users, may be updated based on acceptance or rejection of the objection raised by the second user.

Further, embodiments of the present invention provide a system for enhancing reliability of ratings provided to users in a social network. The system includes a processor and a memory. The memory includes a database and instructions executable by the processor. The database may comprise profile information corresponding to each user that includes information corresponding to one or more types of ratings received by each user based on at least one of sharing, exchanging, and selling at least one of activity, service or product with one or more other users. Further, the instructions analyse the rating, provided by the first user, with respect to a pre-set value of rating to determine whether the rating is above, below or equal to the pre-set value of rating. Furthermore, instructions may perform one or more tasks to enable at least one of the first user and the second user to perform one or more acts corresponding to the rating, the at least one of the first user and the second user being enabled to perform the one or more acts based on analysis of the rating. Additionally, the instructions executable by the processor may update the types of ratings, corresponding to the users, based on the one or more acts performed by at least one of the first user and the second user.

BRIEF DESCRIPTION OF THE DRAWINGS

Having thus described the invention in general terms, reference will now be made to the accompanying drawings, which are not necessarily drawn to scale, and wherein

Figure 1:
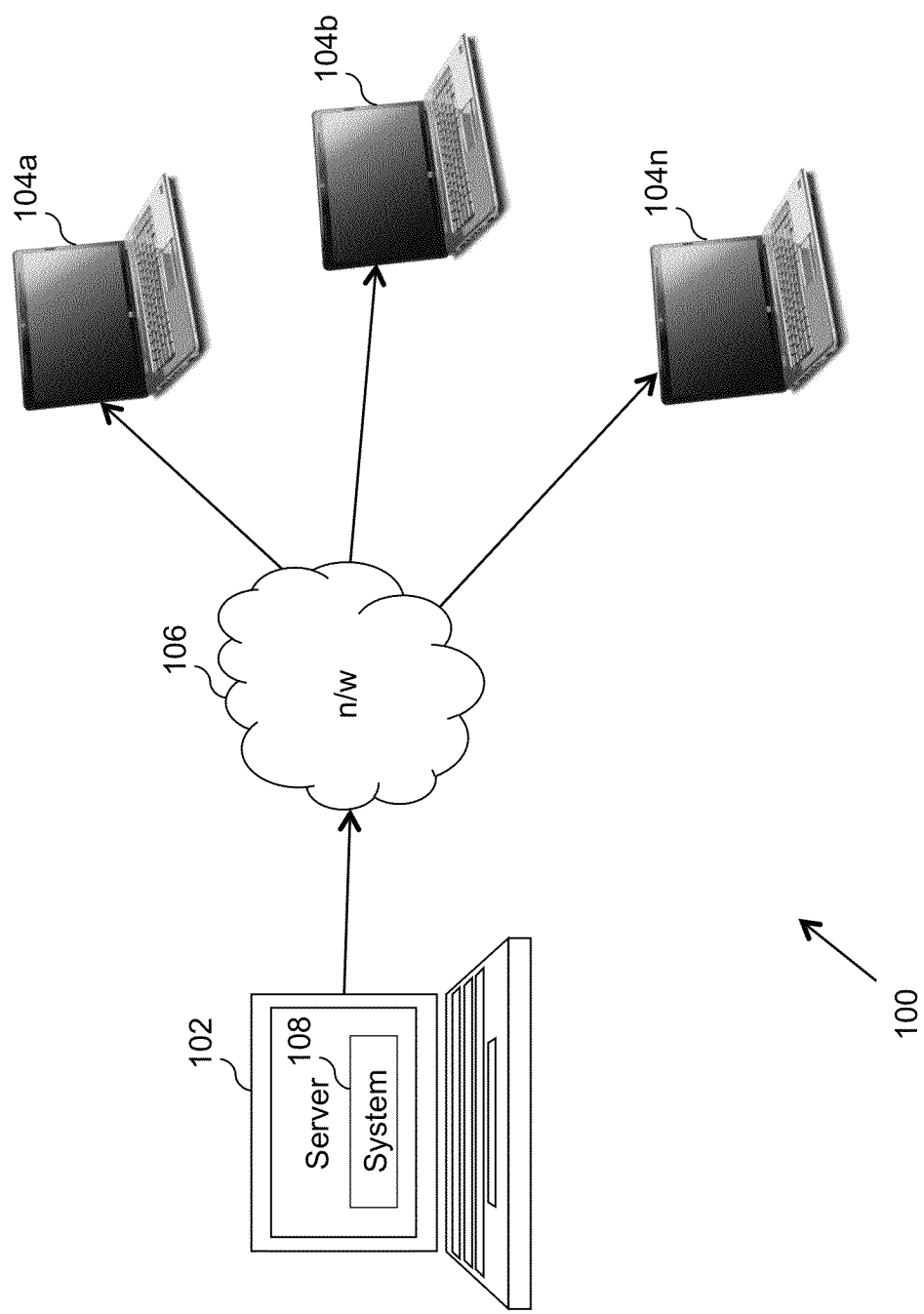
Figure 2:
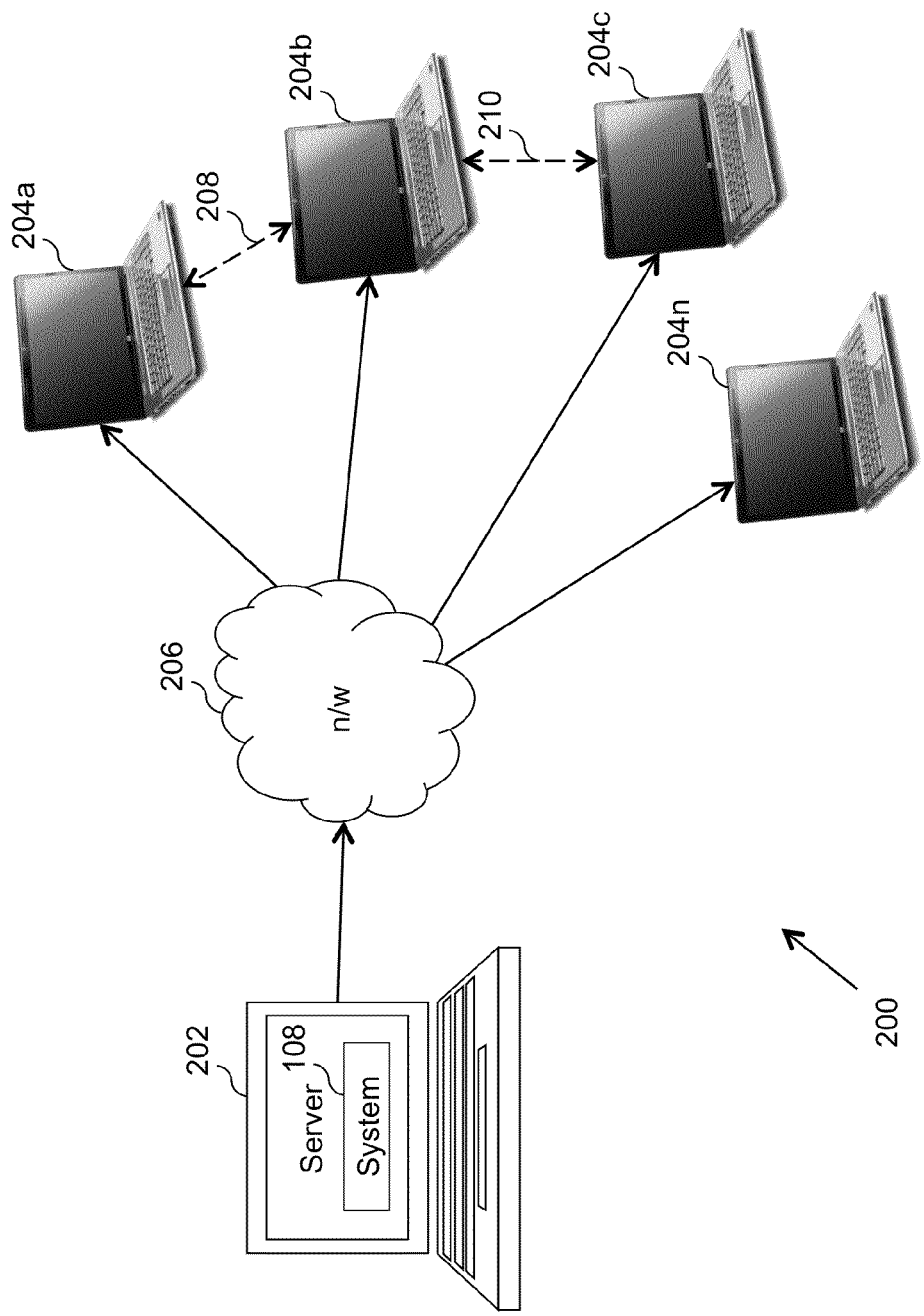
Figure 3:
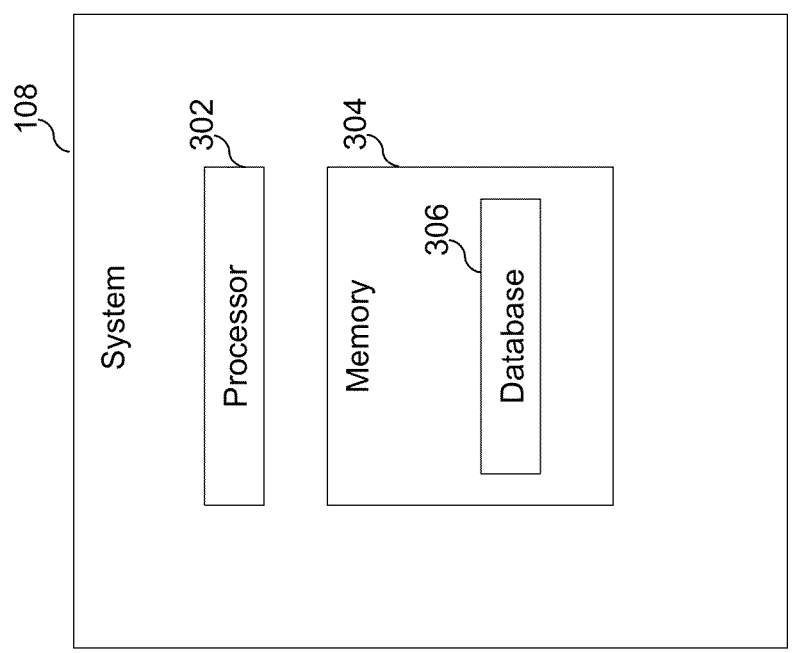
Figure 7A:
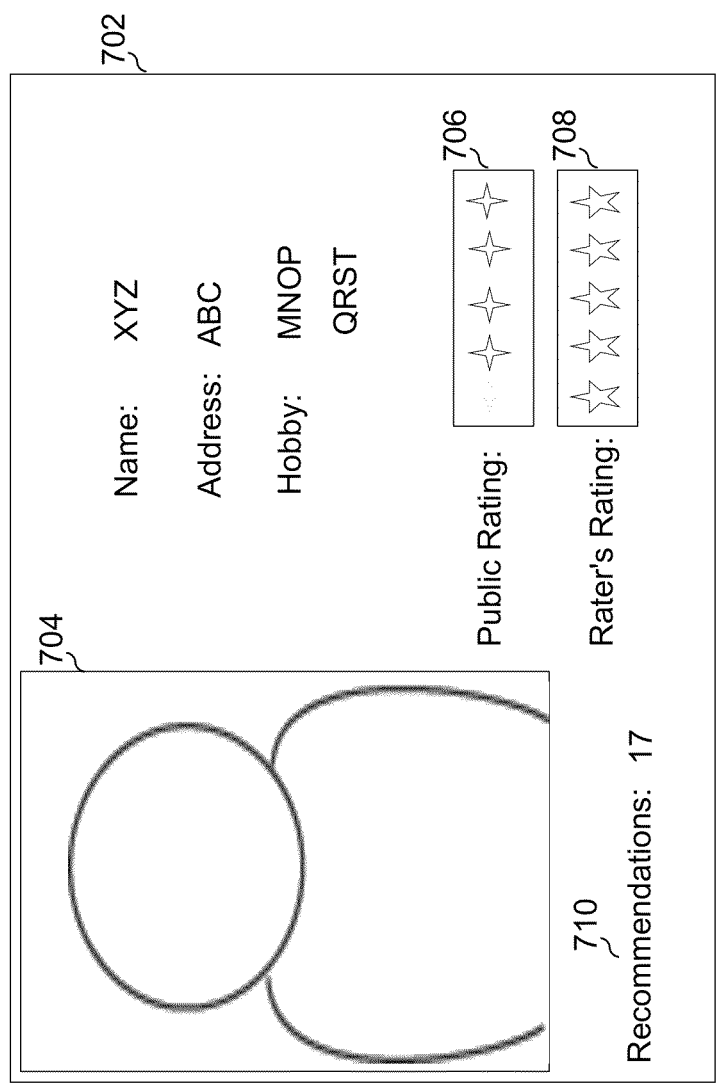
Figure 7B:
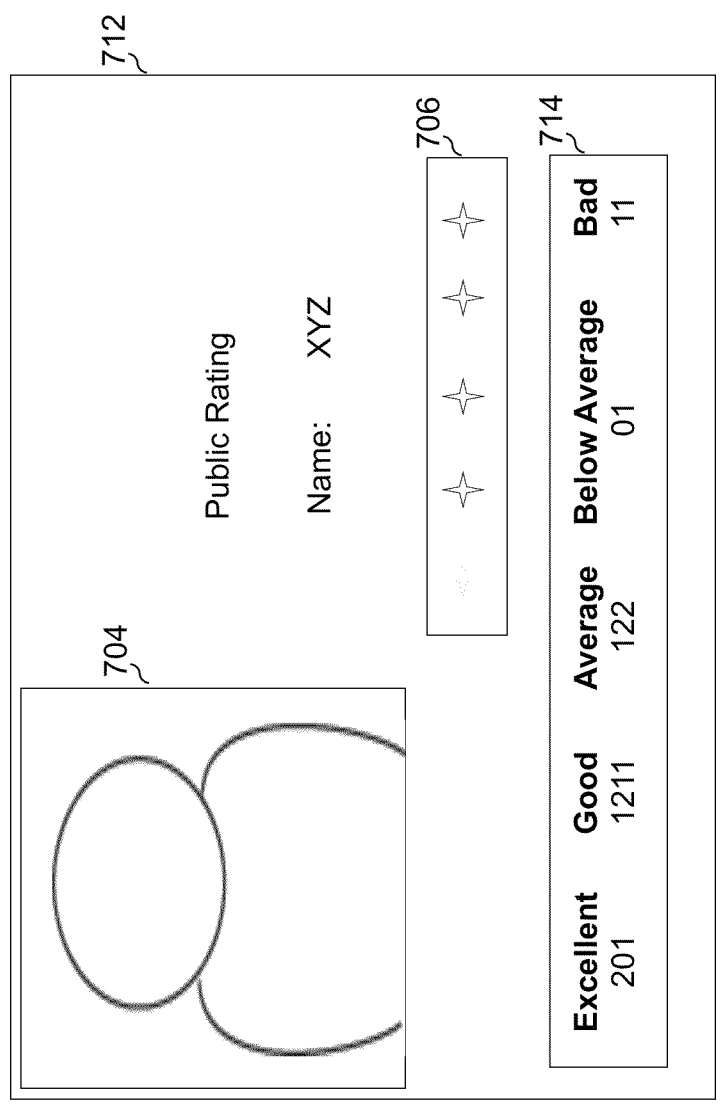
Figure 7C:
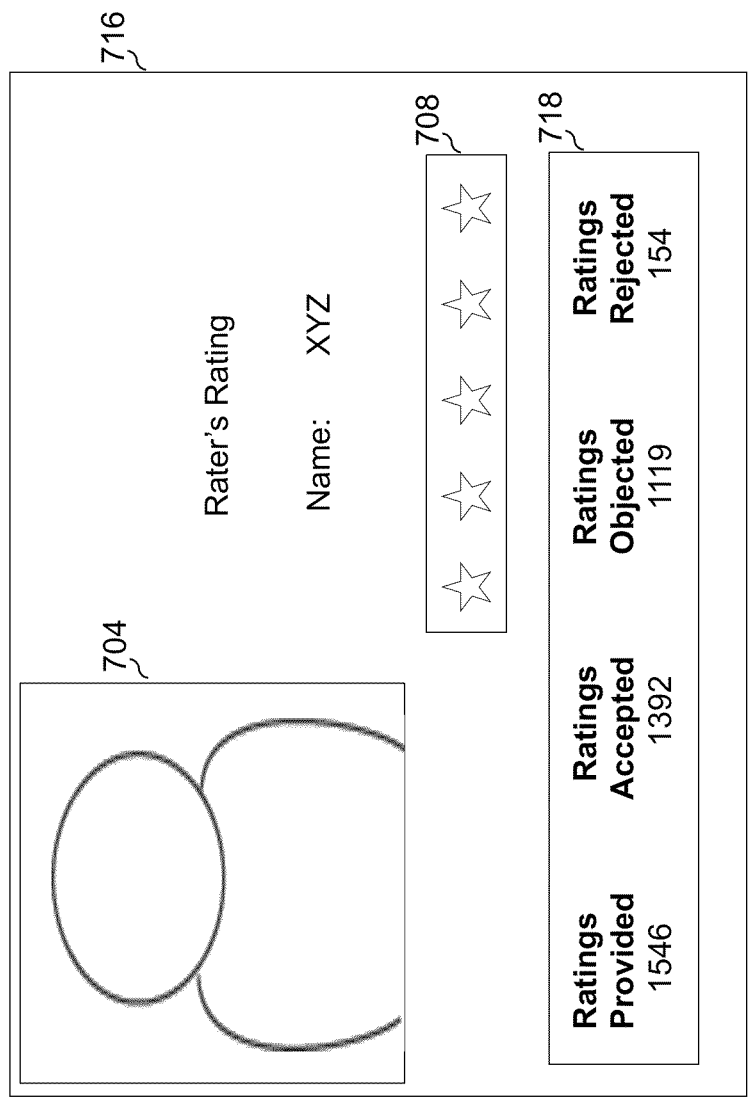
Figure 11B:
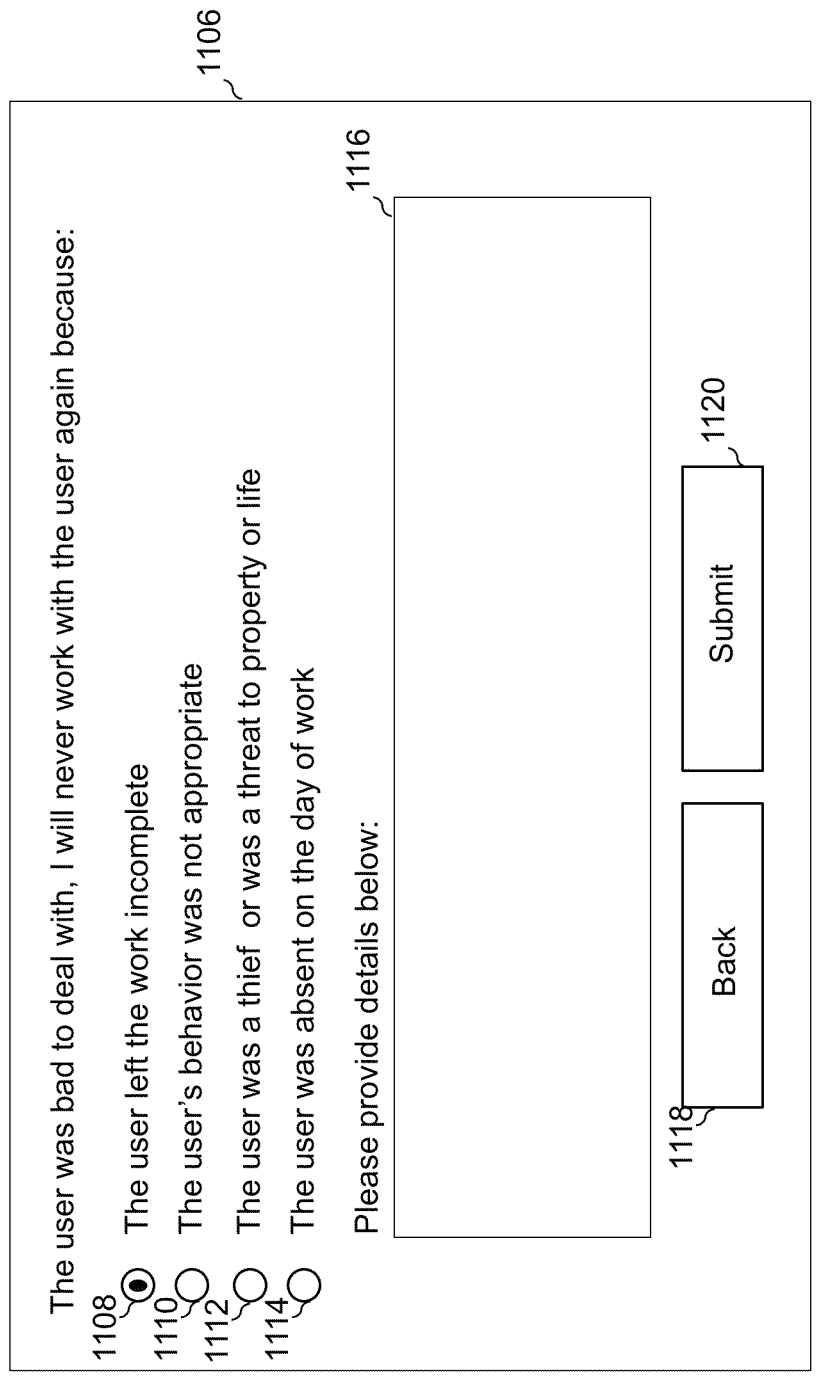
Figure 12A:
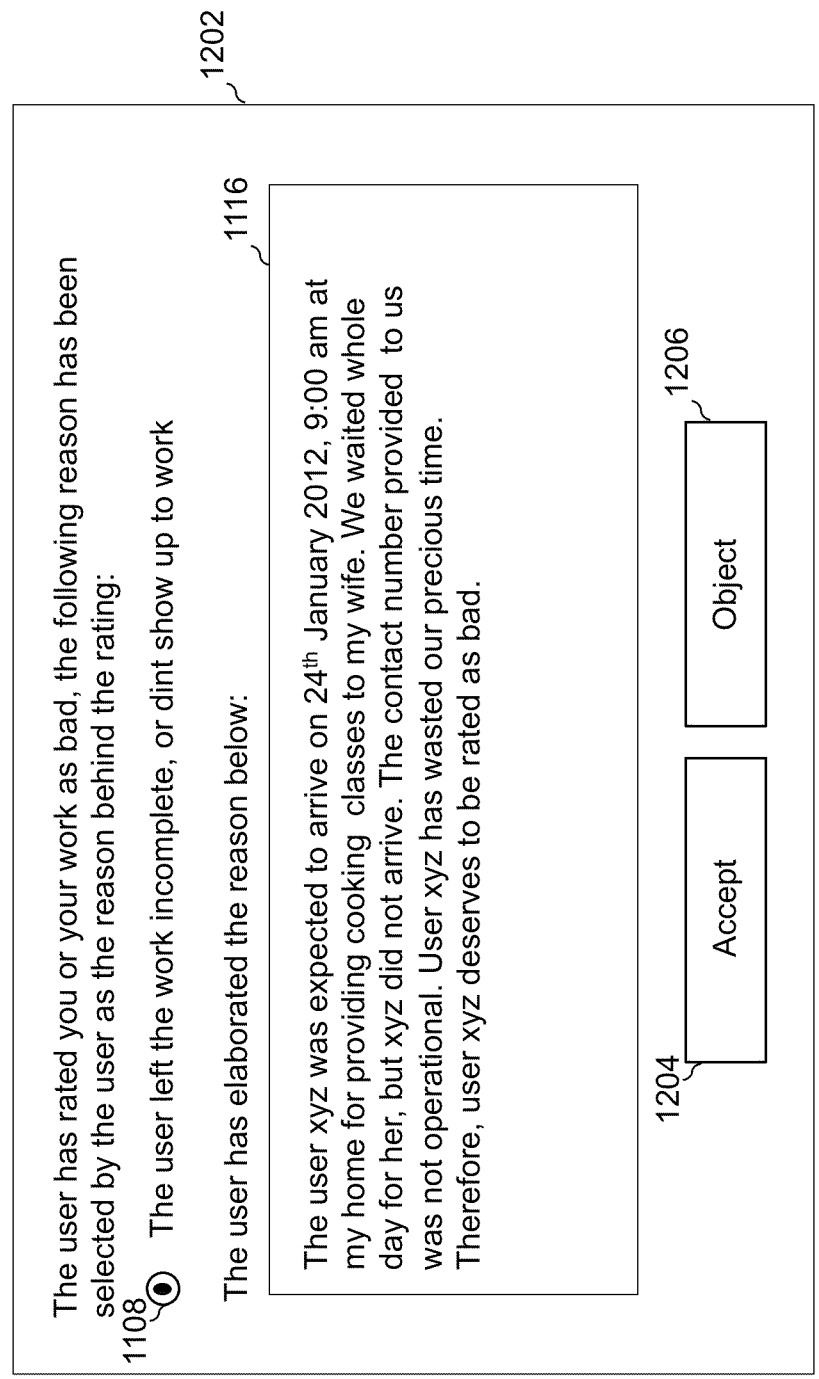
Figure 13A:
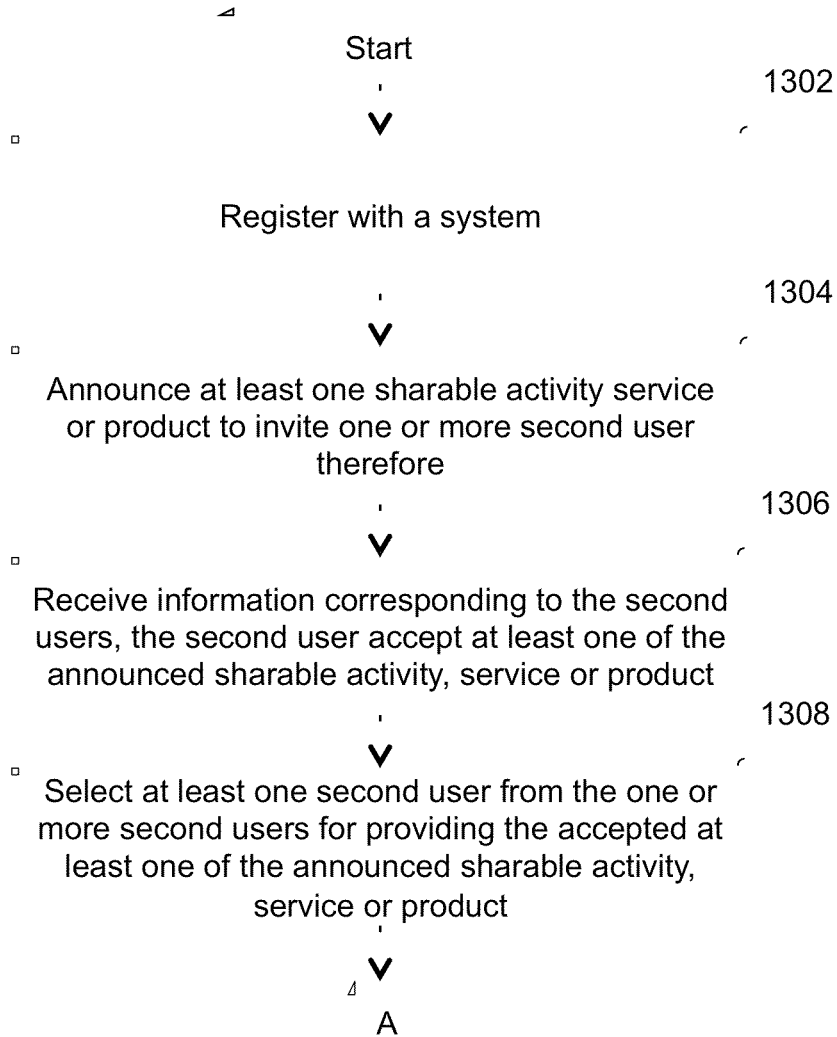
Figure 13B:
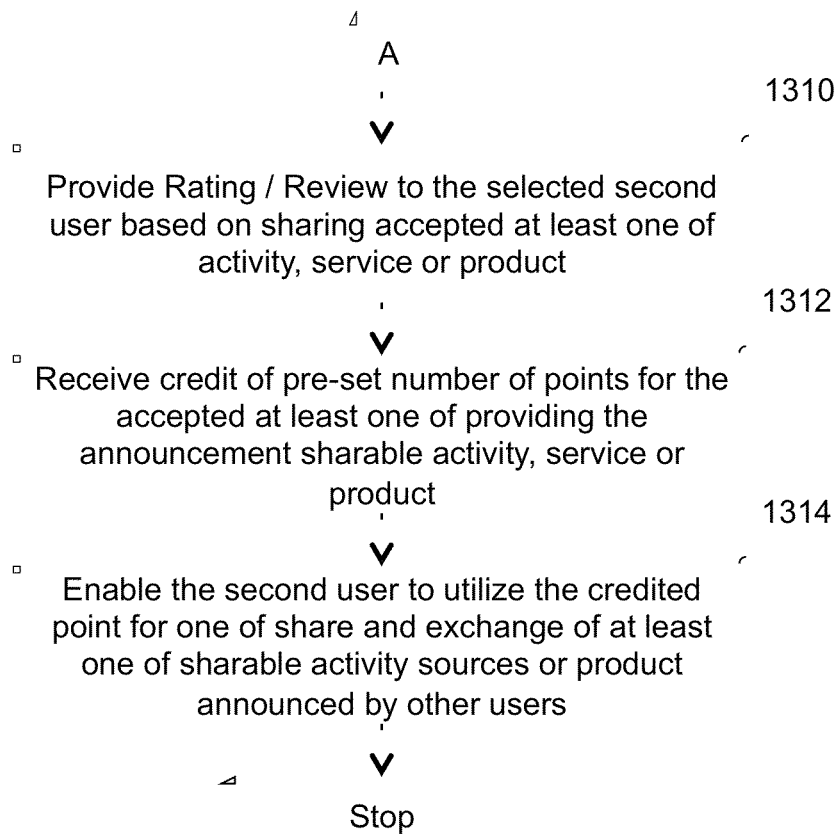
Figure 14:
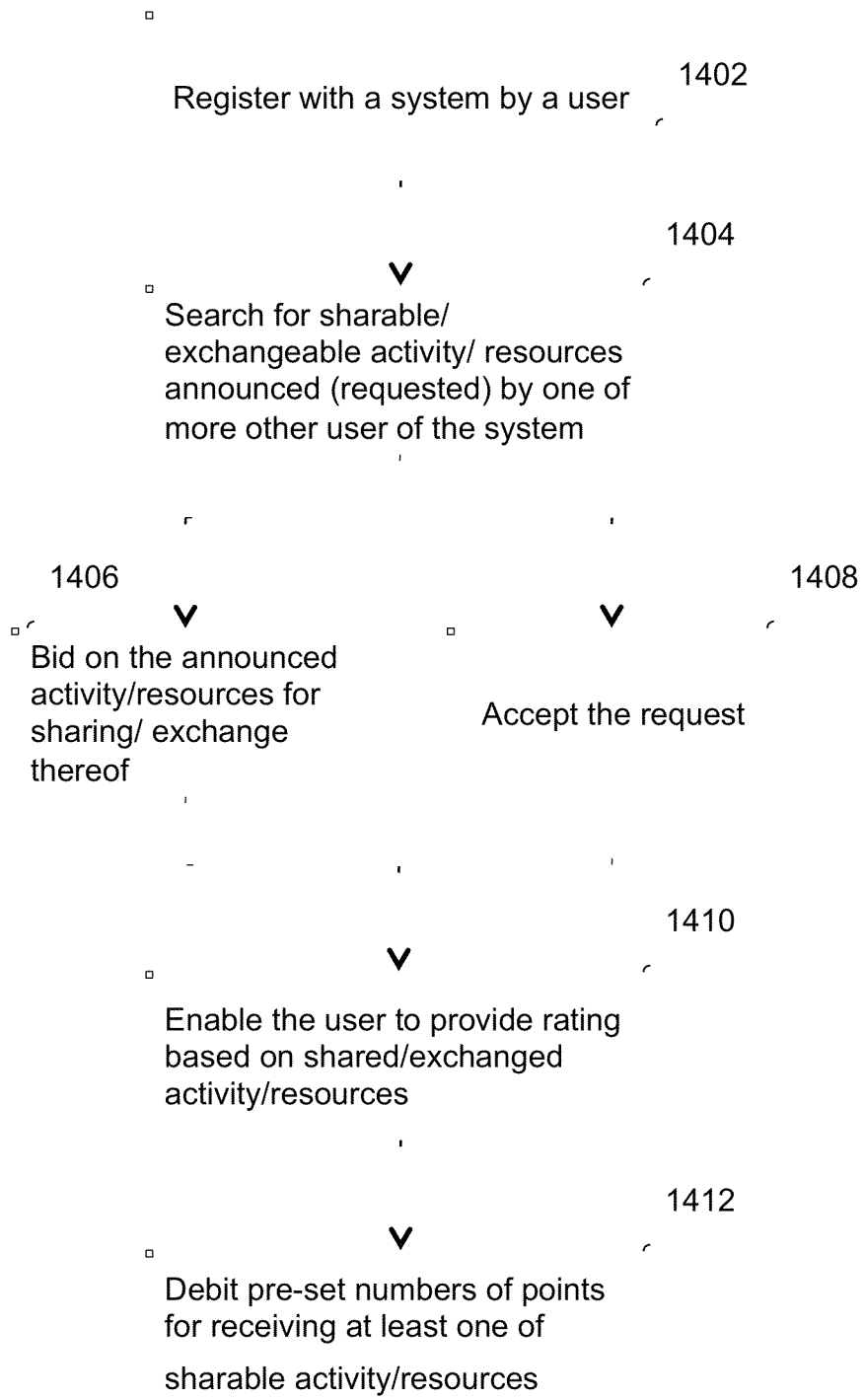
Figure 15:
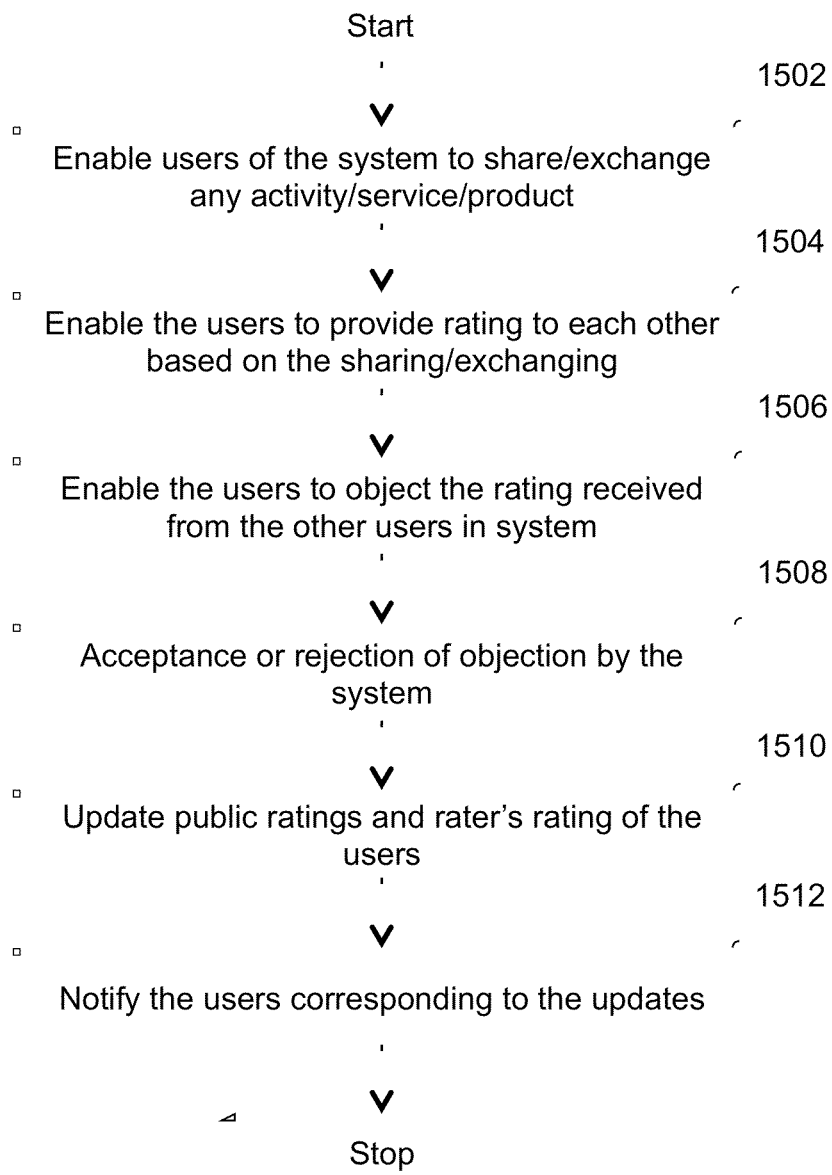
Figure 17A:
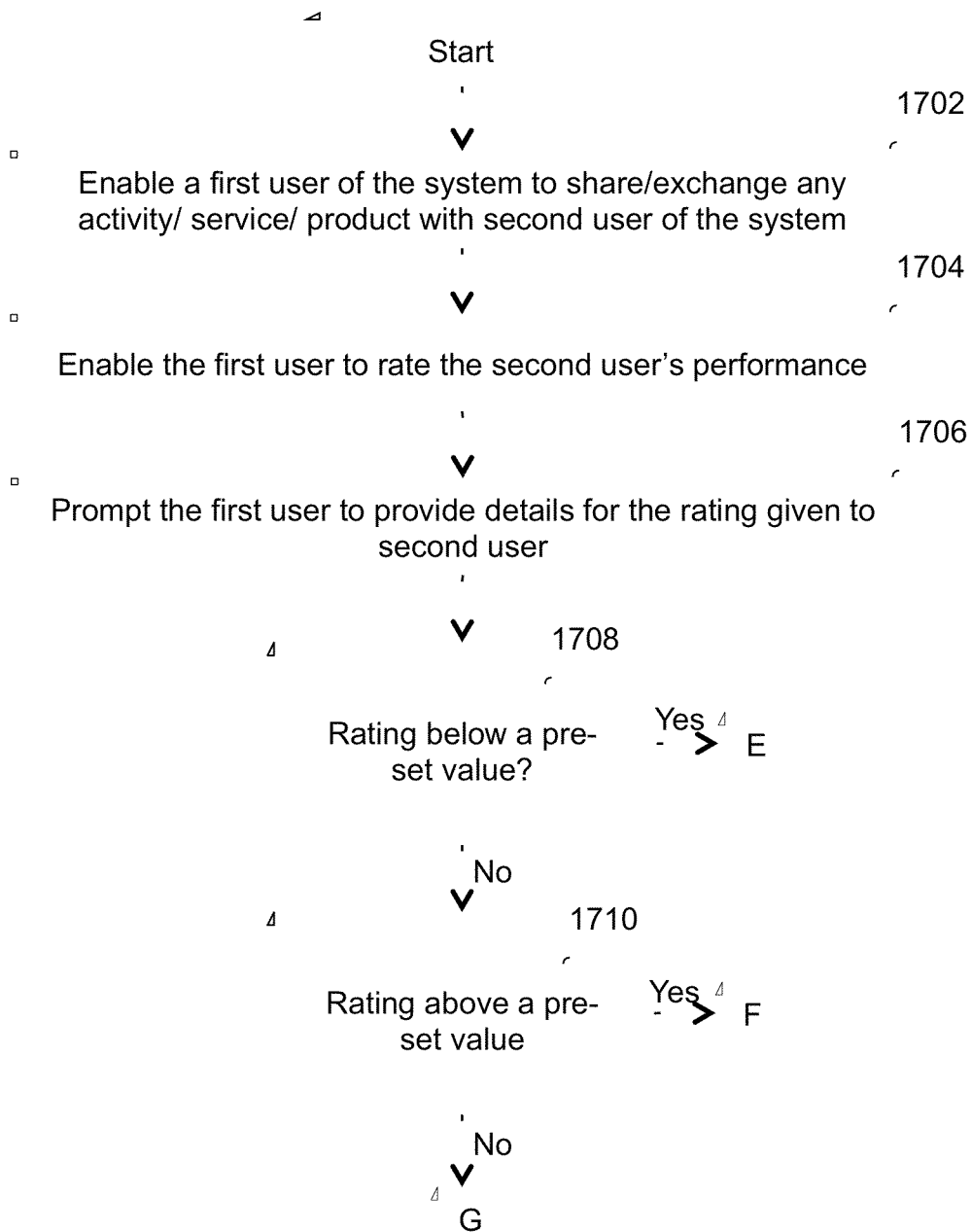
Figure 17B:
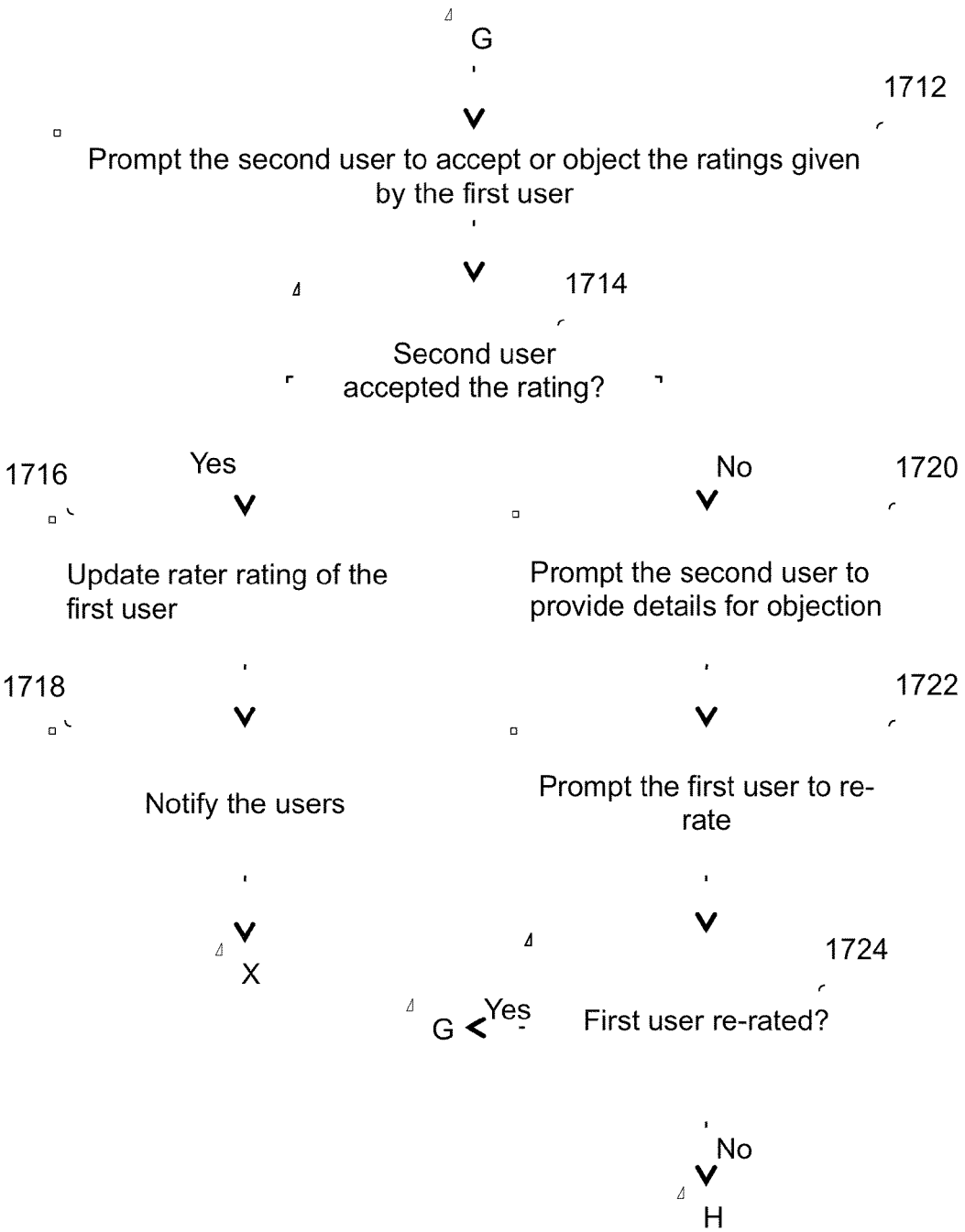
Figure 17C:
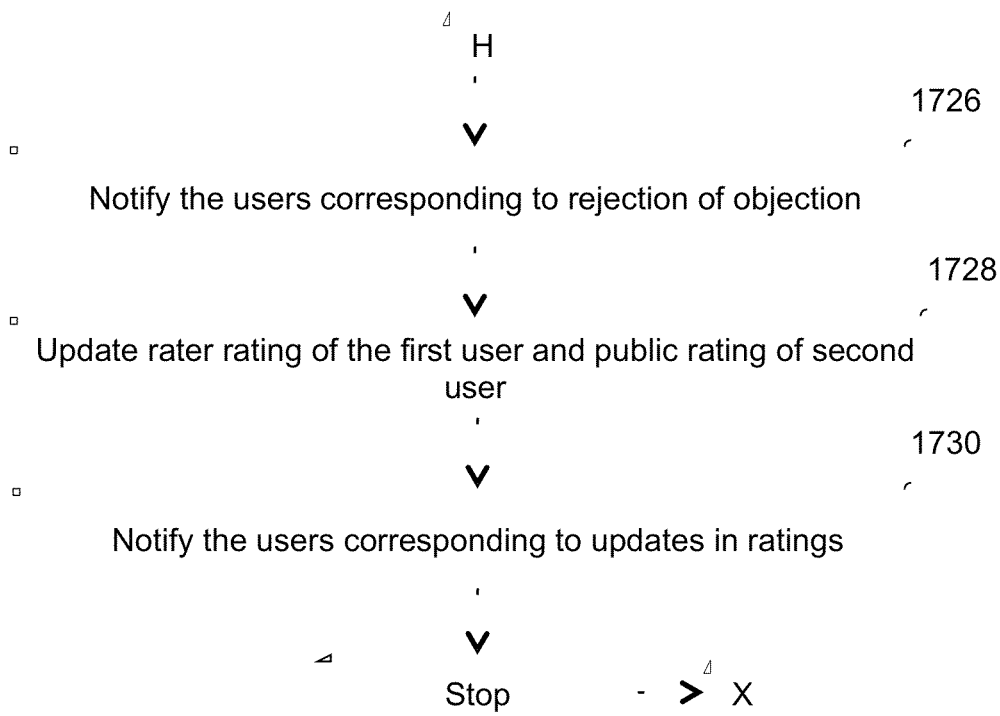
Figure 17D:
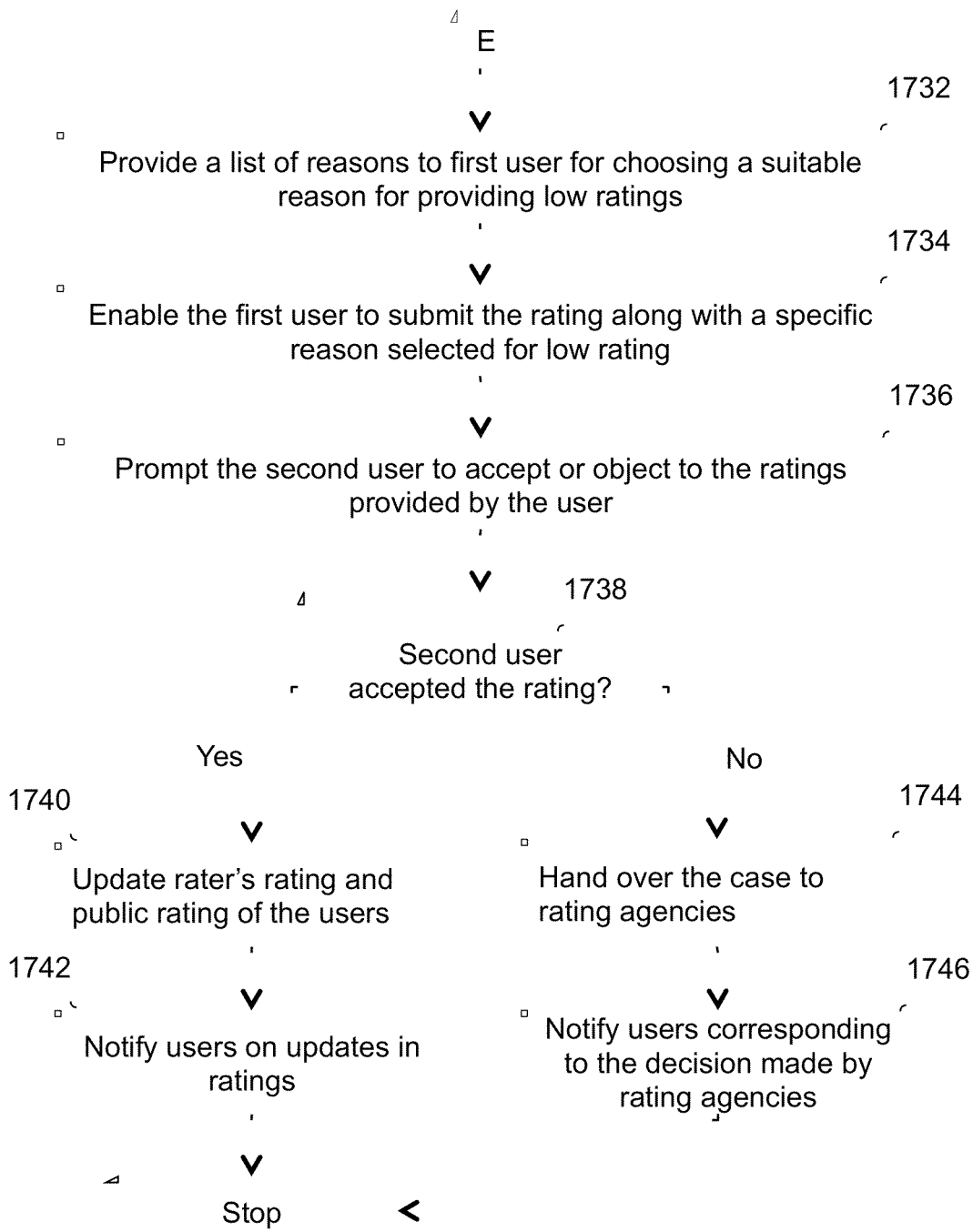
Figure 17E:
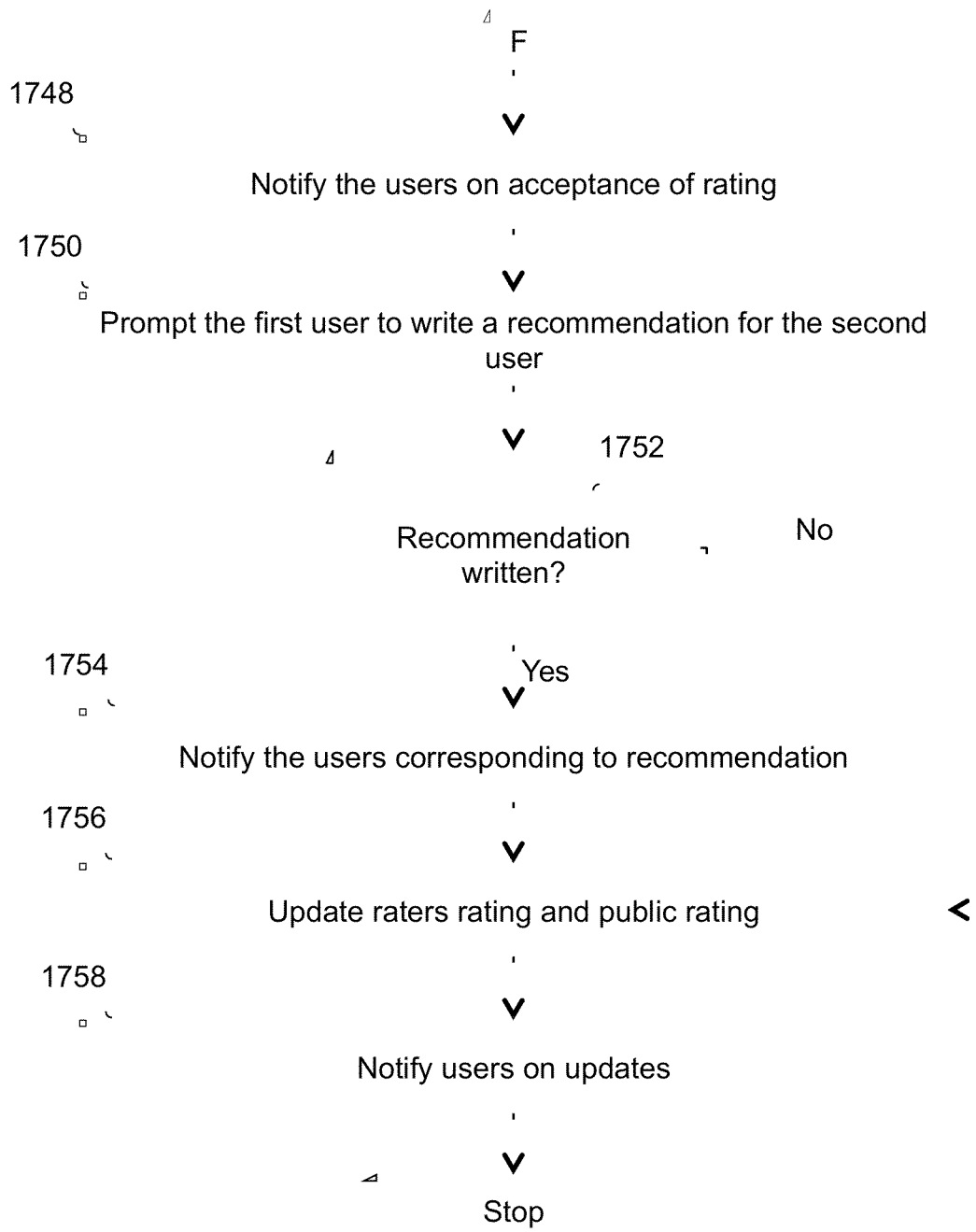
Figure 18A:
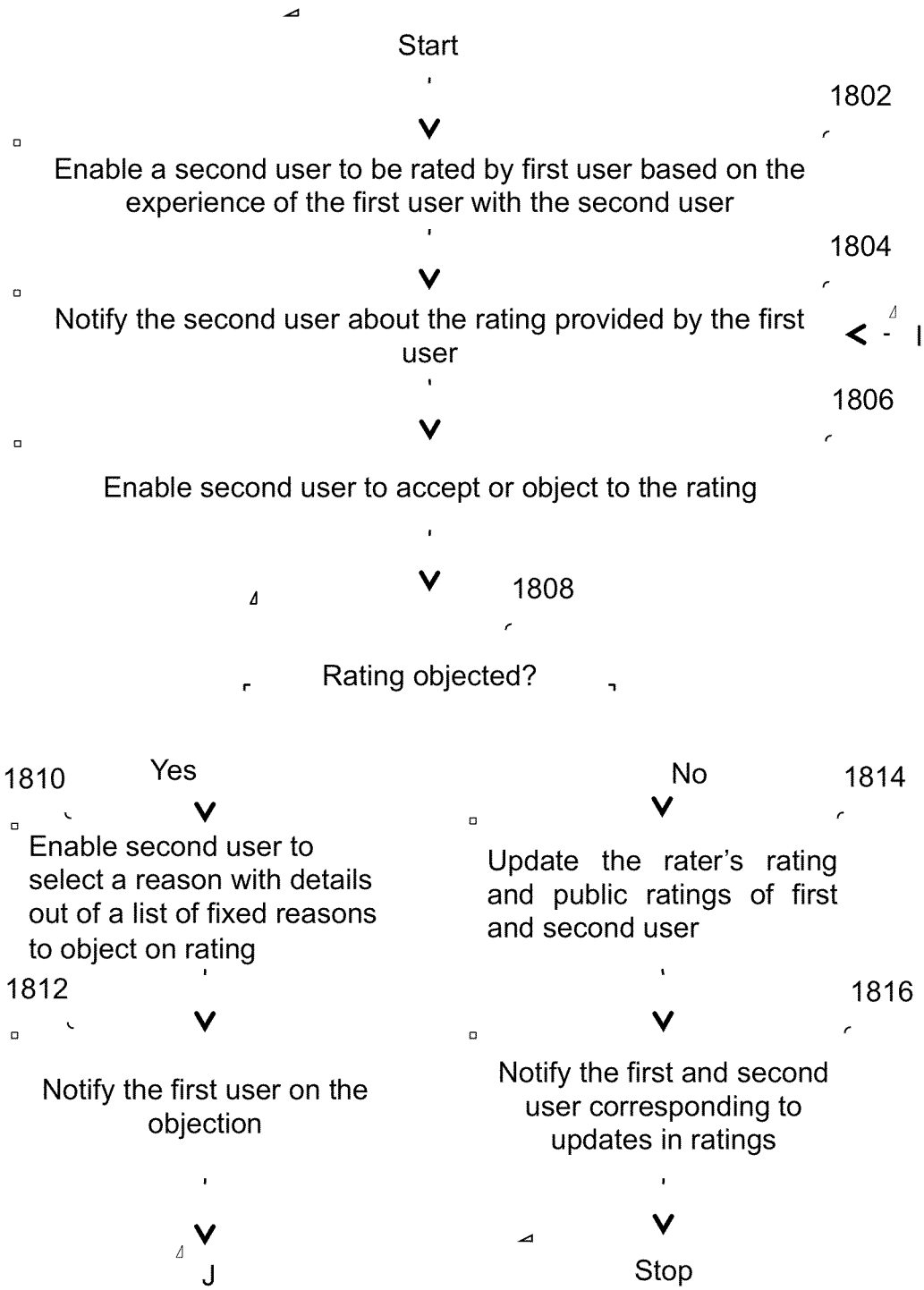
Figure 18B:
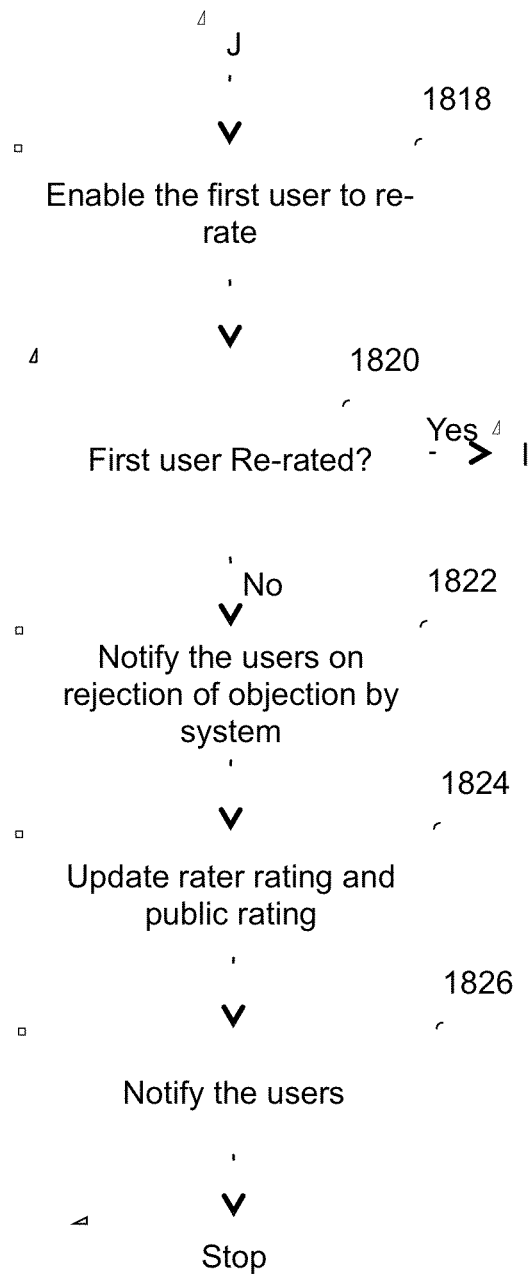

FIG. 1 illustrates an exemplary environment where various embodiments of the present invention are implemented;

FIG. 2 illustrates another exemplary environment where various embodiments of the present invention are implemented;

FIG. 3 illustrates exemplary block diagram of a system to support sharing and exchanging, in accordance with an embodiment of the present invention;

FIG. 4 illustrates exemplary structure of a database for storing information corresponding to users of the system, in accordance with an embodiment of the present invention;

FIG. 5 illustrates exemplary structure of a database for storing information corresponding to users of the system, in accordance with another embodiment of the present invention;

FIG. 6 illustrates exemplary structure of a database for storing information corresponding to users of the system, in accordance with yet another embodiment of the present invention;

FIGS. 7A, 7B and 7C illustrate various profile views of a user of the system, for providing information corresponding to the social status of the user, in accordance with an embodiment of the present invention;

FIG. 8 illustrates an exemplary database for storing information corresponding to social activities performed by a user of the system, in accordance with an embodiment of the present invention;

FIG. 9 illustrates another exemplary database for storing information corresponding to rater's rating of a user of the system, in accordance with an embodiment of the present invention;

FIGS. 10A, 10B, and 10C illustrate various profile views of a user of the system in accordance with an embodiment of the present invention where a user provides excellent rating to another user of the system;

FIGS. 11A and 11B illustrate various profile views of a user of the system in accordance with an embodiment of the present invention where a user provides bad rating to another user of the system;

FIGS. 12A, 12B, and 12C illustrate various profile views of a user of the system in accordance with an embodiment of the present invention where a user objects to the reception of bad rating from another user of the system;

FIGS. 13A and 13B illustrate a flow diagram of a method for sharing and exchanging at least one of activity, service and product in a network, in accordance with an embodiment of the present invention;

FIG. 14 illustrates a flow diagram of a method for sharing and exchanging at least one of activity, service and product in a network, in accordance with another embodiment of the present invention;

FIG. 15 illustrates a flow diagram of a method for enabling the users of the system to provide feedback corresponding to the ratings received from other users of the system, in accordance with an embodiment of the present invention;

FIG. 16A to 16D illustrates a flow diagram of a method for enabling the system to determine the genuineness of an objection raised by a user of the system on the ratings received from another user of the system, in accordance with an embodiment of the invention;

FIG. 17A to 17E illustrates a flow diagram of a method for providing a user with various tasks to perform on the selection of different ratings for other users of the system, in accordance with an embodiment of the invention; and FIGS. 18A and 18B illustrate a flow diagram of a method for enabling a user of the system to re-rate the ratings provided to another user of the system, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment 100 where various embodiments of the present invention are implemented. The environment 100 includes a server 102 connected to a plurality of client devices 104a, 104b . . . 104n via a network 106. The client devices 104a, 104b . . . 104n (hereinafter may collectively be referred to as "client devices 104") may refer to electronic devices that may be utilized by users to access the server 102. Examples of the client devices 104 may include, but are not restricted to, a personal computer, a mobile phone, a smart phone, a personal digital assistant (PDA), a tablet computer, a laptop, and the like. The Network 106 may include, but is not restricted to, a communication network such as Internet, PSTN, Local Area Network (LAN), Wide Area Network (WAN), Metropolitan Area Network (MAN), and so forth. In an embodiment, the network 106 can be a data network such as the Internet. Further, the server 102 may include a system 108 to support sharing and exchange among the users of the client devices 104 (hereinafter referred to as "users"). The system 108 may facilitate the share and exchange of an activity, service or product among the users through the network 106. Further, the messages exchanged between the server 102 and the client devices 104 can comprise any suitable message format and protocol capable of communicating the information necessary for the server 102 to provide a desired service to the client devices 104. In an embodiment of the present invention, the messages comprise hypertext transfer protocol (HTTP) messages.

In an embodiment of the invention, server 102 may be a host for a social networking website that may utilize the system 108 for supporting the users of the social networking website to share and/or exchange various activities and resources, such as vehicles, equipments, services, among themselves. Further, in another embodiment, the social networking may be a part of the system 108 that may require the users to register, therewith, for facilitating the users with various support services of sharing and exchanging in the system of social network. Further, in an embodiment, the users of the client devices 104 may need to register with the system 108 for sharing and exchanging at least one of activity, product, or service (hereinafter 'activity', 'product' and 'service' may collectively be referred to as 'resources') in the network 106. The user may be registered, to create a profile, by submitting information, such as personal information, academic information, professional information and the like, to the system 108. The personal information of a user may include, but is not restricted to, name, location, and hobbies. Further, the academic information of the user may include, but is not restricted to, qualification details and any academic achievement. Similarly, the professional information may include details corresponding to the profession (if any) such as industry, designation and the like, of the user. The information corresponding to the profile of the user is explained further in conjunction with FIG. 4 and FIG. 5.

In an embodiment, each of the registered users may communicate messages to share or exchange the resources with other users. In an embodiment, each user may post communication message through his/her profile for public viewing. Such messages, if posted by the user, may be shown to all other users of the system 108. Further, in another embodiment, the communication between various users of the system 108 may be through sending messages directly to intended users of the system 108. Again further, in another embodiment, the user may define one or more groups of users on various bases such as types of users, relationships with users and the like. For example, groups for friends, relatives and the like. Further, the user may post the request/announcement to a specific group of users. Yet in another embodiment, the users may create particular rooms in their profiles for sharing activity or service with users of the system 108. For example, the user may create a room for sharing of resources such as vehicle, products and the like.

Similarly, the user may create a room for exchange of services between users, such as a room for exchanging services like baby sitting with any product of services offered by other users of the system 108. For example, if a user of the system 108 plans to travel from a first location to a second location, the user may post this information on his/her shared room corresponding to travelling. The information posted by the user may be visible to all other users of the system 108 who share the common room. The system 108 may also notify one or more other users, about the travelling plan of the user, through appropriate means. The one or more users may include, but are not limited to, users of the system 108 who share the common room or having the same interests (as may be determined through the users' profile), for example, but not limited to, the system may send notification, through an E-mail, to each of the users having the interest in travelling or who follow the same route from the first location to the second location. The user may also communicate messages to share or exchange activity, product, or service with other users.

In an embodiment, each registered user of a client device, such as the client device 104a, may post the information corresponding to the product, service or activity that the user wants to share or exchange with other users of the system 108. For example, the user may announce an activity, such as bike riding, or post a request for resource sharing or exchanging. Further, the user may post one or more conditions corresponding to post or announcement. The conditions may include, but are not limited to, information or terms corresponding to the posted request or announcement for sharing or exchanging. For example, the user may post the conditions such as time of ride, maximum time window for pick-up, maximum time window for drop off corresponding to the bike riding.

Similarly, the user may post a request for ride sharing or exchange of services or equipments. For example, the user may post a request for service corresponding to baby sitting in exchange of any other service or product. Further, the user may post conditions corresponding to such request, for example, the user may announce timings for receiving such service. Accordingly, the other users of the system 108 may show their interest corresponding to the post by accepting the announcement.

Further, in an embodiment, the user may ask for bids, from other users of the system 108, for providing services based on the request/announcement posted by the user. Correspondingly, the other users may bid for the share or exchange for services or product. In an embodiment, the system 108 may search for suitable other registered users (having their profiles of the system 108) based on the request/announcement posted by the user. In this embodiment, in one case, the system 108 may analyze the profiles of the registered users of the system 108 based on the request/announcement and corresponding conditions posted by the user. For example, if the user announced an activity for bike riding then the system 108 may search for other users having interest in biking or travelling. In an embodiment, this may be determined by analyzing the hobbies of the other users. Accordingly, the system 108 may determine the suitable users for sharing or exchanging the activity, service or product based on the request or announcement posted by the user.

Further, it may be appreciated by a person skilled in the art that the sharing and exchanging through the system 108 in the network 106 may not be limited for activity, product and services. Further, each user may share information in any form such as text information, multimedia information and the like. For example, if a user is willing to travel from the first location to a second location and seeking guidance in travelling route or weather conditions for the second location or any other information in this regard, then the user may post the request for corresponding information. Other users of the system 108 may share their experiences in the second location that the user may be willing to know. Further, the other users may share other information to guide the user (who posted the request) regarding short route for travelling to the second location. In an embodiment, the system 108 may notify the user regarding other suitable users of the system 108 who have travelled to the second location and may provide guidance to the user. The system 108 may determine about the suitable users from the profile created or activities posted by the other suitable users. It may be apparent to one skilled in the art that here, the user may be the registered member of the system 108 who announces an activity or posts the request and other users may include other registered members of the system 108 who can view the announcement/post and may accept/reject the request. Further, the system 108 may search for the other users who may be suitable to share or exchange of resources. The system 108 is explained further in more details in conjunction with FIG. 3.

FIG. 2 illustrates another exemplary environment 200 where various embodiments of the present invention are implemented. The environment 200 includes a server 202 connected to a plurality of client devices 204a, 204b ... 204n via a network 206. The client devices 204a, 204b ... 204n (hereinafter may collectively be referred to as "client devices 204") include communication devices that may be utilized by users to access the server 202. Examples of the client devices 204 may include, but are not restricted to, a personal computer, a mobile phone, a smart phone, a personal digital assistant (PDA), a tablet computer, a laptop, and the like. The Network 106 may include, but is not restricted to, a communication network such as Internet, PSTN, Local Area Network (LAN), Wide Area Network (WAN), Metropolitan Area Network (MAN), and so forth. In an embodiment, the network 206 can be a data network such as the Internet.

Further, the server 202 may include a system 108 to support sharing and exchanging among the users of the client devices 204 (hereinafter referred to as "users"). The system 108 may facilitate the share and exchange of an activity, service or product among the users through the network 206. In an embodiment, the users of the client devices 204 may be required to register with the system 108 for sharing and exchanging the activity, service or product (hereinafter 'activity, service or products may collectively be referred to as 'resources'). Further, the messages exchanged between the server 202 and the client devices 204 may comprise any suitable message format and protocol capable of communicating the information necessary for the server 202 to provide a desired service to the client devices 204. In an embodiment of the present invention, the messages comprise hypertext transfer protocol (HTTP) messages.

Further, the environment 200 illustrates links between the client device 204a, the client device 204b and the client device 204c. As shown the client device 204a and the client device 204b are connected through a link 208. Similarly, the client device 204b and the client device 204c are connected through a link 210. These links represents a relation between the users corresponding to the client devices. Such relations may include, but are not restricted to, friendship, family relation, neighbors, business relation and the like. For example, the user of the client device 204a may be a friend of the user of client device 204b. Similarly, the user of client device 204b and the user of client device 206c may be business associates or colleagues in the same company. Further, the users may be directly or indirectly related to each other. For example, the user of the client device 204a (that is shown as connected to the client device 204b) may be a direct friend of the user of the client device 204b. Similarly, the user of the client device 204b may be a direct friend for the user of the client device 204c (as shown connected through a direct link). Therefore, the user of the client device 204a may be considered as indirectly related (as friend of friend) with the user of the client device 204c.

Further, in an embodiment, such links may be tracked by the system 108 to determine the relations between the users. Further, each user may limit the posting or announcements to specific users based on the relations. For example, if a user, such as the user corresponding to the client device 204a, posts a public request for sharing a ride, then in an embodiment, the request may be shown to all the registered users of the system. Further, if the user of the client device 204b wants to show his post only to his/her friends, then the system 108 may make the post visible only to friends, such as the user of the client device 204a and the user of the client device 204c. Furthermore, if the user of the client device 206b is willing to show his/her post only to his/her colleagues of a company then the system 108 may make the post visible only to the user of the client device 204c.

For example, if a user needs someone to look after his/her house for one week in his/her absence. The user may want anybody whom he/she can trust on for such responsibility of looking after the house such as his/her family members, close friends and the like. Further, the user may not want this information (of his absence from his/her house for one week), to be leaked to any other user. In such situation, the user may select one or more credible users (members) of the system 108 or may select a pre-defined group of members (corresponding to his/her profile) that may include his/her family and/or close friends. The social networking website may then show the posting of the user to only the selected members and may strictly hide the information to be leaked to any other member.

Further, based on the posting, one or more other users of the system 108 may accept the request posted by the user and accordingly the resources may actually be shared and/or exchanged between them. Subsequent to the actual sharing and/or exchanging based on the accepted request corresponding to the post, the user and the one or more other users may provide rating to each other based on their performances corresponding to sharing/exchanging. User's ratings may be explained further in conjunction with FIGS. 3, 4 and 5. Further, the system 108 may determine the credibility of users for sharing and/or exchanging resources with a first user based on various factors such as their relations with the first user, ratings received from other users of the system 108 and the like.

FIG. 3 illustrates exemplary block diagram of a system, such as the system 108 (as described in conjunction with FIG. 1 and FIG. 2), to support sharing and exchanging, in accordance with an embodiment of the present invention. In an embodiment, the system may be utilized as a plug-in for other system or a social network. In another embodiment, the system may be implemented as a social networking system. The system 108 includes a processor 302 and a memory 304. The memory 304 includes a database 306. The database 306 may store information about users of the system 108. Each user may need to be registered with the system 108 by creating a profile thereon. The profile may be created by entering one or more information, such as personal information, professional information and the like, corresponding to the user.

The system 108 may facilitate each user for announcing a request corresponding to sharable/exchangeable activities, services or products (hereinafter referred to as 'resources') for inviting other users (hereinafter referred to as 'second users') of the system 108. Hereinafter the user who posts/announces any request/information on the system is referred to as 'first user'. Further, hereinafter, the users of the system 108 who are invited by the first users, for the posted/announced request/information, may be referred to as the 'second users'. Furthermore, the users (other than the first user) who may accept the request posted/announced by the first user may also be referred to as the second users. Further, the user may post one or more conditions corresponding to the announcement. The conditions (as posted by the first user corresponding to the sharable/exchangeable activity/service/product) may include, but are not limited to, at least one of type, time, location, compensation, security collateral or required skill level corresponding to the sharable activity, service or product. For example, if the sharable activity, service or product is vehicle sharing or ride sharing with one or more second users then the conditions corresponding to the ride (or vehicle) sharing may include, but are not restricted to, date of the ride, time of the ride, maximum time window for pick-up, and maximum time window for drop off corresponding to the ride.

In an embodiment, the conditions may be mandatory to be followed by the second users, if the second user accepts a request corresponding to the announcement. In another embodiment, the conditions may be negotiable between the first user and one or more second users who are interested in the posted/announced request/information. The system 108 may determine about one or more suitable second users that may be recommended to the first user corresponding to the post of the first user. The suitable second users corresponding to the post/announcement may be determined based on matching between the profile of the first user and the profile of each of the second users. In one embodiment, the system 108 may determine the matching of the first user with the second users by matching the one or more conditions with information (such as profile information) corresponding to the second users. If the one or more second users meet the conditions then the second users may be considered as suitable second users for the announced activity/service/product.

Furthermore, the memory 304 of the system is coupled to the processor 302 and includes the database 306 to store information about each of the first users and second users of the system 108. The information corresponding to the first user and the second user may include, but is not limited to, personal information (such as name, location, hobbies and the like), professional and educational information (such as qualification, work industry, designation and the like). Further, the information corresponding to the first user may also include information corresponding to post/announcements for sharing/exchanging activities, services or product. The first user may announce/post request/information and corresponding conditions associated with activities/services/products for inviting one or more suitable second users. The system 108 may facilitate the second users to accept one or more sharable/exchangeable activity, service or product that may be announced/posted by first users.

Further, the memory includes one or more instructions that may be executed by the processor 302 to provide support for sharing and exchanging at least one of an activity, a service, a product or information. The processor 302 of the system 108 may search for suitable second users of the system 108 by matching the content and/or type of the announcement or request made by the first user with the profile information of the other users of the system 108. Examples of the types of announcements or requests may include, but are not limited to, sports, education, health, hospitality, food, transport, security, pets, charity, adventure, personal, social or business etc. The profile information may include, but is not limited to, the hobbies/interests, residential/business addresses, recent activities, public ratings, profile points etc. The public rating represents rating provided by the other users based on the shared/exchanged activity/service/product between them. In an embodiment, the public rating may be a rating provided by a first user to a second user and vice-versa for a specific activity shared/exchanged between them. In another embodiment, the public rating may be an average rating of a user (such as the first user or the second user) that may be received from all other users of the system 108 based on sharing/exchanging/purchasing/selling an activity, a service, a product or personal item, an information and the like.

Further, the profile points include points that may be earned by a user based on sharing/exchanging/purchasing/selling any activity, a service, a product, personal item, or information with other users of the system 108. Further, the earned profile points may be utilized by the user in further sharing or purchasing any activity or service or a product with other users of the system 108. In an embodiment, profile of each user may be initialized with zero '0' profile points.

The processor 302 may then inform the first user about one or more matching profiles of the second users that are suitable to the announcement or request made by the first user. In an embodiment, the processor 302 may select only those profiles of the second users of the system 108 that satisfies all of the conditions posted by the first user corresponding to his/her announcement or request for sharing/exchanging/purchasing/selling any activity, a service, a product or personal item, an information and the like. Further, in another embodiment, the processor may provide information corresponding to the other users (of the system) having less relevancy based on the matching (as described above) between the conditions of the first user and profiles of the second users. In this embodiment, the other users may have greater relevancy based on some other criteria such as common interest, location as that of the first user.

In an exemplary embodiment of the invention, the sharable activity, service or product may include sharing a ride by the first user with one or more of the second users. For example, a first user announces a ride sharing service to be shared a certain date and time. The first user also adds certain conditions corresponding to the ride sharing service. The conditions may include, but are not limited to, date on which the first user is willing to share his/her ride, time of the day at which the first user is willing to pick up the second user, Initial location from where the first user will pick up the second user, destined location at which the first user will drop off the second user, and maximum time window selected by the first user for picking up and dropping off the second user from/to the destined location. For example, the maximum time window for pick up selected by the first user may include a maximum time at which the first user may pick up the second user. The maximum time window for pick up may also include the maximum time up to which the first user may wait for the second user to join the first user. The maximum time window for dropping off may include a maximum time to reach to the destined location of the second user.

In another exemplary embodiment of the invention, the sharable activity, service or product may include share of sports activity or invitation to play any sport. For example, a first user may announce a cricket event on certain date and time at a specific venue. The first user may also add certain conditions corresponding to playing the sport. The conditions may include, but are not limited to, need for experienced players (second users), need to be in certain uniform, need for males only, need for the players of a particular age group (such as less than thirty years). The processor 302 may send a message to all of the users of the system 108 corresponding to the announcement made by the first user. In case a user accepts to play with the first user, the processor 302 may then notify the first user corresponding to acceptance of the invitation to play cricket by a user (or a second user). The first user may then scan the profile of the user and may or may not approve the second user for being a part of the sports activity.

If the second user gets approval from the first user, the processor 302 may then inform the second user about his selection/approval for the sports activity. Similarly, if the second user is rejected by the first user then the second user may be informed suitably by the processor 302. Further, in an embodiment, the system 108 may inform other approved second users (who are already approved by the first user corresponding to the announced sports activity) about approval of another second user for the shared sports activity. Due to this, the other users may remain updated about the fulfillment of the conditions corresponding to the sports activity. For example, if for 'cricket' activity (as posted by a first user), '11' members are required and 9 members have been selected (Approved) by the first user and '2' more members are required. Then by sending the notification to the all 9 approved members about a new approved second member for the 'cricket', the all '9' members may be updated that now only '1' more member is required to meet the condition (of '11' members) for the activity 'cricket'.

The processor 302 of the system 108 may also search for certain users of the system 108 that lives nearby the venue specified by the first user in the announcement. Further, the processor 302 may shortlist the users having mentioned about cricket in their profiles as hobby or interests or profession etc. Furthermore, the processor may shortlist the users based on their gender and age. The processor 302 may then suggest the shortlisted users to the first user. The first user may then view the profiles of the shortlisted users suggested/recommended by the system 108 and may further filter the suitable users based on his/her preferences. The processor 302 may then send a notification to all the suitable users about the approval in participating in the 'cricket' activity. The notification may include, but not limited to, the detailed information about the sports event announced by the first user. The notification may also inform the suitable users about the approval of the first user for participating in the activity. Further, in an embodiment, the processor 302 may directly approve the user, if the suitable user accepts the notification. Accordingly, the system 108 may keep a record (in the database 306) of the final shortlisted users for the activity ('cricket') as posted by the first user.

Further, based on the record (that may contain a list of the approved second users) and activity information (such as conditions like when the activity is to be performed), the processor 304 may determine whether the activity is completed or not. Further, the system 108 may ask each of the first user and the second users to confirm about the status of the activity that whether the activity is 'completed', 'pending', 'extended', 'expired' and the like. The status corresponding to any activity may define the situation in which the activity is present. The status 'completed' or 'pending' may denote that the activity is completed or pending respectively. Further, the days and time for the activity may be extended due to some reasons or mutual consent of each member of the activity then the status may be set as 'extended. Correspondingly, any or each member may update the activity information by entering the updated date therein.

Based on the status, the processor 304 may send timely reminders to each of the first user and the second users (who participated in the activity) for providing rating/review to each other member of the activity. For example, if the status of the activity is 'completed' then the processor 304 may notify each of the members to provide rating to each other based on their experiences in sharing the activity ('cricket'). Accordingly, each user may provide rating to other users based on their experiences with others in sharing the activity (such as while playing the 'cricket'). Such ratings may add a value to a user's profile that may be considered to determine the credibility of the user. Based on activity specific rating, an average rating may be calculated by the processor 304 that depicts the overall public rating, for the user, based on ratings received for all the activities/services/products shared/exchanged between the users.

Further, based on the rating received by each user, the processor 304 may determine credit points based on sharing the activity, service, product with other users. For example, based on the rating received by a user for a particular activity, the processor 304 may calculate the amount of points that may be credited or debited to/from the user's account. Further, the processor 304 may determine the credit points based on various factors such as the type and duration of the activity/ service shared/exchanged between the users. Furthermore, the processor 304 may credit/debit points to/from the user's account that may be pre-set between the users who share/ exchange the activity/service/product. for example, if the first user shares a personal item with other user (second user) then based on the pre-set amount, the first user may receive '5' points as a credit for sharing the personal item with the second user. Correspondingly, the '5' points may be debited from the account of the second user for sharing the personal item of the first user. In other words, the '5' points may be transferred from the second user's account to the first user's account. Further, the processor 304 may send a notification to the first user and the second user(s) for corresponding credit and debit of pre-set number of points based on sharing at least one of the activity, service or product between them. In an embodiment, the processor 304 may facilitate each user of the system 108 to utilize credit points for sharing/exchanging/purchasing any activity, service, product or information that may be announced by one or more other users of the system.

Further the processor 304 may send notifications to each user based on the activity performed corresponding to the user. Such notification may be sent through various means such as Email, SMS, profile notification and the like. The profile notification includes notification to a user (corresponding to the profile) by posting the message of notification within the profile of the user. For example, the processor 304 may send emails to first user and the second users for providing rating to each other. Similarly, the processor 304 may send emails to the first user and the second users for corresponding credit or debit of pre-set number of points.

In an exemplary embodiment of the invention, instructions executable by the processor 302 of the system 108 may facilitate the users to provide ratings to each other based on the experience shared with each other during sharing/exchanging/selling/purchasing of activity/service/product. Further in the exemplary embodiment, to maintain genuineness in providing ratings to the users, the system may add restrictions in the procedure of rating users, such that, the users of the system are bound to provide support or details for providing any rating to any user. The system 108 may store the details in the database 306 of the memory 304. The details stored by the system 108 may be utilized in case if the rating receiver queries against the rating received by other users.

Further, instructions executable by the processor 302 may facilitate the users of the system to object on any of the ratings received from other users. Furthermore, instructions executable by the processor 302 may facilitate the system to determine the authenticity or genuineness of the objection raised by the users. Moreover, the system may either reject or accept the objection raised by the users corresponding to the ratings received from other users. If the system 108 accepts the objection of a user then the rating received by the user may be rejected, i.e. the rating received may not be accountable in the public rating of the user. Further, if the system rejects the objection of a user then the rating may be accountable in the public rating of the user.

Furthermore, instructions executable by the processor 302 may facilitate the users to object further on the decision made by the system to either accept or reject an objection on a rating. If the users objects further on the decision of the system then the system may hand over the objection to rating agencies. The rating agencies may be a dedicated team of human employees of the system who are trained to handle conflicts in the ratings. The instructions executable by the processor may facilitate the rating agencies to contact the users involved in the conflicts via network means. The rating agencies may enquire the users concerning to the conflicts and may use the data stored by the system 108 in the database 306 of the memory 304 corresponding to the shared/exchanged activity/service/product. In an embodiment, decision made by the rating agencies may not be objected further.

In addition to the exemplary embodiment of the invention, the instructions executable by the processor 302 may facilitate the system to calculate rater's rating of a user based on one of a number of acceptance, rejections or objections raised by other users on the rating provided by the user. In an embodiment, the system may calculate the rater's rating based on the number of acceptances occurred on the ratings provided by a user. The rater's rating may signify the genuineness or credibility of a user of a system in providing ratings to other users of the system. The rater's rating may play an important role for the users of the system to select a credible user for sharing/exchanging/selling/purchasing of any activity/service/product.

FIG. 4 illustrates exemplary structure of a database 400 for storing information corresponding to users of the system, in accordance with an embodiment of the present invention. The database 400 stores information corresponding to users of the system 108. In an embodiment, the users are registered members of the system 108 having profile thereon. Based on the registration, each user may be assigned with a unique user ID, as represented by user ID 402. For each user, the database 400 may store various information such as profile information, information corresponding to announcement, average public rating, profile points and the like, corresponding to the user.

As illustrated, the database 400 includes columns containing information such as profile information 404, announcement/request 406, average rating 408 and profile points 410. The database 400 may store such information for each user of the system 108. Further, as shown, row 412, row 414 and row 416 represent information corresponding to user 1, user 2 and user 3 of the system 108 respectively. Here, user 1, user 2 and user 3 represent user IDs. Further, for each user, the profile information 404 may include information corresponding to a profile of a user that may be provided by the user while registering with the system 108. For example, the profile information 404 may include, but is not restricted to, personal details, as represented by column 418, qualification and other information, as represented by column 420. The personal details may include, but are not restricted to, information like name, location, hobby, and the like. Similarly, qualification and other information may represent non-personal information such as, but are not restricted to, information corresponding to education, profession, industry, designation, and achievements of a user.

As shown, the personal details 418 (corresponding to the user 1) include name 'A', location 'L1' and hobby 'H1'. Similarly, the personal details 418 of the user 2 represents name 'B', location 'L2' and hobby 'H1' corresponding to the user 2. Again similar, name, location and hobby of the user 3 are represented by 'C', 'L3' and 'H3'. Here, it may be noted that hobby of the user 2 is same as the hobby of user 3, as shown by 'H1'. Further, each user of the system 108 may request or announce an activity, service or product that may be sharable or exchangeable with one or more other users of the system. As shown, column 406 (for requests or announcement posted by users of the system 108) includes information corresponding to activity, service or product and corresponding conditions (as represented by column 422 and column 424 respectively). Hereinafter, the activity, the service or the product may collectively be referred to as 'the resources'. The users may be facilitated to post a request or announcement for sharing or exchanging at least one of the resources with one or more other members (users) of the system. Hereinafter, the user who posts the request or announcement may be referred to as the 'first user' and remaining registered members (users) of the systems may be referred to as the 'second users'.

In an embodiment, a user (the first user) may post a request or announcement for all the second users (users other than the first user) of the system 108. In another embodiment, the first user may post a request for a specific group of people such as friends, relatives, business associates and the like. Each user may be facilitated to define one or more groups by adding specific people therein. Further, corresponding to each request or announcement, the first user may post one or more conditions for sharing/exchanging the at least one of the resources. The column 422 stores details corresponding to the sharable and/or exchangeable resources, for example, as shown, an exchangeable service such as 'House Keeping' may be posted by the user 1. This post is for inviting one or more second users for accepting the conditions (as shown by column 424) corresponding to exchangeable service i.e. 'House Keeping'. In an embodiment, the first user may make the conditions mandatory for accepting the posted sharable/exchangeable resource(s). In this embodiment, if a second user accepts the posted information corresponding to a resource (Service for house-keeping) then it is considered that the second user accepts all the conditions corresponding to the post. Further, in another embodiment, if the first user post an announcement for selling of resource and asks for bid for that particular resource, the second user may bid for the resource based on the announcement.

Further, as shown, a request posted by the user 1 for housekeeping with conditions (represented by column 424) is stored in the database 400. The conditions may include, but are not limited to, timeline required to perform the activity or service, date/day for performing the activity or the service, requirement of number of volunteers (second users) to perform or participate in the activity or service, and place of performing the activity. Specifically, as shown, the conditions posted by the user 1 for the 'house-keeping' activity/service include timeline such as 6 AM-7 PM, day for performing the activity is 'Sunday' and number of the second users required is '1'. Similarly, the service posted by the user 2 is 'Babysitting' with conditions representing the time, date and volunteer (Second users) requirement for the User 2. Specifically, the conditions posted by the user 2 include time as 5 AM-11 AM, day as 'Monday' and numbers of the second users required is '1' and the condition that second user required is a female for baby-sitting service. Again similar, the posting corresponding to the user 3 includes an activity 'Cricket' and corresponding conditions represent the time, date and volunteer (Second user) requirement to perform the posted activity. Specifically, as shown, the information stored corresponding to the user 3 includes activity as 'Cricket' and conditions include time to play cricket is 6 AM-10 AM, date of the activity 22 Feb. 2012, number and type of second users required is 10 males.

In one embodiment, the first user may be facilitated to post an activity, service, product (Herein, 'activity', 'service', and 'product' may collectively and intermittently be referred to as 'resource') or information for inviting specific set of second users (users of the system 108 other than the first user). For this, the first user may be facilitated to post an activity according to the type thereof. For example, the first user may post cricket as of the type 'sports activity'. In an embodiment, the second users having hobby or interest in 'sports' may directly search any post corresponding to 'sports' if the corresponding information is posted according to the 'type' of the activity by the first user. Further, this may enable the system 108 to search for suitable second users who are suitable and credible for the posted activity. For example, to search second users those may be interested in the posted service, in an embodiment, the system may determine the type of posted activity, service or product and accordingly, the system may search for suitable second users those may be interested in sharing or exchanging the resource (corresponding to the post) based on the hobby or activities of the second users. Further, if the profile of the second user includes information regarding his/her hobby as related to 'sports' then in an embodiment, the system 108 may suggest the first user about the second users as suitable for the activity/service corresponding to the post.

Further, the average public rating (as shown by column 408) represents an average rating received by each user from one or more other users (of the system 108) based on his/her previous experiences in sharing/exchanging resources or information. Further, as shown average public rating for the user 1, based on his/her past experiences with other users, is '3'. Herein, the rating '3' may be provided by the system 108 based on the individual ratings received, by the user 1, corresponding to sharing and exchanging of the resource or the information with other users. Here, it is understood (based on the aforementioned explanation) that the user 1 can receive individual rating by being either the first user (who posts the request/announcement) or one of the second users (other users of the system excluding the first user) of the system. The individual rating is explained further (as 'activity specific rating') in conjunction with FIG. 6. Similarly, average rating for the user 2 and the user 3, based on his/her past experiences with other users, is '5' and '1' respectively.

Furthermore, the FIG. 4 shows overall profile points (as depicted by column 410) that may be accumulated by a user from all the previous sharing/exchanging of activities, services or product. For example, if the user 1 earn '10' points by being the first user two times (considering '5' points credit for each time of sharing/exchanging) in previous experience of sharing/exchanging and further, if the user 1 loses '5' points by accepting any service offered by any other first user (considering debit of '5' points) then the overall profile point will be '5' (10-5) that may be referred to as 'overall profile points' for the user 1. In an embodiment, each registered user may have his/her account containing points earned by the user through sharing/exchanging activities/resources with other users of the system. These points may further be utilized by the user for requesting other users of the system for sharing/exchanging activities, services, products. Further, it may be appreciated by a person skilled in the art that the user may utilize the earned points in purchasing one or more activities, services or products. In other words, the user may sell the points for receiving the services or products from the other users. The points credit/debit corresponding to activities/services shared/exchanged is further explained in conjunction with FIG. 5.

Further, as shown in FIG. 4 of the invention, the activity/service/product corresponding to the column 422 posted by the user 1 includes service of house-keeping. Further, in condition, the user (first user) posted a requirement of one person who can take care of his/her house on the required date/day (mentioned as 'Sunday') between 6 AM-7 PM. Other users (second users) of the system, who can see the post, may respond to the post by accepting the posted service. Further, before responding to the post, the other users may check the average public rating of the first user to confirm his/her credibility. Accordingly, the other users may decide whether to accept the request posted by the user or not. Further, the first user may be notified if one or more of the second users accept the post. Accordingly, the first user may assign the service for house-keeping to one or more second users who accepted the posted request corresponding to the house-keeping. In an embodiment, one of the second users who accept the posted service by the first user will be assigned to complete the posted request. Further, the system 108 may send one or more reminders to the acceptor to complete the assigned work. In another embodiment, if multiple second users accept the request posted by the first user then the first user may be provided with the details of the all such second users who accept the posted service. The first user may then select one or more users from the second users who accepted request (hereinafter referred to as the 'request acceptor'). In an embodiment, the system 108 may further notify the second users about the action taken by the first user. For example, the system may inform the second users (request acceptor) about whether they have been accepted or rejected by the first user who posted the service request.

In an embodiment of the invention, the system may inform one or more second users about the announcement/request posted by the first user. The one or more second users may be selected by the system 108 based on the hobbies or personal information of the second user. For example, if the first user posts an activity corresponding to cricket in 'X' ground (venue) then the system may analyze the profile information, such as hobbies and location, of the second users. Based on analysis, if it is determined by the system that the profiles of one or more second users (users other than the first user) match suitably (hereinafter may be referred to as 'matched second users') with the activity and corresponding conditions posted by the first user then the system 108 may provide information corresponding to those matched second users to the first users. For example, based on the post of the first user, the system may analyze the hobby (of each second user) if matches with type of the activity i.e. 'sport' and location of the activity (as posted along with the activity by the first user) matches with the location of the second user then the system 108 may consider that second user as suitable for the post and accordingly the system 108 may provide information corresponding to the second user to the first user.

Further, in an embodiment, the first user may be facilitated with an option for restricting the post from publicizing to all the second users or for sending the request or post only to specified group of second users, then in an embodiment the system may search for a suitable second user from the specified group. In this embodiment, the system may not recommend other users of the system who are not the part of the specified group. Further, in another embodiment, the system may search suitable users from all the registered second users of the system and may send the recommendation to the first user based on the post and corresponding conditions. For example, if the first user has chosen an option for displaying the post only to the friends of the first user, then in this case if none of the friends of the first user accepted or responded for the post of the first user till some pre-fixed time, the system may start providing recommendations to the first user for some suitable second users. Further, it may be appreciated that in this case, the system 108 may not display information corresponding to the post (that has been restricted, by the first user, to the specific group of friends) to any of the second users to maintain the privacy of the matter posted by the first user.

FIG. 5 illustrates exemplary structure of a database 500 for storing information corresponding to users of the system, in accordance with another embodiment of the present invention. The database 500 stores information corresponding to users of the system 108. In an embodiment, the users are registered members of a system, such as the system 108, having profile thereon. Each user may register himself/or herself by creating a profile (an account) on the system. Based on the registration, each user may be assigned with a unique user ID, as represented by user ID 502. For each user, the database 500 may store various information such as profile information 504, information corresponding to announcement/acceptance 506, rating or review 508, earned points 510 and the like, corresponding to the user.

As explained earlier in conjunction with FIG. 4, corresponding to each registered user of the system, such as user 1, user 2 and user 3 (as represented by the column 512, column 514 and column 516 respectively), the profile information 504 may include, but is not limited to, personal details 518, qualification and other information 520. The profile information 504 may be provided by each user while registering with the system. The personal details 518 may include personal information such as name, location, hobby and the like. Further, qualification and other information 520 may include, but not limited to, educational information, professional information such as industry, experience, designation, achievements and the like.

Further, the announcement/acceptance 506 may include, but is not restricted to, information corresponding to sharable/exchangeable activity, service, product, information and the like that may be posted by a user of the system (hereinafter referred to as the 'first user') and information about status for the post, such as accepted, completed, pending and the like. Specifically, as shown, the information corresponding to announcement/acceptance 506 includes an activity/service/product 522, conditions 524 and a status 526. The activity/service/product 522 represents at least one of an activity, a product, a service or information that may be posted or announced by the first user for one or more other users of the system. Hereinafter, the one or more second users of the system may be referred to as the 'second users'. The first user may post or announce for sharing or exchanging an activity, service, product or information. Further, the conditions 524 may represent the conditions posted by the first user corresponding to the posted announcement/request. Further, the status 526 illustrates the status of the posted sharable/exchangeable activity/service/product/information. Specifically, the status 526 may include, but is not restricted to, 'completed', 'accepted', 'pending', and the like.

Specifically, as shown, the user 1, the user 2 and the user 3 have the names as 'A', 'B' and 'C', locations as 'L1', 'L2' and 'L3', and hobbies as 'H1', 'H1' and 'H2' respectively. Here, it may be noted that the hobby of the user 1 is same as the hobby of the user 2. Further, the column 522 shows the activity 'Bike riding' posted by the user 1. Further, the column 524 shows the conditions (posted by the user 1) corresponding to the 'Bike riding' such as time '6 AM-7 AM', Day as 'Sunday' for carrying out the activity, and number of persons required is '1'. Similarly, as shown, the user 3 has posted the service for 'Kid Care' and condition mentioned includes the time between 8 AM-7 PM corresponding to the service. Further, the user 2 has not posted any activity/service/product or information.

After posting an activity, a service, a product or an information by the user 1, in one embodiment, the system searches for one or more suitable second users by analyzing the profiles of all registered second users (other than the first user) of the system to determine a match between profile of each second user and the conditions corresponding to the post/announcement of the first user. In this embodiment, the system analyzes the location, qualification, hobby, activities, post (if any) and other profile information corresponding to the second users. Further, the system provides information about the determined suitable second users (corresponding to the post and associated conditions) to the first user. As shown, the hobby of the user 1 ('H1') is same as the hobby ('H1') of the user 2, the system may provide information about the profile of the user 2 to the user 1. For example, the hobby ('H1') may include travelling, biking or riding that may be matched with the activity 'Bike riding' posted by the user 1. Based on such matching, the system may search one or more suitable second users those can accept the post/announcement of the first user. Subsequently, the system may provide notification to the first user (the user 1) to inform him/her about the suitable second user (such as the user 2). Similarly, in an embodiment, the system may notify the suitable second user (the user 2) about the post of the first user (the user 1).

Further, in another embodiment, the user 1 may also be facilitated to search for one or more suitable second users relevant for the post/announcement. Furthermore, the user 1 may be facilitated to restrict the search to a particular group of people. For example, the first user (such as the user 1) may restrict the post for second users of a particular age group then the system may search the suitable second users of that particular age group. Also, the second users may search any such activity, service posted by the first user.

Further, on receiving the information about the post by the first user, the second users may accept the post of the first user. For example, if the user 2 likes to share the activity of 'bike riding' with the user 1 then the user 2 may choose an option to accept the activity. Further, the accepted activity may be carried out by the user 2 based on the conditions. Accordingly, the status corresponding to the post may be set as 'accepted' (as shown) in the profile of the user 2 and completed (As shown) in the profile of the user 1. Initially, if the post is not accepted by any of the second users then the status may be shown as 'pending'.

Based on the activity shared/exchanged by the first user and one or more second users, the first user and the one or more second users may provide rating to each other. If they liked the activity shared/exchange with each other, they can give more rating and if they don't like, they can give less or zero rating based on their experience in carrying out the activity or service. For example, considering rating from '1' to '5' where '5' being the highest and '1' being the lowest rating, the user 2 has given rating '5' to the user 1 based on his/her experience of sharing the bike riding with the user 1 and the user 1 has given rating '4' to the user 2 based on his/her experience with the user 2 (as shown). If the first user gets bad experience in sharing/exchanging any activity/service/product or feels that the second user (with whom the activity/service/product was shared by the first user) was not good or intellectual or like-minded then the first user may give bad/low rating. Further, the system may send periodic reminders to both the first user and one or more second users to provide ratings to each other corresponding to actual sharing/exchanging of the activity/service/product between the first user and the one or more second users.

In one way, the rating provided by a user shows his/her interest in sharing/exchanging the service/activity/product again with the same user. Also, the rating received by each user may be added to his/her previous ratings received from other users (for any such sharing/exchanging activity/service/product with the other users) to determine average rating of the user (as explained previously in conjunction with FIG. 4). The average rating of the user may be visible to all other users of the system through the user's profile. For example, if a user receives rating of '4', '2', '3', and '5' after sharing/exchanging four different activities/services or products with four different users, then, accordingly, the average rating of the user may be equivalent to '3.5' that may be made visible to all the users of the system.

Further, in an embodiment, an account (profile) of each registered user may be initialized with '0' points that may be increased or decreased based on sharing/exchanging/selling a particular activity/service/product posted by the first user. These points may be credited or debited from the user's account based on sharing/exchanging any activity/service/product. for example, if the first user announces a service for car sharing from one location to another and sets '5' credit points for the service then '5' points may be debited from an account of a second person who accepts the posted service of the first user and correspondingly, '5' points may be credited to the account of the first user for providing the service. In an embodiment, based on the status of activity, and date of performing the activity, and rating/review provided by the users associated with the performed activity, the system may determine whether the activity has actually been carried out (shared/exchanged) between the first user and the one or more second users of the accepted activity. Accordingly, the system may provide credit points to the users. For example, if the status of the post, corresponding to a service, is completed and the first user (who posted the service) and the second user (who accepted the service) have given ratings to each other then it may be determined that the activity has actually been performed by the users (the first user and the second user). Accordingly, the system may assign '+5' credit points to the first user and '−5' credit points to the second user. The '+5' credit points denote credit of '5' points to the first user's account and '−5' credit points denote debit of '5' points from the available points in the account of the user. Here, '5' points may be pre-set by the users before sharing/exchanging the activity/service/product.

Further, in an embodiment, the system may set minimum credit points based on type of activity/service/product and conditions. The type of activity/service/product may include, but is not limited to, recreational activity, riding, sports, and house exchange. For example, based on the type of activity, such as vehicle sharing, the system may set minimum '+5' as credit points for the first person who shares his/her vehicle and '−5' for the person who accepts sharing of the vehicle of the first user. Furthermore, in another embodiment, the first user may ask for bid from one or more second users for the post. The second users may bid based on their interest in the posted activity/service/product. Accordingly, based on the bid amount of each user and credibility of each user based on their profile, one or more second users may be selected for the posted activity/service/product. Additionally, the first user may ask a compensation amount that may be provided by the second users for sharing a vehicle. Further, based on the decided amount, the second user may provide some of his/her points to the first user. For example, if the second user is willing to accept a post for vehicle sharing (from one location to another) for some 'X' amount/month and amount 'X'='Y' points. Then the system may debit 'Y' points from the second user's account and may credit the 'Y' points in the account of the first user. In an embodiment, number of points (say 'Y') for some amount (say 'X') may be fixed by the system and in another embodiment, number of points for the amount may be decided manually by the first user and the second user.

As shown, the user 1 earns '+5' points and the user 2 is assigned with '−5' credit points for the completed activity i.e. 'Bike riding' (as shown). In an embodiment, such points, as earned by the first user and the second user may be a form of virtual money that may further be utilized in sharing/exchanging/selling of any activity/service/product with any other user of the system. Each user (first user or second user) may determine credibility of other user (first user or second user) before sharing/exchanging an activity/service/product/information and before setting credit points for any such activity/service/product/information. Further, the first and second users may determine the credibility of each other based on their profiles and rating/review.

Again similarly, as shown, the user 3 has posted a service for Kid care between 8 AM-7 PM. For this, the user 3 may first ensure about the credibility of any second user for assigning the service of 'Kid care'. The user 3 may be sure about the credibility of the second user by viewing the previous ratings (of the user 3) and experience in sharing/exchanging/handling such activity, before allowing the second user to handle the kid. Further, it is shown that the post of the user 3 is pending as the responsibility (activity) of kid care is not assigned to any second user and accordingly, there is no rating for the user 3 for this post and thus points earned corresponding to this post (of kid care) is zero ('0').

FIG. 6 illustrates exemplary structure of a database 600 for storing information corresponding to users of the system, in accordance with yet another embodiment of the present invention. The database 600 includes a list of first users and a list of second users. The first users are members of the system who post one or more requests for sharing/exchanging/selling an activity/service/product/information. The second users include all members of the system other than the first user. Further, the first user and the second user correspond to a particular post/announcement. In other words, the first user for one post may be a second user for any request posted by any other first user. Further, the system may search for one or more suitable second users, for a post, from the list of second users.

As shown in FIG. 6, the database 600 shows various requests posted by various users. Each user has a unique user ID, as represented by column 602 (of the database 600), that represents unique identification code of a user of the system. Further, profile information 604, and announcement/acceptance 606 are explained earlier in conjunction with FIGS. 4 and 5. An activity specific rating 608 represents rating/review provided to the second user who completes the specific active/service (posted by the first user). Further, the database 600 includes acceptor IDs 610 corresponding to each post that has been accepted by one or more second users. Specifically, the acceptor ID includes information corresponding to the second user who accepts the request posted by the first user. Furthermore, the database 600 shows a row 612, a row 614 and a row 616 corresponding to a user 1, a user 2 and a user 3 respectively.

The profile information column 604 of the database 600 represents personal details (as shown by column 618) and qualification and other information such as business details (as shown by the column 620) of the each user of the system. Specifically, the personal details corresponding to the user 1 includes name 'A', his/her location 'L1', and hobby 'H1'. Further, the qualification and other information includes qualification, professional, and other information as 'Q1' Similarly the user 2 has a name 'B', location 'L2', hobby 'H1' and qualification and other information as 'Q2'. Again similarly, the user 3 has name 'C' with location of performing the posted activity as 'L3', and having hobbies and qualification and other information as 'H2' and 'Q3' respectively.

Further, as shown Announcement/Acceptance 606 represents details of requests or announcements posted by the first users of the system. Further, the announcement/acceptance includes status information corresponding to acceptance of the posted request/announcement by one or more second users. Specifically, the announcement/acceptance 606 may include, but is not restricted to, information such as Activity/Service/Product sharing (represented by column 622), condition (as represented by column 624), and status corresponding to the posted request/announcement (a represented by the column 626). Specifically, the Activity/Service/Product sharing (as shown by the column 622) includes information that the first users may post/announce for sharing/exchanging with one or more second users. In an embodiment, the Activity/Service/Product sharing (as shown by the column 622) includes a type of announcement/post made by the first users of the system. Further, the condition (as shown in column 624) comprises the necessary conditions (corresponding to the request/announcement posted by the first user) that may need to be followed by one or more second persons (who accept the request) for carrying out one or more tasks associated with the post. The conditions may include, but are not limited to, at least one of type, time, location, compensation, security collateral or required skill level (of the second user who accepts the request/announcement associated with the post) corresponding to the sharable/exchangeable activity, service or product posted by the first user. Hereinafter, the second person who accepts the request/announcement, posted by the first user, may be referred to as the 'acceptor'). The conditions posted by the first user may or may not be negotiable based on the discretion of the first user.

Further, information corresponding to the status (as shown by column 626) represents whether the announcement or request posted by the first user is accepted, completed or pending by the second user. In an embodiment, request or announcement posted by the first user may have an 'expired' status in case where the date mentioned in the condition (column 624) is expired and none of the second users have accepted the request or the announcement.

As per FIG. 6, request posted by the User 1 is for housekeeping service. The conditions corresponding to the housekeeping service (as posted by the first user) represents the timeline (6 AM-7 PM) required to perform the housekeeping service, the date/day (Sunday) on which the housekeeping service is to be performed, and number of volunteers (second users) to perform or participate in the service. Further, status for the post corresponding to housekeeping represents that the post corresponding to housekeeping is 'completed'. Further, the acceptor ID for this post includes 'user 2' representing that the housekeeping service is completed as per the mentioned conditions by the user 2.

Similarly, the sharable/exchangeable activity posted by the user 2 is babysitting with conditions including time (5 AM-11 AM), day (Monday) and number and type of the required users (1 Female) for performing the babysitting. Further, the status corresponding to the post of the user 2 represents that the request or announcement made by the user 2 has been accepted (but not completed). Further, the acceptor ID, corresponding to the activity posted by the user 2, represents that the activity posted by the user 2 is accepted by the user 1.

As explained here above, the service (housekeeping) posted by the user 1 is accepted to be shared/exchanged by the user 2 (as depicted, the acceptor ID is 'user 2') and the activity/service (babysitting) posted by the user 2 is accepted to be shared/exchanged by the user 1 (as depicted, the acceptor ID is 'user 1'). Accordingly, in an embodiment, this represents an exchange of activity/service (housekeeping and babysitting) between the user 1 and the user 2. For example, the service posted by the user 1 is exchangeable with the service of babysitting posted by the user 2. In another embodiment, this represents individual sharing of the activities by both the user 1 and the user 2. For example, sharing of housekeeping service between the user 1 and the user 2 and sharing of the babysitting service between the user 1 and the user 2. Further, as shown (in row 614), the service/activity posted by the user 2 ('babysitting') is just accepted and not completed by the user 1 (as shown by the status and the acceptor ID), thus the activity specific rating (shown by cell 634) provided (by the user 2) to the user 1 is blank or nil. Furthermore, as shown (row 612), the service/activity posted by the user 1 ('housekeeping') is completed by the user 2, thus the activity specific rating provided by the user 1 to the user 2 is '5'. Such activity specific rating may be provided by the user 1 on completing the service (housekeeping) by the user 2. Thus, the column 608 for activity specific rating represents the rating that the first user provides to the second user. Such rating represents the experience of the first user (user 1) in sharing/exchanging the service/activity with the second user (user 2). For example, the rating of '5' may represent that the experience of the user 1 (with the user 2 who completed the service posted by the user 1) was good (considering '5' as highest rating for the housekeeping service, as completed by the user 2).

In an embodiment of the present invention, the system may analyze such activity specific rating provided by the first user to determine one or more suitable second users for any such future activity/service posted by the same first user. For example, if the first user provides good rating of '5' to a second user for completing an activity (such as babysitting) then next time if the same first user posts the same activity, the system provide the reference of the same second user who received the good rating ('5') (from the first user) earlier for completing the same activity. In an embodiment, the system may define a common range of rating (such as '1' to '5') for sharing/exchanging all type of activities/service/product. In another embodiment, the system may define a range of rating based on the type of service posted by the first user. Yet in another embodiment, the system may facilitate the first user to pre-set the range of rating while/before posting a request/announcement corresponding to the activity/service/product.

Further, as shown, the activity posted by the user 3 is 'cricket' and of type 'sport activity'. Further, the conditions provided by the user 3 include the time (6 PM-10 PM), date (22 Feb., 2012) and required number and type of second users for the activity ('cricket') i.e. 11 Males. Further, the status of this activity ('cricket') is shown as 'pending' denoting that the activity ('cricket') and the corresponding conditions (posted by the User 3) is not accepted by any user of the system Further, based on the date of the activity (22 Feb. 2012), it may be determined by the system that the activity is expired or not. Accordingly, the status of the post may be shown as 'pending' or 'expired'. Further, as the activity posted by the user 3 is pending (as per the status shown) and not accepted by any of the second users of the system (as shown by the cell 632, the acceptor ID for the activity 'cricket' is blank), the activity specific rating is not provided (by the user 3) to any of the second user. Thus, the activity specific rating for the activity 'cricket' posted by the user 3 is shown (by the cell 630) as blank or nil.

The rating received by each second user depicts his/her credibility of performing/completing the activity/service/product shared or exchanged by the first user. For example, users (such as the first users who post the request/announcement) of the system may give low ratings or negative ratings to other users (such as second users who accepts/completes the requested/announced activity) in case the second users either have not performed well or the work done by the second users was not satisfactory. In addition, negative ratings can be given to the users in case of their bad behavior, fraud, theft or violence created while performing or participating in any of the accepted activity posted by any user. Similarly, the second user may provide rating to the first user after completing the activity/service shared/exchanged/assigned by the first user based on his/her experience in dealing with the first user. In an embodiment, low rating of any user may not be appreciable by other users of the system as the low rating of a user shows less credibility of the user. Consequently, the low rated users of the system may get lesser responses, for their posts/announcements, from other users in comparison to the users having higher or maximum rating value.

FIGS. 7A, 7B, and 7C illustrate various profile views of a user of a system, such as system 108, in accordance with an embodiment of the present invention. More particularly, FIGS. 7A, 7B and 7C illustrate exemplary profile views 702, 712 and 716 of the user 'xyz' for providing information corresponding to the social status of the user. The social status of a user may include, but not restricted to, public rating, rater's rating and recommendations. Referring to the FIG. 7A of the invention, the profile view 702 provides credibility information corresponding to the user 'xyz' of the system 108. The credibility information in profile view 702 may be populated by other users of the system. In an embodiment, the users of the system may have access to the credibility information of the user 'xyz' through profile. The other users of the system 108 may utilize the credibility information of the user 'xyz' to determine whether xyz can be trusted or not for sharing/exchanging of activity/service/product. Further, the profile view 702 may include an area 704 for display picture, of the user, that may be placed in the area 704 by the user. In an embodiment, if the user does not place or set any display picture, the system may set a default display picture of the user. As shown, the profile view 702 displays a default picture (in the area 704) of a user 'xyz'.

Further, the profile view 702 of the user 'xyz' may be accessible to all other users of the system 108. The other users of the system may search for the user xyz's profile by suitable means provided by the system for searching a user. The other users of the system may also visit the profile view 702 of the user 'xyz' through any announcement (shareable/exchangeable activity/service/product) posted by the user 'xyz' on the system. The other users of the system 108 may visit the profile view 702 of the user 'xyz' for determining the performance of the user 'xyz' corresponding to participation in sharable/exchangeable activities/services/products.

Furthermore, the profile view 702 may also reveal the genuineness of the user 'xyz' in rating other users based on the performance in sharable/exchangeable activities/services/products. In addition the profile view 702 of the user 'xyz' may provide information corresponding to those users (hereinafter referred to as 'recommenders') of the system who recommended the user 'xyz'. The recommendation may be visible on the profile view 702 of the user 'xyz' to all other users of the system. The recommendation may correspond to a positive experience shared by the recommenders with the user 'xyz' or may additionally correspond to the excellent performance of the user in the sharable/exchangeable activities/services/products. The recommendation may further correspond to the compliance of the recommenders to promote the user 'xyz' to other users of the system.

Moreover, the profile view 702 may include another area 706 (hereinafter referred to as 'public rating 706') for displaying public rating of the user 'xyz'. The public rating 706 represents an average rating received by each user from one or more other users (of the system 108) based on his/her previous experiences in sharing/exchanging resources or information. Moreover, the public rating 706 is explained previously in conjunction with FIG. 4 of the invention. In an embodiment, the public rating may be represented in terms of stars, signifying 1 star as the lowest public rating and 5 stars as the highest rating. The process of converting public rating in terms of stars is explained further in conjunction with FIG. 7B. The public rating 706 of a user of a system may be a significant factor for other users of the system to conclude credibility of the user.

Additionally, the profile view 702 may include an area 708 (hereinafter referred to as 'rater's rating 708') for displaying ratings provided to a user by other users as a rater. Specifically, the rater's rating 708 represents credibility of a user as a genuine rater who rates other users based on the performance or experience in the shared/exchanged activity/service/product. The rater's rating 708 is explained further in conjunction with FIG. 7C of the invention. In an embodiment, the rater's rating may be represented in terms of stars (unlike public rating 706), signifying 1 star as the lowest rater's rating and 5 stars as the highest rating. The process of converting rater's rating in terms of stats is explained further in conjunction with FIG. 7C. The rater's rating 708 of a user of a system may be a significant factor for other users of the system to conclude credibility of the user.

Further, the profile view 702 may include an area 710 (hereinafter referred to as 'recommendations 710') for displaying a number of recommendations received by the user from other users of the system. The recommendations may be received by other users of the system, as a token of appreciation for the work done or experience shared in sharing/exchanging of activity/service/product. The recommendations 710 of a user of a system may be a significant factor for the other users of the system to conclude credibility of the user 'xyz'. In an embodiment, the profile view 702 may enable other users of the system to access a list of users those have recommended the user 'xyz'.

Furthermore, the profile view 702 may enable other users of the system to access profile views of those users of the system who have recommended the user 'xyz'. Furthermore, the profile view 702 may enable the other users of the system to communicate with those users of the system who have recommended the user 'xyz'. In an embodiment, the communication may correspond to queries related to credibility of the user 'xyz'. The users may also query corresponding to behavior and/or performance of the user during the share/exchange of activity/service/product. The process involved in adding a recommendation to a user of a system is explained further in conjunction with FIG. 10 of the invention.

In an exemplary embodiment, if the user 'xyz' announced requirement of a legal advisor on the system, then any user (hereinafter referred to as 'legal advisor') of the system who is a legal advisor may be willing to work with the user 'xyz'. The legal advisor may show interest to work with the user or may prefer to confirm credibility of the user 'xyz' before showing interest to the user 'xyz'. The legal advisor may therefore prefer to visit the profile view 702 of the user 'xyz' to know the details of the user 'xyz'. The details may include personal details, business details and credibility information. The personal details may include but not restricted to, name, location, hobby, and photograph of the user 'xyz'. The business details may include, but not restricted to, the employer details, work profile, office location, and work experience. The legal advisor may create a perception about the user 'xyz' from the details that may ease him/her to determine whether to work with the user 'xyz' or not.

Further, the legal advisor may prefer to visit the profile view 702 of the user 'xyz' to know the social status (at system) of the user 'xyz'. The social status (credibility information) of the user 'xyz' may be a determining factor for the legal advisor to determine if he/she wants to work with user 'xyz' or not. The social status may include the public rating 706 of the user to confirm whether the user is good to work with or not. More details corresponding to public rating 706 is explained further in conjunction with FIG. 7A of the invention. The public rating 706 may be a deciding factor for the legal advisor to confirm whether the experience of working with the user 'xyz' will be good or not.

Further, the social status may include the rater's rating 708 to conclude the genuineness of the user 'xyz' in appreciating the work of other users. The rater's rating 708 may be a deciding factor for the legal advisor to confirm whether the user will appreciate his/her work or not. More details corresponding to public rating 706 is explained further in conjunction with FIG. 7A of the invention. The legal advisor may not appreciate to work with user 'xyz' if the rater's rating 708 of the user 'xyz' is low. The legal advisor may even not appreciate to work with the user 'xyz' if the public rating 706 of the user 'xyz' is good but the rater's rating 708 of the user 'xyz' is not good. In addition, the social status may include the recommendations 710 to conclude that how many users of the system believes that the user 'xyz' is worth to work with. The legal advisor may build his/her perception about the user based on the social status of the user 'xyz' at the system. The legal advisor may even contact with the recommenders of the user 'xyz' to know more about the user 'xyz'. The profile view 702 of the user 'xyz' may provide access to the legal advisor for profile views of the recommenders of the user 'xyz'. The legal advisor may therefore contact with the recommenders to know more about the user 'xyz'.

Referring to FIG. 7B of the invention, the profile view 712 provides information corresponding to the public rating 706 of the user 'xyz'. The public rating 706 exemplifies 4 stars. In an embodiment, the public rating 706 may have maximum of 5 ratings (i.e. 5 stars) and a minimum of 1 rating (i.e. 1 star). Zero rating may signify absence of rating. Maximum ratings may signify excellence and minimum rating may signify mediocrity. The pubic rating 706 of user 'xyz' may be significant for other users to prejudice corresponding to the behavior or work performance of the user 'xyz'.

Further, the profile view 712 may be a sub view of the profile view 702 (as shown in FIG. 7A). The profile view 702 may redirect a user of a system to profile view 712 (as shown in FIG. 7B) to provide more details corresponding to the public rating 706. The more details may include, but not restricted to, ratings provided by other users (those have worked with the user 'xyz') of the system that resulted in the formation of overall public rating of the user 'xyz'. The more details may help other users of the system to make a better perception corresponding to performance of the user in various activities, and hence, corresponding to the user as a person.

Furthermore, the profile view 706 may include an area 714 (hereinafter referred to as 'detailed rating 714') for exemplifying detailed data collected by the system from other users (those have worked with the user 'xyz') of the system. The detailed data may include, but not restricted to, count of number of users those have rated the user 'xyz'. The ratings may be categorized into five different parts. The five different parts may include, but not restricted to, excellent, good, average, below average, and bad. More details corresponding to different parts of the ratings are provided further in conjunction with FIG. 11A. The count of number of users may also be categorized into count of those users, who have rated the user 'xyz' as excellent, as good, as average, as below average, and as bad. The detailed rating 714 of the user 'xyz' may be used to calculate the overall public rating of the user 'xyz'.

The public rating 706 of the user 'xyz' may be calculated from a pre-set algorithm of the system. The calculation of public rating is explained previously in conjunction with FIG. 4 of the invention. In another embodiment of calculation of the public rating 706, the pre-set algorithm may based on the count of number of users those have rated the user 'xyz'. The system may analyze the maximum count of users in any of the five categories to determine the maximum voted category for the user 'xyz'. For example, as shown in FIG. 7B, the maximum number of count of users falls in 'Good' category, i.e. 1211 users have rated the user 'xyz' as 'Good'. Therefore, the user xyz's overall public rating is determined as 'Good' i.e. 4 stars. More details corresponding to calculation of overall public rating is explained further in detail with conjunction to FIG. 8 of the invention.

Referring to FIG. 7C of the invention, the profile view 716 provides information corresponding to the rater's rating 708 of the user 'xyz'. The rater's rating 706 exemplifies 5 stars. In an embodiment, the rater's rating 708 may have maximum of 5 rating (i.e. 5 stars) and a minimum of 1 rating (i.e. 1 star). Zero rating may signify absence of ratings. Maximum ratings signify excellence and minimum rating signify mediocrity. The rater's rating may be significant for a user to conclude genuineness of the user in appreciating/rating other users of the system. Prior to exchanging/sharing of any activity/service/product with a user of the system, all users of the system may appreciate to check the rater's rating of the user to confirm that the user is genuine in rating/appreciating other users or not. Thus, the rater's ratings may play an important role in determining whether a user may accept to work with another user of the system or not.

Further, the profile view 716 may be a sub view of the profile view 702 (as shown in FIG. 7A). The profile view 702 may redirect a user of a system to profile view 716 (as shown in FIG. 7C) to provide more details corresponding to the rater's rating 706. The more details may include, but not restricted to, rater's ratings provided by other users (users those have been rated by the user 'xyz') of the system that resulted in the formation of overall public rating of the user 'xyz'. The details may help other users of the system to make a clear conclusion corresponding to habit of the user in various activities, and hence, corresponding to the user as a person.

Furthermore, the profile view 716 may include an area 718 (hereinafter referred to as 'detailed rater's rating 718') for exemplifying detailed data collected by the system from other users of the system. The detailed data may correspond to the feedbacks of the users on the ratings provided to them by user 'xyz'. The feedbacks of the users may correspond to the objections or rejections passed on to the ratings provided by the user 'xyz'. The feedbacks may further include, but not restricted to, total count of number of users (hereinafter referred to as 'rating receivers') rated by user 'xyz', total count of ratings objected by the rating receivers, total count ratings accepted by the rating receivers, total count of ratings rejected by the rating receivers.

The rater's rating 708 of the user 'xyz' may be calculated based on a pre-fixed algorithm. In an embodiment, the pre-fixed algorithm may depend upon the percentage of rating acceptance (hereinafter referred to as 'ratings accepted') by the rating receivers. For example, if the percentage of ratings accepted is more than 90% then the raters rating of the user 'xyz' may be 5 stars, if the percentage of ratings accepted is between 70-90% then the raters rating of the user 'xyz' may be 4 stars, if the percentage of ratings accepted is between 50-70% then the raters rating of the user 'xyz' may be 3 stars, if the percentage of ratings accepted is between 30-50% then the raters rating of the user 'xyz' may be 2 stars, if the percentage of ratings accepted is less than 30% then the raters rating of the user 'xyz' may be 1 star. Similarly, in FIG. 7C of the invention, the rater's rating 708 is calculated to be 5 starts based on the calculation of the data received from 718.

In another embodiment of the invention, the pre-fixed algorithm may depend upon the percentage of rating objection (hereinafter referred to as 'ratings objected') by the rating receivers. For example, if the percentage of ratings objected is more than 80% then the raters rating of the user 'xyz' may be 1 star, if the percentage of ratings objected is between 60-80% then the raters rating of the user 'xyz' may be 2 stars, if the percentage of ratings objected is between 40-60% then the raters rating of the user 'xyz' may be 3 stars, if the percentage of ratings objected is between 20-40% then the raters rating of the user 'xyz' may be 4 stars, if the percentage of ratings accepted is less than 20% then the raters rating of the user 'xyz' may be 5 stars.

In yet another embodiment of the invention, the pre-fixed algorithm may depend upon the percentage of rating rejection (hereinafter referred to as 'ratings rejected') by the rating receivers. For example, if the percentage of ratings rejected is more than 50% then the raters rating of the user 'xyz' may be 1 star, if the percentage of ratings rejected is between 30-50% then the raters rating of the user 'xyz' may be 2 stars, if the percentage of ratings rejected is between 20-30% then the raters rating of the user 'xyz' may be 3 stars, if the percentage of ratings objected is between 10-20% then the raters rating of the user 'xyz' may be 4 stars, if the percentage of ratings rejected is less than 10% then the raters rating of the user 'xyz' may be 5 stars.

FIG. 8 illustrates exemplary database 800 for storing information corresponding to social activities performed by a user of a system, such as system 108, in accordance with an embodiment of the present invention. The database 800 may include information corresponding, but not limited to, number of recommendations received by a user from other users of the system 108 based on the shareable/exchangeable activity/service/product. Further, the database 800 may also include details of individual ratings provided by the users to a specific user based on the shareable/exchangeable activity/service/product.

Specifically, the database 800 includes information such as a user ID, as represented by column 802, for each user of the system. The user ID may represent unique identity code for each user. In an embodiment, the system may identify each user as a unique member thereof through the unique ID. The user ID may be assigned to each user at the time of registration with the system. The system may utilize the user ID to store a variety of information in the database corresponding to each user of the system.

Further, the database 800 represents information such as number of social activities performed/participated (hereinafter referred to as 'total social activities'), as represented by column 804, for each user of the system. The total social activities performed or participated by a user of the system may include a sum of total number of shareable/exchangeable activities/services/products offered by the user to other users of the system and total number of shareable/exchangeable activities/services/products received by the user from other users of the system. Total social activities performed or participated by a user of the system may be used as a determining factor by the system to determine potential users of the system. The potential users may correspond to the users who are socially very active through the system. The system may target its potential users to provide them with more of the promotional offers or advertisements.

Furthermore, the database 800 represents information such as individual ratings, as represented by column 806, for each user of the system. The individual ratings may include a number of times a user has been rated out of five by other users of the system based on the performance or participation of the user in shareable/exchangeable activities/services/products. The individual ratings of the database 800 may help the system to calculate the public rating of the concerned user. The individual ratings may also be used by other users of the system to conclude the credibility of the user. The users may have a more detailed idea about a user of the system by analyzing the individual ratings of the user rather than just by relying on the public rating of a user.

In addition, the database 800 represents information such as number of recommendations (hereinafter referred to as 'recommendations') received by a user, as represented by column 808, for each user of the system. The recommendations may correspond to the number of users those have rated the user based on the performance or participation of the user in shareable/exchangeable activities/services/products, and appreciated the performance or behavior of the user by adding a recommendation for the user. The recommendation may be valuable information for other users of the system. The other users of the system may be more concerned about the number of recommendations a user has in comparison for the public rating of the user. In an embodiment, the more number of recommendation a user have in his/her profile, the more of credibility value the user may have.

Further, the database 800 represents information such as recommenders, as represented by column 810, for each user of the system. The recommenders may be the users of the system those have recommended a particular user. The column 810 may store a unique identity code of the recommenders, such as user ID 802 of the recommenders. In an embodiment, the column 810 may have more than one user ID of the recommenders. The recommender column may allow the system to enable profile viewers of a user to navigate to the profile views of the recommenders to communicate with the recommenders to know more about the user. The details of recommendation and recommenders are explained previously in conjunction with FIG. 7A of the invention.

Also, the database 800 represents information such as public rating, as represented by column 812, for each user of the system. The column public rating 812 may be calculated from the individual ratings 806 provided by the users of the system to a particular user of the system. The public rating may be calculated by the system by determining the maximum ratings received by the user in between 1 to 5. If the maximum number of individual ratings received by a user falls in '5' then the public rating of the user may be '5 star'. Similarly, if the maximum number of individual ratings received by a user falls in '1', then the user may have a public rating of '1 star'.

Specifically, as shown in the FIG. 8 of the invention, a user with the user ID 201 (hereinafter referred to as 'user 201') has performed or participated in 124 social activities, and therefore has rated 124 times to the users of the system. In an embodiment, 124 users may not be unique users. A user may have rated a same user more than one time. Further, column 806 illustrates that the user 201 has received a '5' rating 63 times from the users of the system. Therefore, the maximum individual rating received by the user 201 is '5', and hence, the public rating 812 of the user 201 is '5'. Furthermore, column 808 illustrates that the user 201 has received recommendations from 5 users of the system. In an embodiment of the invention, the 5 recommenders of the user 201 may be from the users those have provided '5' as individual rating to the user 201. Further, in the embodiment, the 5 recommenders of the user 201 may be from the users those have provided '4' as individual rating to the user 201. Furthermore, the system 108 may not allow the users those have rated the user 201 less than '4' to recommend the user 201 to other users of the system.

Further, as shown in the FIG. 8 of the invention, a user with the user ID 202 (hereinafter referred to as 'user 202') has performed or participated in 77 social activities, and therefore has rated 77 times to the users of the system. Further, column 806 illustrates that the user 202 has received a '5' rating 12 times from the users of the system. In addition, column 806 illustrates that the user 202 has received a '4' rating 60 times from the users of the system. Therefore, the maximum individual rating received by the user 202 is '4', and hence, the public rating 812 of the user 202 is '4'. Furthermore, column 808 illustrates that the user 202 has received recommendations from two users of the system. Column 810 provides the unique user ID of the two users of the system those have recommended the user 202 of the system.

Furthermore, as shown in the FIG. 8 of the invention, a user with the user ID 203 (hereinafter referred to as 'user 203') has performed or participated in 28 social activities, and therefore has rated 28 times to the users of the system. Further, column 806 illustrates that '9' users out of 28 users have provided '5' individual rating to the user 203, '9' users out of 28 users have provided '4' individual rating to the user 203, and '9' users out of 28 users have provided '5' individual rating to the user 203. In such condition, the system may either select the highest rating for the user i.e. '5' ratings or may select the lowest rating i.e. '3' ratings. As shown in the figure, the system has selected the highest rating for the user 203.

FIG. 9 illustrates exemplary database 900 for storing information corresponding to rater's rating of a user of a system, such as system 108, in accordance with an embodiment of the present invention. The database 900 may include information corresponding, but not limited to, number of objections and rejections raised on the ratings provided by a user of the system 108 to another user of the system 108 based on the shareable/exchangeable activity/service/product. Further, the database 900 may also include details of number of users rated by a user of the system 108 based on the participation or performance of another user of the system 108 in the shareable/exchangeable activity/service/product.

Specifically, the database 900 includes information such as a user ID, as represented by column 902, for each user of the system. The user ID may represent unique identity code for each user. In an embodiment, the system may identify each user as a unique member thereof through the unique ID. The user ID may be assigned to each user at the time of registration with the system. The system may utilize the user ID to store a variety of information in the database corresponding to each user of the system.

Further, the database 900 represents information such as number of users (hereinafter referred to as 'rated users') rated by a particular user, as represented by column 904, for each user of the system. The rated users may correspond to the users of the system those have shared or exchanged any activity/service/product with the user. The user may have rated the rated users based on the performance or participation of the rated users in the activity/service/product. The system 108 may allow the rated users to provide a feedback to the ratings received by them. The feedback may include acceptance or objections on the ratings received from the user. The system may then calculate the rater's ratings of the user from the feedback provided by the rated users.

Furthermore, the database 900 represents information such as number of ratings accepted (hereinafter referred to as 'accepted ratings') by the users of the system from a particular user, as represented by column 906, for each user of the system. The accepted ratings may include the ratings those were provided by the user to other users of the system and were not rejected by the system. The accepted ratings may also include the ratings those were initially objected by the other users of the system but accepted in later stages. The system may utilize the accepted ratings of a user to calculate the rater's rating of the user. More number of accepted ratings may result in higher rater's ratings. Similarly, less number of accepted ratings may result in lower rater's ratings. Details of determining rater's rating are explained previously in conjunction with the FIG. 7C of the invention.

In addition, the database 900 represents information such as number of ratings objected (hereinafter referred to as 'objected ratings') by the users of the system from a particular user, as represented by column 908, for each user of the system. The objected ratings may include the ratings those were received by the rated users and were objected thereto. The objected ratings may be processed by the system. The processing may include determination of whether to accept or reject the objection raised by the rated users. The system may use any pre-set algorithm for determining the acceptance or rejection of the objections raised by the rated users. The rated users may further object on the decision made by the system 108. In an embodiment, the objected ratings also include the further objections raised by the rated users on the decision made by the system 108. Further, the system may utilize the objected ratings of a user to calculate the rater's rating of the user. More number of objected ratings may result in less number of rater's ratings. Similarly, less number of objections may result in higher rater's ratings. Details of determining rater's rating are explained previously in conjunction with the FIG. 7C of the invention.

Further, the database 900 represents information such as number of ratings rejected (hereinafter referred to as 'rejected ratings') by the users of the system from a particular user, as represented by column 910, for each user of the system. The rejected ratings may include the ratings that were received and objected by the rated users and then rejected by the system 108. Further, the system may utilize the rejected ratings of a user to calculate the rater's rating of the user. More number of rejected ratings may result in less number of rater's ratings. Similarly, less number of rejections may result in higher rater's ratings. Details of determining rater's rating are explained previously in conjunction with the FIG. 7C of the invention.

Also, the database 900 represents information such as rater's rating, as represented by column 912, for each user of the system. The column rater's rating 912 may be calculated from percentage of one of the accepted ratings, objected ratings, or rejected ratings. In an embodiment, if the rater's rating of a user is to be calculated based on accepted ratings then the percentage of accepted ratings is required to be calculated. Further, if the percentage of accepted ratings is calculated to be more than 80% then the rater's rating of the user may be 5 stars, if the percentage of accepted ratings is calculated to be between 60-80% then the rater's rating of the user may be 4 stars, if the percentage of accepted ratings is calculated to be between 40-60% then the rater's rating of the user may be 3 stars, if the percentage of accepted ratings is calculated to be between 20-40% then the rater's rating of the user may be 2 stars, if the percentage of accepted ratings is less than 20% then the rater's rating of the user may be 1 star. More embodiments corresponding to calculation of rater's ratings are explained previously in conjunction with the FIG. 7C of the invention.

Specifically, as shown in the FIG. 9 of the invention, a user with the user ID 201 (hereinafter referred to as 'user 201') has performed or participated in 124 social activities, and hence has rated 124 times to the users of the system as shown in column 904. In an embodiment, 124 users may not be unique users. A user may have rated a same user more than one time. Further, column 906 illustrates that the 124 ratings provided by the user 201 to other users of the system has been accepted 100 times by the rated users. Percentage of rating acceptance for user 201 is above 80% i.e. (100/124)*100=80.6%. Therefore, as shown in column 912 of the FIG. 9, the rater's rating of the user 201 is '4 star'.

The column 908 represents that the 124 ratings provided by the user 201 has been objected 84 times by the rated users. The number of objections made on the ratings provided by a user may depict the genuineness of the user in providing ratings to other users of the system. The other users of the system may use the information to form a perception corresponding to a user and may also use the information to determine whether they are interested to perform or participate in any shareable/exchangeable activity/service/product with the user or not. Further, the number of objections raised by the rated users may or may not be accepted by the system. The system may use its own pre-fixed algorithm to determine whether to accept or reject a particular objection based on various parameters. In an embodiment, the parameters may be the rater's ratings or public ratings of the users. More details corresponding to the acceptance or rejection of objection by the system is explained further in conjunction with the FIG. 12 of the invention.

In case of acceptance of an objection raised by a rated user, the ratings provided by the rater may be rejected and may not be added into public rating of the rated user. Further, the rejection of the rating provided by the user may require updating the rater's rating of the user (rater). In case where the objection raised by a rated user is rejected by the system, the rated user may object to the system's decision. The system may then pass on the case to the rating agencies. The rating agencies may be a part of the system that deals with the conflicts in the ratings. More details corresponding to the rating agencies are explained further in conjunction with FIG. 12 of the invention. The decision of the rating agencies may be considered as the ultimate decision. In an embodiment, the system may not allow the users to challenge the decision of the rating agencies.

The column 910 represents that the 124 ratings provided by the user 201 has been rejected 24 times by the system after receiving 84 objections from the rated users. The number of rejections made by the system on the ratings provided by a user (rater) to other users may depict the genuineness of the user in providing ratings to other users of the system. Lesser rejections may depict more genuineness of a user (rater) and similarly, more rejections may depict lesser of genuineness in the user (rater). The other users of the system may use the information to form an opinion corresponding to a user and may also use the information to determine whether they are interested to perform or participate in any shareable/exchangeable activity/service/product with the user or not.

Further, as shown in the FIG. 9 of the invention, a user with the user ID 202 (hereinafter referred to as 'user 202') has performed or participated in 77 social activities, and hence has rated 77 times to the users of the system as shown in column 904. In an embodiment, 77 users may not be unique users. A user may have rated a same user more than one time. Further, column 906 illustrates that the 77 ratings provided by the user 202 to other users of the system has been accepted 07 times by the rated users. Percentage of rating acceptance for user 202 is below 10% i.e. (07/77)*100=09.09%. Therefore, as shown in column 912 of the FIG. 9, the rater's rating of the user 201 is '1 star'.

The column 908 represents that the 77 ratings provided by the user 202 has been objected 70 times by the rated users. The data shows that the rated users were not satisfied with the ratings provided by the user (rater). Therefore, any user who wants to initiate any shareable or exchangeable activity/service/product may not appreciate to work with user 202. Further, the column 910 represents that the 77 ratings provided by the user 202 has been rejected 70 times by the system after receiving 70 objections from the rated users. Here, the numbers of rejections made by the system on the ratings provided by a user (rater) are equal to the number of objections raised by the rated users. This depicts that the user (rater) has a record of not being genuine in rating other users of the system and hence is not a reliable user. In addition, the rater's rating of the user 202 is also the lowest. Therefore, users of the system may not appreciate to work with the user 202.

Further, as shown in the FIG. 9 of the invention, a user with the user ID 203 (hereinafter referred to as 'user 203') has performed or participated in 71 social activities, and hence has rated 71 times to the users of the system as shown in column 904. In an embodiment, 71 users may not be unique users. A user may have rated a same user more than one time. Further, column 906 illustrates that the 71 ratings provided by the user 203 to other users of the system has been accepted 51 times by the rated users. Percentage of rating acceptance for user 203 is above 70% i.e. (51/71)*100=71.83%. Therefore, as shown in column 912 of the FIG. 9, the rater's rating of the user 203 is '3 star'.

The column 908 represents that the 71 ratings provided by the user 203 has been objected 44 times by the rated users. The data shows that most of the rated users were not satisfied with the ratings provided by the user (rater). Therefore, any user who wants to initiate any shareable or exchangeable activity/service/product may or may not appreciate to work with user 203. Further, the column 910 represents that the 71 ratings provided by the user 203 has been rejected 20 times by the system after receiving 44 objections from the rated users. Here, the numbers of rejections made by the system on the ratings provided by a user (rater) are approximately half of the number of objections raised by the rated users. This depicts that the user (rater) has a record of being approximately 50% genuine in rating other users of the system. In addition, the rater's rating of the user 203 is also average i.e. '3'. Therefore, based on the discretion of the users, the users may or may not appreciate to work with the user 203.

FIGS. 10A, 10B, and 10C illustrate various profile views of a user of a system, such as system 108, in accordance with an embodiment of the present invention. More particularly, FIGS. 10A, 10B and 10C illustrate exemplary profile views 1002, 1016 and 1024 of the user (hereinafter referred to as 'user X') where the user provides 'excellent' rating to some another user (hereinafter referred to as 'user Y'). Referring to the FIG. 10A of the invention, the profile view 1002 illustrates an embodiment of the invention where the system 108 prompts the user X to rate user Y. In an embodiment, the rating may be provided by the user X based on the experience shared with the user Y for the duration of the sharing/exchanging of activity/service/product.

Further, the profile view 1002 may provide certain options to the user X that may help the user X to select a suitable rating to rate the performance/behavior of the user Y during the shared/exchanged service/product/activity. The options provided by the system may correspond to the numeral ratings, i.e. each option provided by the system may refer to a numeral rating. For example, option 1004 represents excellent rating and thereby may refer to '5 star' rating, similarly option 1006 may represent '4 star' rating, option 1008 may represent '3 star' rating, option 1010 may represent '2 star' rating, and option 1012 may represent '1 star' rating.

Furthermore, the user X may select option 1004, in case, if the user X founds excellence in the user Y's performance/behavior during the sharing/exchanging of the activity/service/product and is also willing to recommend the user Y. The recommendation may be to all other users of the system or may be to specific users of the system. Moreover, the user X may rate the user Y based on the behavior per se of the user Y. In an embodiment, the user X may not like the performance or participation of the user Y but may appreciate the time shared with the user Y and hence may rate the user Y as excellent user. In another embodiment, the user X may not like the behavior of the user Y but may appreciate the performance of the user Y and hence may rate the user Y as excellent user. In yet another embodiment, the user X may even like the performance as well as behavior of the user Y and hence may rate the user Y as excellent user.

Option 1006 may be selected by the user X, in case, the user X is willing to work again with the user Y and believes that the behavior/performance of the user Y was good but could have been better. Therefore, the user X may select good rating for the user Y and may not select excellent rating. Further, in an embodiment, the user X may rate the user Y as good user, in case, the user X appreciates the performance of the user Y but believes that the performance was not at a level of excellence. In another embodiment, the user X may rate the user Y as good user, in case, the user X appreciates the behavior of the user Y but believes that the user Y could have behaved even better. In yet another embodiment, the user X may even like the performance as well as behavior of the user Y but believes that the performance or behavior was not as perfect as was expected.

Option 1008 may be selected by the user X, in case, the user X is satisfied with the behavior/performance of the user Y but felt that the behavior/performance was not up to a mark of appreciation. Therefore, the user X may not be willing to provide good or excellent rating to the user Y and may select the average rating for the user Y. Further, in an embodiment, the user X may rate the user Y as good user, in case, the user X appreciates the performance of the user Y but believes that the performance could have been better. In another embodiment, the user X may rate the user Y as good user, in case, the user X appreciates the behavior of the user Y but believes that the user Y could have been behaved even better. In yet another embodiment, the user X may even like the performance as well as behavior of the user Y but believes that the performance or behavior was not as perfect as was expected.

Option 1010 may be selected by the user X, in case, the user X is not willing to work again with the user Y and believes that the behavior/performance of the user Y was not that good as it should be. Therefore, the user X may not select average or good rating for the user Y and may select the rating as below average. Further, in an embodiment, the user X may rate the user Y as below average, in case, the user X did not like the performance of the user Y but is uncertain to work with the user Y in future. In another embodiment, the user X may rate the user Y as below average, in case, the user X did not like the behavior of the user Y but is uncertain to work with the user Y in future. In yet another embodiment, the user X may rate the user Y as below average, in case, the user X dint even like the performance as well as the behavior of the user Y but may work again with the user Y in future.

Option 1012 may be selected by the user X, in case, the user X gets offended by the user Y in terms of either performance or behavior of the user Y. The user X may also select the option 1010 in case the user is so sure that he/she will never work with the user Y again in future. Further, in an embodiment, the user X may like the performance or participation of the user Y but may felt bad by the behavior of the user Y and hence may rate the user Y as a bad user. In another embodiment, the user X may like the behavior of the user Y but because of the poor performance of the user Y, user X may rate the user Y as a bad user. In yet another embodiment, the user X may rate the user Y as a bad user if the user Y did not perform, did not show up at the time of work, or damaged or hurt the user X or user X's belongings.

Further, the profile view 1002 may include a command button 1014. The command button 1014 may be clicked by the user X to confirm his/her selection of one or more options provided by the system 108. In an embodiment, the user X may select only one option to provide rating to the user Y. In another embodiment, the user X may select more than one option to provide rating to the user Y. The command button 1002 of the profile view 1002 may confirm the selection made by the user X and submit the confirmed rating to the system 108. The system may then analyze the rating provided by the user X and may move the process forward accordingly. In an embodiment of the invention, the user X selects the option 1004 to provide 'Excellent' rating to the user Y. Therefore, the confirm button 1014 may submit 'Excellent' rating for the user Y to the system.

Referring to the FIG. 10B of the invention, the profile view 1016 illustrates an embodiment of the invention where the system 108 provides information to the user X corresponding to the ratings selected by user X for the user Y. The information provided by the profile view 1016 includes the rating option 1004 that was previously selected by the user X in profile view 1002 to provide rating to user Y. Additionally, the profile view 1016 may enable the user X to provide detailed information to support the ratings selected for the user Y.

Further, the profile view 1016 includes an area 1018 that enables the user X to provide details corresponding to the selection of rating made by the user X for the user Y. The system 108 may enable the user X to provide desired amount of details to support the ratings selected for the user Y. In an embodiment, the system may not accept the rating provided by the user X until user X provide details to support his/her selection made corresponding to the ratings for user Y. In another embodiment, the system may accept the ratings provided by the user X even if the user X does not provide details to support the ratings selected for user Y.

Furthermore, the system may utilize the details entered by the user X in case of any objection raised by the user Y corresponding to the ratings. Also, the system may utilize the details entered by the user X to determine the authenticity of the rating. Moreover, the system may use the details provided by the user X to inform user Y concerning to the ratings provided and the reason behind selecting such rating by the user X. In addition, the system may also use the details provided by the user X to help the rating agencies solve conflicts (if any).

The profile view 1016 also includes a command button 1020 that may facilitate the user X to navigate back to the profile view 1002. The command button 1020 may be useful for the user X, in case, the user X need to change the preselected rating for user Y. The user may then repeat the procedure of rating user Y. Further, if the user X changes the rating provided to the user Y then the user X may need to again provide details in profile view 1016 corresponding to the ratings selected to the user Y. Therefore, the profile view 1016 provides user X an option to change his/her selection corresponding to ratings selected for the user Y.

Further, the profile view 1016 includes another command button 1022 that may facilitate the user X to submit the details corresponding to the ratings provided to the user Y. If the user X clicks on the command button 1022 then the details provided by the user X in the area 1018 and the option selected by the user X in the profile view 1002 may be submitted to the system 108. The system may store the information in the database 306 and may use the information in case of objection raised by the user Y concerning to the ratings received from the user X. In an embodiment, if the user X clicks on the command button 1022 then the user may not be allowed to change the ratings selected for the user Y.

Referring to the FIG. 10C of the invention, the profile view 1024 illustrates an embodiment of the invention where the system 108 provides information to the user X corresponding to the success in the procedure of rating the user Y. The information provided by the profile view 1024 includes, but not restricted to, the finalized rating provided to the user y by the user X and the details entered by the user X to support the selected ratings. In an embodiment of the invention, the finalized rating may be excellent rating, i.e. the user X rated the user Y as 'excellent'.

Further, in the aforementioned embodiment, the profile view 1024 may prompt the user X to add a recommendation note for the user Y. The recommendation note may correspond to adding a testimonial for user Y. The testimonial may be written for the promotion of the user Y's excellence in the behavior or in performance of tasks. The other users of the system may read the testimonial written for the user Y to better prejudice the performance or behavior of the user during activity/service/product sharing or exchanging. The users of the system may appreciate to work with the users who have maximum number of recommendations by other users of the system.

In an embodiment, the system may only prompt the user X to add a recommendation note for the user Y, in case, the user X has provided either 'good' or 'excellent' rating to the user Y. In another embodiment of the invention, the system may ask the user X to add recommendation for user Y regardless of the ratings provided by the user X to user Y. Further, in the embodiments, the system 108 may highlight the recommendations added by other users of the system for the user Y at the profile view of the user Y, such as profile view 702, as shown in FIG. 7A of the invention.

Furthermore, the profile view 1024 provides certain options to the user X corresponding to confirmation for adding recommendation note for the user Y. The options may include but not restricted to options to accept or to reject the offer to write recommendation for the user Y, such as option 1026 and option 1028 respectively. The user X may select the option 1026, in case, the user X is willing to add a recommendation note for the user Y. Moreover, the user X may select the option 1028, in case, the user X is not willing to add any recommendation note for the user Y.

In an embodiment, if the user X selected the option 1026 to add a recommendation note for the user Y, the system may enable the user X to access an area 1030 where the user X may add the recommendation note in textual format. The user X may write a testimonial for user Y to explain the good and bad aspects noticed by the user X in user Y during the sharing or exchanging of activity/service/product. The user X may also write information messages to other users of the system explaining the experience shared with the user Y. Further, the user X may write appreciations or suggestions for the user Y that may be helpful for the user Y to improve in future tasks.

In another embodiment, if the user X selected the option 1028 to avoid adding recommendation note for the user Y, then the system may not allow the user X to write any data in the area 1030. Further, in an embodiment, if the user X selected not to add recommendation for user Y, the system may not provide another chance to the user X to add recommendation for the user Y. In another embodiment, the system may enable the user X to add recommendation for user Y.

Additionally, the profile view 1024 includes a command button 1032 that may facilitate the user X to submit the recommendation note added for the user Y, if any. In case, the user X added recommendation for the user X and clicks on the command button 1032 then the recommendation written by the user X in the area 1030 may be submitted to the system 108 and the system may update the ratings provided by the user X. The system may store the written recommendation in the database 306 and may display the information to other users of the system. In case, the user X has not written recommendation for user Y, and clicks on the command button 1032, the system may update the ratings provided by the user X for user Y without adding any recommendation for the user Y.

FIGS. 11A and 11B illustrate various profile views of a user of a system, such as system 108, in accordance with an embodiment of the present invention. More particularly, FIGS. 11A and 11B illustrate exemplary profile views 1102 and 1106 of the user X where the user X provides 'bad' rating to user Y. Referring to the FIG. 11A of the invention, the profile view 1102 illustrates an embodiment of the invention where the system 108 prompts the user X to rate user Y. Significance of various options prompted by the system 108 are explained previously in conjunction with FIG. 10A of the invention.

Further, the profile view 1102 may include a command button 1104 (hereinafter referred to as 'confirm button 1104'). The confirm button 1104 may be clicked by the user X to confirm his/her selection of one or more options provided by the system 108. The command button 1002 of the profile view 1002 may confirm the selection made by the user X and submit the confirmed rating to the system 108. The system may then analyze the rating provided by the user X and may move the process forward accordingly. In an embodiment of the invention, the user X selects the option 1012 to provide 'bad' rating to the user Y. Therefore, the confirm button 1104 may submit 'bad' rating for the user Y to the system.

Referring to the FIG. 11B of the invention, the profile view 1106 illustrates an embodiment of the invention where the system 108 provides information to the user X corresponding to the ratings selected by user X for the user Y. The information provided by the profile view 1106 includes the rating option 1012 that was previously selected by the user X in profile view 1102 to provide rating to user Y. Additionally, the profile view 1106 may prompt the user X to select one of a pre-set reason that stands valid to provide 'bad' rating to any user.

Further, the profile view 1106 may provide certain options to the user X that may help the user X to select a suitable reason for providing 'bad' rating to the performance/behavior of the user Y during the shared/exchanged service/product/activity. Furthermore, the user X may select one of the options provided by the system, such as option 1108, in case, if the user Y has left the work/task (assigned by the user X) incomplete. Option 1110 may be selected by the user X, in case, the user Y's behavior during the shared/exchanged service/product/activity was not appropriate. Option 1112 may be selected by the user X, in case, the user Y has attempted to steal or damage the property of the user X. Option 1114 may be selected by the user X, in case, the user Y did not show up to the user X on the day assigned for the performance or participation of shareable/exchangeable activity/service/product.

Furthermore, the profile view 1106 includes an area 1116 that enables the user X to provide details corresponding to the selection of an option made by the user X as a reason for providing 'bad' rating to the user Y. The system 108 may enable the user X to provide desired amount of details to support the reason for selecting the option or the 'bad' rating. In an embodiment, the system may not accept the rating provided by the user X until the user X provide reasons to support his/her selection made corresponding to the ratings for user Y. Moreover, the system 108 may utilize the details entered by the user X in case of any objection raised by the user Y corresponding to the ratings. Also, the system may utilize the details entered by the user X to determine the authenticity of the rating.

Additionally, the profile view 1106 includes a command button 1118 that may facilitate the user X to navigate back to the profile view 1102. The command button 1118 may be useful for the user X, in case, the user X need to change the pre-selected rating for user Y. Further, the profile view 1106 includes another command button 1120 that may facilitate the user X to submit the details corresponding to the ratings provided to the user Y. If the user X clicks on the command button 1120 then the details provided by the user X in the area 1116 and the option selected by the user X such as option 1108 may be submitted to the system 108.

FIGS. 12A, 12B, and 12C illustrate various profile views of a user of a system, such as system 108, in accordance with an embodiment of the present invention. More particularly, FIGS. 12A, 12B and 12C illustrate exemplary profile views 1202, 1208 and 1222 of the user Y where the user Y objects to the reception of 'bad' rating from the user X. Referring to the FIG. 12A of the invention, the profile view 1202 illustrates an embodiment of the invention where the system 108 informs the user Y corresponding to the rating received by the user X. In an embodiment, the rating may be provided by the user X based on the experience shared with the user Y for the duration of the sharing/exchanging of activity/service/product. In addition, the profile view 1202 may provide an area 1116 to the user Y to display the details entered by the user X (in profile view 1106) as a support for providing 'bad' rating to the user Y.

Further, the profile view 1202 includes a command button 1204 that may facilitate the user Y to accept the ratings received from the user X. The command button 1204 may be useful for the user Y, in case, the user Y is satisfied with the ratings received from user X. If the user Y accepts the ratings provided by the user X then the system may update the profile points of user Y and simultaneously may update the rater's rating of the user X. After updating the public rating, the system may notify the user Y corresponding to the successful update of the public rating.

Further, after updating the rater's rating of the user X, the system may notify the user X corresponding to the update of the rater's rating. In an embodiment of the invention, the system may notify both of the users, i.e. user X and user Y corresponding to the update of the rater's rating and public rating. The system may also notify the users regarding the new rater's rating or new public rating. In another embodiment of the invention, the system may notify all respective acquaintances of the users corresponding to update in their rater's ratings or public ratings.

Furthermore, the profile view 1202 includes another command button 1206 that may facilitate the user Y to object to the ratings received from the user X. The command button 1206 may be useful for the user Y, in case, the user Y is not satisfied with the ratings received from the user X. If the user Y clicks on the command button 1206 then the objection may be submitted to the system. The system may further analyze the objection to conclude authenticity of the objection. The system may use certain pre-defined algorithms to check the authenticity of the objection.

Referring to the FIG. 12B of the invention, the profile view 1208 illustrates an embodiment of the invention where the system 108 informs the user Y corresponding to the objection raised by the user Y on the ratings received from the user X. Additionally, the profile view 1208 may prompt the user Y to select one of a pre-set reason that stands valid to object to any ratings received by some other user. In an embodiment of the invention, the user Y has to select only from one of the pre-set reasons. In another embodiment of the invention, the user Y may be facilitated by the system 108 to provide other reasons for objection on the received ratings.

Specifically, the profile view 1208 may provide certain options to the user Y that may help the user Y to select a suitable reason for objecting to the rating received from the user X. Further, the user Y may select one of the options provided by the system, such as option 1210, in case, if the user Y believes that he/she has performed very well and therefore deserves a better rating. Option 1212 may be selected by the user Y, in case, the user Y believes that his/her behavior during the shared/exchanged service/product/activity was appreciative and therefore deserves a better rating.

Further, option 1214 may be selected by the user Y, in case, the user Y believes that because of some misunderstanding/miscommunication, user X has provided low rating and the misunderstanding can be cleared. The system may then inform the user X corresponding to objection by the user Y and may facilitate both users with some communication means to clarify the misunderstanding or miscommunication. Furthermore, option 1216 may be selected by the user Y, in case, the user Y believes that the user X is not being genuine in rating users of the system and therefore the rating provided by the user X needs to be rejected by the system.

In addition, the profile view 1208 includes an area 1218 that enables the user Y to provide details corresponding to the selection of an option provided by the system as a reason for objecting to the rating received from user X. The system 108 may enable the user Y to provide desired amount of details to support the reason for selecting the option. In an embodiment, the system may not accept the objection raised by the user Y until the user Y provide detailed reasons to support his/her objection on user X's rating. Moreover, the system 108 may utilize the details entered by the user Y to inform user X corresponding to the objection received on the ratings he/she has provided to user Y.

Additionally, the profile view 1208 includes a command button 1220 that may facilitate the user Y to submit the details corresponding to the objection raised on the ratings provided by the user X. Further, if the user Y clicks on the command button 1220 then the details provided by the user Y in the area 1218 and the option selected by the user Y such as option 1210 may be submitted to the system 108. The system may store the information in the database 306 and may use the information to inform the user X corresponding to the objection received on his/her rating. The user X may read the details filled by the user Y and may decide whether to re-rate the user Y or not.

Referring to the FIG. 12C of the invention, the profile view 1222 illustrates an embodiment of the invention where the system 108 informs the user Y corresponding to the rejection of the objection raised by the user Y on the ratings received from the user X. Additionally, the profile view 1222 may inform the user Y corresponding to the update in the public rating of the user Y. The profile view 1222 may also provide reasons that resulted in the rejection of the objection. User Y may go through the reasons provided by the system for rejecting the objection, and may decide whether he/she want to surrender on the decision or not.

Further, the profile view 1222 may provide an option to the user Y that may help the user Y to object further on the decision of the system. The user may select the option 1226 that may inform the rating agencies concerning the objection made by the user Y on the decision of the system. In an embodiment, the rating agencies may involve dedicated human employees of the system that are specialized in particular social fields. Those human employees of the system (hereinafter referred to as 'rating agencies') 108 may contact the user X and user Y through suitable means. The rating agencies may question both users (user X and Y) corresponding to the shared or exchanged activity/service/product and may decide whether the rating provided by the user X to user Y was genuine or not.

In case, the rating agencies determines that the ratings provided by the user X was genuine, the rating agencies may inform the system to reject the objection raised by the user Y. On receiving instructions from the rating agencies, the system may reject the objection raised by the user Y and may update the public rating of the user Y and rater's rating of the user X. In case, the rating agencies determines that the ratings provided by the user X was not genuine, then the rating agencies may facilitate the user X to rerate the user Y and may again check if the rerated rating of the user is genuine or not. If the user X rerates genuinely then the rating agencies may inform the system to populate new ratings provided by the user X. If the user refuses to rerate the user Y then the rating agencies may inform the system to reject the ratings provided by the user X. The system may then reject the ratings provided by the user X and may update the rater's rating of the user X.

Additionally, the profile view 1222 includes a command button 1226 that may facilitate the user Y to contact the rating agencies, in case, if the option 1224 is selected by the user Y. The system may then inform the rating agencies and may provide all the details stored in the database 306 corresponding to the shared/exchanged activity/service/product, ratings and objection raised on the ratings. The rating agencies may use the data to establish a fair judgment on the objections. In case, if the option 1224 is not selected by the user Y, the system may update the rater's rating of the user X and may update the public rating of the user Y.

FIGS. 13A and 13B illustrate a flow diagram of a method for sharing and exchanging at least one of activity, service and product in a network, in accordance with an embodiment of the present invention. The order in which the method is performed is not intended to be construed as limitation, and further any number of the method steps may be combined in order to implement the method or an alternative method without departing from the scope of the invention.

At step 1302, a user may register with a system, such as the system 108 (as described previously in conjunction with FIG. 3). In an embodiment, the system may be a social networking system. In another embodiment, the system may be utilized for implementation within a social network. In this embodiment, the user may need to register with a social network utilizing the system. The user may register with the system by entering his/her information to create a profile or an account thereon. The information may include, but is not limited to, personal information, information corresponding to qualification, professional information, and achievements. The personal information that may be entered by the user includes, but is not restricted to, name, location, hobbies, activities, pastime and the like. The qualification may include, but is not limited to, educational information of the user. Similarly, the user may provide information corresponding to business or employment industry of the user, designation, experience and the like. Further, the information corresponding to various achievements of the user may be entered by the user. In an embodiment, the profile of the user may be accessible to all other users of the system. In another embodiment, the user of the profile may be facilitated to make his/her profile accessible for some specific set of the users.

On registering with the system, an account may be created for the user with some credit points. In an embodiment, the user's account may be initialized with '0' credit points. Each user may be allowed to post/announce one or more sharable/exchangeable activities/services/products/information, at step 1304. Hereinafter, the activities, services, or products may collectively be referred to as 'resources' Hereinafter, the user who posts/announces sharable/exchangeable resource or information may be referred to as the 'first user. The user may post one or more resources or information for inviting one or more second users of the system. In one embodiment, the one or more second users may include all users of the system other than the first user who posts the request or information. In another embodiment, when the first user posts the request or information for a specific group of registered users of the system, then the one or more second users may include the users of the specific group.

The first user may post/announce information corresponding to sharable/exchangeable resources/information along with one or more conditions corresponding to the post/announcement. For example, if a first user is interested in playing table tennis and need a partner to play, then the first user may announce a need for a partner to play table tennis on a specific date and time. The first user may also require more than one partner for the activity and may announce the need accordingly. Further, for example, if the first user is willing to go out for dining with a like-minded person of a particular age group, the first user may post an activity for dining out on a particular date with the conditions corresponding to the type of the person required to dine with. Accordingly, the second users who and interested and meet the conditions posted by the first user may accept the posted activity.

Further, at step 1306, the first user may receive some recommendations for one or more second users who meet basic conditions (of the post) or who shares some common attributes (such as hobbies, professional industry and the like) with the first user. In an embodiment, the system may analyze profiles of one or more second users to match with the profile, activity and corresponding conditions (associated with a post/announcement) of the first user profile for determining one or more suitable second users for the posted resource/information. In an embodiment, the one or more suitable second users may be determined based on their hobbies and locations. For example, if the activity posted by the first user is to play a cricket at a particular location and it is determined (by the system) that one or more second users have interest in 'cricket' and reside at the location as mentioned in the post, then the one or more second users may be recommended as suitable for the post. Thus, information corresponding to the one or more suitable second users may be provided to the first user. In addition, the system may match the content of the announcement or profile information of the first user with profile information of one or more second users (hereinafter referred to as 'profile information matching') and based on the best possible match, the system may recommend most suitable second users' profiles to the first user that may be of some interest for the first user.

Furthermore, at step 1306, based on the profile information matching, the one or more suitable second users may also be notified (by the system) about the announced activity or service or product based on their interests/hobbies. The second users may accept the announced shareable activity, service or product based on their likings or interests. Accordingly, the first user may get notification regarding acceptance of the posted activity, service or product by the one or more second users.

At step 1308, if the first user gets more than one notification of acceptance by more than one second user. The first user may then check profiles of all of the second users to find a suitable second user that suits best to first user's needs corresponding to the posted activity, service or product. For example, if the number of second users who accepted the posted activity/service for sharing/exchanging is more than the required number of second users for performing the posted activity/service, then the first user may be facilitated to approve (select) at least one of the second users who accepted the post. Accordingly, the system may notify the one or more second users (who accepted the posted service or activity) whether they have been approved/selected (to perform the activity or service) by the first user or not. Furthermore, in an embodiment, the system may also provide the approved second users with an additional information or conditions (corresponding to the post) that may be required or helpful in performing (by sharing/exchanging) the activity, service or product. Accordingly, the second users may then perform and complete the required activity or service. At step 1310 (as shown in FIG. 13B), the performance or work done by the second user may be analyzed by the first user based on his/her expectations or requirements for the activity/service to be completed. Further, based on experience of the first user in sharing/exchanging activity/service/product with the second user, the first user may provide ratings or reviews to the profile of the second user. The system may use the ratings as additional information in determining credibility of the second user. Similarly, the second user may also provide rating to the first user based on his/her experience in sharing/exchanging the activity, service or product with the first user. In an embodiment, after the completion of the activity/task (corresponding to sharable/exchangeable activity, service, product) announced by the first user, both the first user and the second users may be notified through suitable means about rating each other based on their performance or participation in the sharable or exchangeable activity or service or resources. For example, the system may remind the first user to rate all of the second users based on their performances in sharing/exchanging activity, service, product.

Further, at step 1312, after providing the ratings, the system may calculate credit points for the first user for sharing/exchanging the activity with the second user. Similarly, the credit points may be calculated for the second user that may be given to the second user for successful completion of the accepted activity/service (as posted by the first user). For example, if the service, such as 'vehicle sharing' posted by the first user is accepted to be shared by a second user, then '+5' credit points may be provided to the first user for sharing his/her vehicle with the second user and '−5' credit points may be assigned to the second user for sharing the vehicle of the first user. In an embodiment, the system may utilize some pre-set algorithms in determining the credit points for the first user and the second user(s). For example, the credit points may be calculated based on the type and duration of the activity. Further, in another embodiment, the credit points may be pre-set (by the system) for sharing/exchanging a particular activity. Furthermore, in yet another embodiment, the credit points may be set between the first users and the second users before sharing/exchanging the activity/service or product corresponding to the post (as accepted by the second user).

At step 1314, the first user (who receives a credit point for sharing the service with the second user) may be enabled to utilize the credit points for sharing or exchanging at least one of sharable/exchangeable activity, services or product announced by other users of the system. Similarly, each user of the system may utilize his/her overall profile points (as explained earlier in conjunction with FIG. 4). For example, the second user may use the credited points to share/exchange any service/activity/product or to borrow any item, for some days, from other users of the system. It may be appreciated by a person skilled in the art that a user may utilize the points at any time for sharing/exchanging/purchasing at least one of services, products or activities with other users of the system.

In an exemplary embodiment of the invention, the first user may invite one or more second users (of the system) to share a service provided by the first user. After sharing the service, the system may remind the second users to rate the first user based on the quality of service provided by the first user. Further, the system may remind the first user of the system to rate the second users based on his/her experience in sharing the service with the second users. Further, based on the rating provided by the second users, the system may credit points to the first user. For example, if a first user of the system announces that he goes to drop his kid to XYZ School from location ABC daily in the morning at 8 am and he can carry at least three more kids from the way to the same school daily. Then all of the second users who show interest in receiving the service (from the first user) of dropping the kids to the school may accept the announced service.

Further, the second users may rate the first user based on the service provided by the first user. Accordingly, the system may provide credit points to the first user for the service he provided to the second users. The points to be credited to the first user may be calculated based on number of kids served by the first user or based on the number of days for which the service was provided. In an embodiment, the points to be credited to the first user may depend upon the ratings or reviews provided by the second users of the system. In another embodiment, the points to be credited to the first user may be pre-set by the first user and the second users.

In another embodiment of the invention, the user may be facilitated to exchange services with one or more second users (hereinafter referred to as 'service exchange option'). The service exchange option allows a user of the system to provide a service to another user of the system in exchange of any other service that may be provided by the other user. For example, a first user of the system may provide a service to the second user (as a part of the service exchange option) and expect another service from the second user that may or may not be equivalent to the service provided by the first user. For example, if a first user of the system has announced (posted) an exchange service of pet sitting on a certain date as a part of service exchange option, and if a second user accepts (or showed interest in) allowing the first user to take care of his dog on the specified date, then the second user may be liable to return the favor of the service by providing same or some other service to the first user.

Additionally, the first user may specify a required type of service in exchange of pet's sitting initially (with the announcement) as a condition. A second user who accepts the service exchange option may then be obliged to follow the condition of the first user. If the second user of the system negates to full fill the condition of the first user after enjoying the service of the first user then the system may allow the first user to negatively rate the second user or may take any pre-set actions against the second user. Further, the system may deduct some points of the second user and may also compensate the first user by suitable means. In case of successful completion of services by both the first and the second user, the system may facilitate both the users to rate each other. Accordingly, both the first user and the second user may receive some credit points that may or may not be equal. The points may depend upon the ratings or reviews provided by the users to each other or may also depend on the type of service provided or may depend on the amount of time for which the service was provided.

In yet another embodiment of the invention, the first user may announce sharing of a personal item or product with other users of the system. For example, a first user of the system may announce a need of a guitar for one week. A second user having a guitar may accept to share his guitar (with the first user) for one week by specifying condition on sharing the guitar that the first user will have to pay for any damages to the guitar. In another similar example, the second user may accept to share his guitar if first user agrees to transfer certain points to the second user. Again similarly, the second user may accept to share his guitar if the first user agrees to share his violin or any other article with the second user for the same time interval. If the first and second user agrees to each other's conditions then the system may notify both users about their agreement including time, location, compensation, security collateral or any other corresponding condition.

For example, the system may notify both the users about the accepted activity of guitar sharing, related information and corresponding conditions. Further for example, notification may include information such as type of the activity i.e. personal item sharing, time of the process i.e. one week, location such as the address of the first user or second user or both, compensation such as to pay for any damages to guitar, security collateral to submit (by the first user) any article as collateral for guitar, required skill such as the age of the first user to be able to handle the guitar. After the completion of the time period of sharing the personal item (i.e. guitar), the system may send a reminder through suitable means, like profile notification, email or SMS and the like, to both users to provide ratings to each user. In addition, the system may also provide both the users with an option to extend the time period for the activity. Further, the system may send a notification to both the users about any debit or credit of points after completion of the activity.

FIG. 14 illustrates a flow diagram of a method for sharing and exchanging at least one of activity, service and product in a network, in accordance with another embodiment of the present invention. The method may be understood more clearly when, the description corresponding to the method, is read in conjunction with FIGS. 3, 4, 5 and 6. The order in which the method is performed is not intended to be construed as limitation, and further any number of the method steps may be combined in order to implement the method or an alternative method without departing from the scope of the invention.

In FIG. 14, at step 1402, a user may register with a system, such as the system 108, to create and account (profile) on the system. The user may submit his/her information to register with the system. The information may include, but is not restricted to, personal information, professional information, educational information and the like. Each registered user (member of the system) may access profiles corresponding to other users of the system.

At step 1404, a user (hereinafter referred to as the 'second user') may search (through the profiles of other users within the system) for posted/announced/requested (available) activities, services or products. The available activities, services or products may be announced or requested by other users of the system (hereinafter referred to as first users). For example, the second user may search for any recreational activity, with some credible people, on weekend. The second user may be facilitated to search for activities, in various ways such as based on the type of activity (for example, recreational activity), that may be posted by one or more first users. Further, the second user may search for all kinds of announcement or requests for activities or services or products by a specific first user or a specific group of users. The group may correspond to one of family, friend, business group and the like.

At step 1406, the second user may accept the announcement or request including all the terms or conditions made by the first user. The first user may then be notified by the system through suitable means about the acceptance of his/her announcement or request by the second user. The first user may then allow or deny the second user for performing or participating in the activity, service or product that he/she has announced or requested. In an embodiment, the second user may be assigned with the service/activity corresponding to the announcement for completion thereof.

Further, at step 1408, it is determined if the bidding is required for performing/accepting the announcement for sharing/purchasing any activity/service/product posted by the first user. If it is determined that the first user has asked for bid for accepting the request or sharing/exchanging/purchasing the service with/from the first user then the method proceeds to step 1410 (as shown by 'Yes' pointer from step 1408). Further, if it is determined that no bidding is required for accepting the request or sharing/exchanging/purchasing the service with/from the first user then the method proceeds to step 1406 to accept the announcement or request (as shown by 'No' pointer from step 1408).

At step 1410, the second user may bid to perform or participate in announced activity/service/product. Further, based on the bid, the second user may or may not be allowed by the first user to perform or participate in the activity, service or product announced by the first user. In an embodiment, the second user may also negotiate on the terms and conditions asked by the first user of the system. Further, on completion of the accepted activity/service/request, at step 1412, both the first user and the second user may be notified about the completion of the activity, service or product and further about requirement of providing rating to each other based on experience of the first user and performance of the second user.

At step 1414, based on the rating/review received from the first user, some points may be debited from the overall profile points of the second user. The system may also notify the second user about the debited points through suitable means such as email notification, profile notification, SMS notification, call notification and the like FIG. 15 illustrates a flow diagram of a method for enabling the users of the system to provide feedback corresponding to the ratings received from other users of the system, in accordance with an embodiment of the present invention. The feedback may include, but not restricted to, acceptance or objection on the received ratings. Further, the order in which the method is performed is not intended to be construed as limitation, and further any number of the method steps may be combined in order to implement the method or an alternative method without departing from the scope of the invention.

In an embodiment of the invention, a user may register with a system, such as the system 108. The user of the system may be an individual user or may be an organization or institute. In an embodiment, the system may be a social networking system. In another embodiment, the system may be utilized for implementation within a social network. In this embodiment, the user may need to register with the social network utilizing the system. The user may register with the system by entering his/her information to create a profile or an account thereon. The information may include, but is not limited to, personal information, information corresponding to qualification, professional information, and achievements. The personal information that may be entered by the user includes, but is not restricted to, name, location, hobbies, activities, pastime and the like. The qualification may include, but is not limited to, educational information of the user. Similarly, the user may provide information corresponding to business or employment industry of the user, designation, experience and the like. Further, the information corresponding to various achievements of the user may be entered by the user. In an embodiment, the profile of the user may be accessible to all other users of the system. In another embodiment, the user of the profile may be facilitated to make his/her profile accessible for some specific set of the users.

At step 1502, the user may start participating in the social activities running on the system 108. The user may either search for various requests posted by various users of the system that may be of interest to the user or may post an announcement showing interest to provide certain type of service/product/activity (herein after may be collectively referred to as 'service'). A user (herein after referred to as 'first user') may post a request/announcement for a service or product, which may appeal to another user (herein after referred to as 'second user'). The second user may be willing to provide for the requested service and may accept/apply for the posted request/announcement (hereinafter may be interchangeably used as 'request'). In an embodiment of the invention, a notification may be sent to the first user as soon as the second user applies for the request posted by the first user. The first user may approve for the second user's appeal and allows the requested service to be exchanged between the first and the second users. Consequently, the system 108 allows the first and second users to share/exchange any service/product/activity at step 1502.

At step 1504, the performance or work done by the second user may be analyzed by the first user according to his/her expectations/needs/requirements for the service that is completed by the second user. Further, based on the experience and interactions with the second user cumulatively with his/her performance, the first user may provide ratings to the profile of the second user. Similarly, the second user may provide ratings to the profile of the first user based on his/her experience and interaction while sharing/exchanging the service/product/activity with the first user. Hence, after the completion of the service, the users provide ratings to each other based on the experience shared during the service. Such ratings are referred to as 'public ratings'. Public ratings may be illustrated suitably in the profiles of the users that may depict their performances and behavior with other users of the system 108.

Furthermore, the system 108 may provide the users a list of options for providing rating to other users of the system after sharing/exchanging of a service/activity/product. The rating may be 'numeric rating', where every number may refer to a specific rating level. The list of options may include, but not restricted to, a highest rating '5' referring to excellent rating and a lowest rating '1' representing bad rating. In addition, the list of options for rating includes intermediate numeric rating '4' depicting 'good', '3' depicting 'average' and '2' depicting 'below average'. Hence, public rating of a user in the system may depict the user's performance, behavior, and cooperation during the share/exchange of any service/activity/product with other users. Moreover, after every shared/exchanged service/activity/product, the first user may rate the second user. Therefore, every individual rating provided by the first user to the second user after the completion of any single sharing/exchanging of service/activity/product, may cumulatively affect the public rating of the second user. In an embodiment of the invention, when the first user rates the second user as excellent or good, the system may provide a choice for the first user to recommend the second user. This may significantly improve the second user's reputation and rating, which may further, attract more demands for his/her services. Therefore, considering the public ratings of the users, the other users may decide about the appropriate users from whom they can get the desired services furnished.

At step 1506, the system may allow the users to object to any of the received ratings, i.e. the system may facilitate the users to raise objection on the ratings received from other users of the system. In an embodiment of the invention, the users of the system 108 may not be truthful or genuine in providing ratings to other users and may rate the other user incorrectly. This may lead to hampering of social reputations of the users and hence, a loss of interest of the users in the system. In further embodiment, where any of a user of the system provides a dishonest rating to the other user, the system may allow the other user to either accept or object to the received rating. Therefore, the user who received an incorrect rating may raise an objection against the received rating. Hence, based on the number of acceptances and objections a user receives for his/her ratings, the system 108 may calculate rater's ratings for the user that may depict the user's truthfulness and authenticity in providing ratings to the other users. In an embodiment, the first user may provide a false rating to the second user that may be incorrect according to the actual quality of work delivered by the second user. On receiving such a rating, the second user may be offended and he/she may lose interest in the system. Further, this may hamper the social image of the second user that may affect the social interaction of the second user. Therefore, the second user may object the rating received from the first user.

In an embodiment, the second user may rate the first user based on the interaction and experience during the exchange of the service. Further, the first user may object the ratings provided to him/her by the second user, at the step 1506. This may be a case when the second user inappropriately rated the first user and the received ratings seemed offensive to the second user. Such events may hamper the social behavior of the first user and may pose a disgrace against his/her image. This may further hinder other users to interact with him/her for exchange of any service. Therefore, to avoid the occurrence of such unreliable events, the system may allow the first user to object the ratings provided to him/her by the second user. In such cases, the rater's ratings of the second user may be affected negatively, while a risk of negative effect on the public rating of the first user may be eliminated. In another embodiment, the second user may provide ratings to the first user based on the experience involved in sharing a service with the first user. Further, the first user may accept the ratings provided to him by the second user, at the step 1506. This shows that the second user honestly and appropriately rated the first user, which is acceptable by the first user as well. Therefore, the rater's ratings of the second user may be influenced positively while the public rating of the first user may be affected according to the received ratings.

Further, while the first and second users may raise objections to the ratings provided to them by each other in the system 108, the users may object dishonestly. The objections raised in the system by the first and second users may not be totally justified. Hence, to keep a check on the unjustified objections raised by the users, the system 108 may implement an additional beneficial feature. Therefore, at step 1508, this additional feature may allow the system to either accept or reject the objection. The number of acceptances and rejections given by the system to the objections raised by the users may consequently depict the rater's ratings of the corresponding users. Hence, at the step 1508, the system efficiently analyses the ratings and the objections provided by the users and determines the unauthentic ratings and objections of the users, which further concluded about the rater's ratings of the users. Therefore, at step 1508, the system 108 compares the public ratings and the rater's ratings of the users and based on the comparison, bring upon the authenticity in the ratings provided and the objections raised by the users in the system 108. In an embodiment, the second user may object the rating provided to him/her by the first user after the exchange of a service. Further, while analyzing and comparing the rater's ratings of the first user and the public rating of the second user, the system may find out that the public rating of the second user is greater than the rater's rating of the first user. Thereafter, the system 108 may accept the objection raised by the second user against the received rating at the step 1508, which may not affect the public rating of the first user, but may affect the rater's ratings of the first user. This is because, after analyzing and comparing the rating provided by the first user and the objection raised by the second user, where the objection is accepted, the system may conclude that the rating provided by the first user was dishonest, and hence, the first user was not authentic while providing the rating to the second user. This may be, further, reflected in the rater's ratings of the users.

In a further embodiment, the second user may object to the rating provided to him/her by the first user for the exchange of a service, at the step 1506. The system 108, after analyzing and comparing the public rating of the second user and the rater's rating of the first user, may find out that the public rating of the first user is equal to the rater's ratings of the first user. Therefore, the system 108 may accept the objection raised by the second user, at the step 1508. Hence, the 'rater's ratings' of the first user may be degraded, which may be reflected in the profile of the first user. In yet another embodiment, the first user may provide a rating to the second user for the exchange of a service. Further, the second user may object to the received ratings. The system 108, while analyzing the rating and the objection provided by the corresponding users, may find out that the public ratings of the second user is equal to the rater's ratings of the first user. Thereafter, the system may check for the rater's ratings of the first user. If the rater's ratings of the first user is greater than a prefixed number (depicting rating), then the system 108 may automatically reject the objection raised by the second user for the rating provided by the first user, at the step 1508. This may be because, the rater's ratings of the first user (which is greater than a prefixed number) may characterize that the first user was true in rating the other users in the system in an appreciable number of events of exchanging services. Hence, this may furnish a true image of the first user and the system 108 may reject the objection raised by the second user. In another embodiment, on comparing the public rating of the first user and the rater's ratings of the second user after an objection raised by the second user, the system may find out that the public rating of the first user is equal to the rater's ratings of the first user. The system may further analyze the rater's ratings of the first user. If the 'rater's ratings' of the first user is less than a prefixed number, objection raised by the second user may be accepted by the system 108.

In yet another embodiment, the second user may object the ratings provided to him/her by the first user for the exchange of a service. The system, after analyzing and comparing the rater's ratings of the first user and the public ratings of the second user, may find out that the public rating of the second user is smaller than the rater's ratings of the first user. Therefore, the system 108 may reject the objection raised by the second user, at the step 1508. In this case, after analyzing the rating provided by the first user and the objection raised by the second user, the system 108 may conclude that the first user was honest in rating the second user but the second user unfaithfully objected the genuine rating provided to him/her by the first user. Hence, the 'rater's ratings' of the first user may increase appreciably. In an embodiment, the first user may provide a rating to the second user at the step 1504, after sharing a service. Further, the second user may raise an objection against the provided rating at the step 1506. Thereafter, the system may analyze the situation and may accept the objection at the step 1508. Consequently, the rater's rating of the second user may be positively influenced, since the system analyses that the second user raised an appropriate objection against the rating provided by the first user. In another embodiment, the second user may raise an objection against the rating provided by the first user, after completion of a service. Further, the system may analyze and reject the objection raised by the second user at the step 1508. In conclusion, the 'rater's ratings' of the second user may be negatively affected.

In an embodiment, the system may accept the objection received from the second user against the rating provided by the first user, on completion of a service, at the step 1508. Further, the system may enable the first user, whose rating is rejected, to request rating agencies to re-analyze the situation. Thereafter, the rating agencies may re-analyze the situation by examining the rating of the users involved in the service and consequently may take a decision. In another embodiment, the system may reject the objection received from the second user against the rating provided by the first user. Further, the system may enable the second user to request the rating agencies to re-examine the situation. The rating agencies may accordingly take a decision after re-examining the situation. Similarly, in an embodiment, the first user may object the ratings provided to him/her by the second user. The system may examine the whole situation in the similar manner, but may consider the rater's rating of the second user and the public rating of the first user.

At step 1510, after the completion of the service, when the first and the second users have provided ratings to each other, the ratings (including public and rater's ratings) displayed on profiles of the first and second users may be updated by the system 108 accordingly. When the first user provides a rating to the second user for the exchange of a service, the second user may accept or object the ratings. Additionally, the public rating of the second user may be influenced by the rating received from the first user. Consequently, the rater's ratings of the first user and public ratings of the second user may be updated accordingly by the system 108, at the step 1510. In another embodiment, the second user may object the ratings provided to him/her by the first user after the exchange of a service. The system may analyze the objection and may either accept or reject the objection. If the system concludes that the first user was not true while rating the second user then the system may accept the objection, and hence the 'rater's ratings' of the first user may be affected negatively. This effect may be updated by the system 108 in the rater's ratings of the first user. The system may also update the public rating of the second user accordingly.

In a further embodiment, the objection raised by the second user against the ratings provided by the first user may be further rejected by the system 108. This may affect the public ratings of the second user. These effects on the public rating of the second user and the rater's ratings of the first user may be updated by the system, at the step 1510 and, displayed on their respective profiles. For example, a user ABC rates another user XYZ as 'good' for the exchange of a service such as 'housekeeping', this will cumulatively increase the 'public rating' of the user XYZ. Whereas, if the user ABC provides a rating to the user XYZ as 'below average' for the exchange of a service like 'car-pooling', then this may cumulatively have a negative effect on the public rating of the user XYZ. Therefore, in further requests, user ABC may not consider user XYZ for car-pooling. Further, when the user ABC rates the user XYZ as 'below average' and the user XYZ objects the received rating, the system may analyze the public rating of the user XYZ and the rater's ratings of the user ABC. If the system accepts the objection, the 'rater's ratings' of the user ABC may be updated accordingly. While, on the other hand, if the objection is rejected, the rater's ratings of the user ABC and the public rating of the user XYZ may be updated accordingly by the system, as appreciated (refers to increased value) rater's ratings of ABC and depreciated the public ratings of XYZ, at the step 1510. Hence, individual ratings, after the completion of every service, may affect the public rating of the users that may be regularly updated by the system and may be always reflected in their profiles. Similarly, the rater's ratings may also be updated. Therefore, the system 108 may keep on updating the public as well as rater's ratings of the users based on the ratings they receive after the completion of every service. These updates may regularly provide the users an overall picture about the other user's authenticity, performance, and behavior. In an embodiment, the system 108 may also provide service specific ratings. In another embodiment, the system may keep on updating the service specific ratings for the user.

The system may automatically update the ratings of the users and may display the ratings in their profiles. As the service is completed, the system may ask the first user about the performance of the second user. Simultaneously, the system may also ask the second user about the experience with the first user. The first and the second users may provide ratings to each other. Efficiently, the system may also keep a check on the credibility of the first and the second users by introducing rater's ratings in the users' profiles. After the completion of the service, as the first and the second users provide ratings to each other, the system may reflect the increase or decrease in the ratings by updating the public ratings and rater's ratings in the profiles. Further, the system may send notifications to the users involved in the service and whose ratings have been updated by the system, at step 1512, notifying the corresponding users about their updates. In an embodiment, the system may notify the users by a pop-up in the profiles. In another embodiment, the system may notify the users by sending a message in an inbox of their profiles. In yet another embodiment, the system may notify the users by sending an e-mail linked with their profiles in the system 108.

FIGS. 16A to 16D illustrates a flow diagram of a method for providing public and rater's ratings to users in a system, such as system 108, in accordance with an embodiment of the present invention. A user may register with a system, such as a system 108. A user of the system may be an individual user or may be an organization or institute. In an embodiment, the system may be a social networking system. In another embodiment, the system may be utilized for implementation within a social network. In this embodiment, the user may need to register with the social network utilizing the system. The user may register with the system by entering his/her information to create a profile or an account thereon.

Figure 16A:
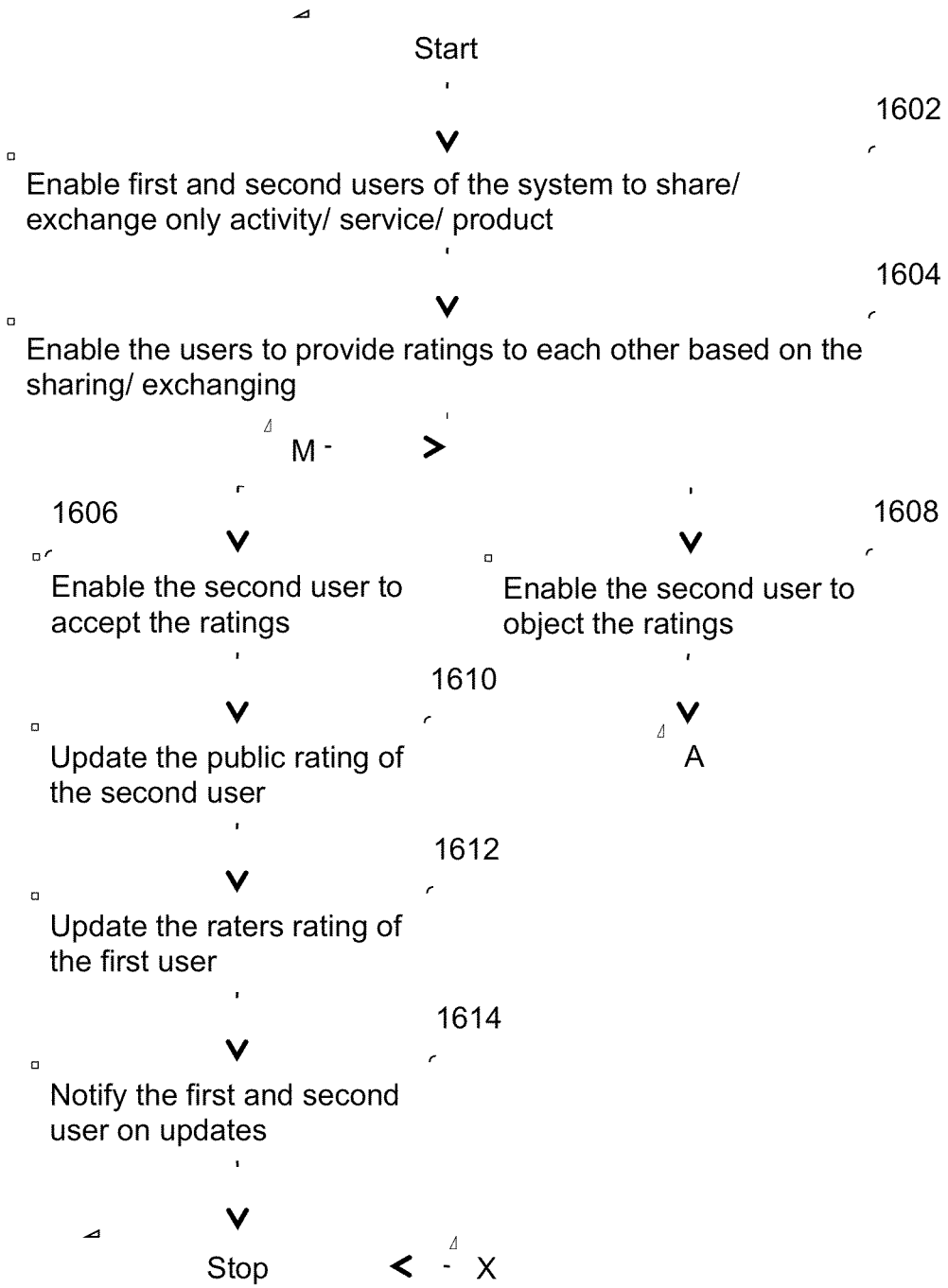

Referring to FIG. 16A, at step 1602, the users may start participating in the social activities running on the system 108. The users may either search for various requests posted by various users of the system that may be of interest to the user or may post an announcement showing interest to provide certain type of service/product/activity. As described in conjunction with the FIG. 15, the first user may post a request for a service, which may appeal to the second user (as described in conjunction with the FIG. 15). The second user may be willing to provide for the requested service and so, may accept/apply for the posted request. In an embodiment of the invention, a notification may be sent to the first user as soon as the second user applies for the request posted by the first user. The first user may approve for the second user's appeal and allows the requested service to be exchanged between the first and the second users. Consequently, the system 108 may allow the first and second users to share/ exchange any service/product/activity at step 1602. For example a user ABC posts a request for a service, such as baby sitting for the timings 9 AM to 5 PM, in the system 108. Another user XYZ finds interest in the request posted by the user ABC and applies for the same. The user ABC may approve according to his/her requirements. Examples for the exchangeable services are and not limited to, house-keeping, car-pooling, house-appliances repair, repairing for electricity or water supplies. The exchangeable products are and not limited to books, clothes, art and craft articles, jewelry. The exchangeable activities are and not limited to biking, hiking, playing.

At step 1604, after the first and the second users have completed the sharing of the services, the first user may analyze the work done by the second user based on various parameters and provide ratings to the second user. In an embodiment, the first user may analyze the work done by the second user on the basis of the quality of work delivered by the second user or the time taken by the second user. It may be appreciated by a person skilled in the art, that there may be various other parameters based on which the first user may analyze the second user and provide ratings to the second user. In an embodiment, the first user may rate the second user as 'excellent'. In a further embodiment, when the first user rates the second user as 'excellent', the system allows the first user to recommend the second user for other users in the system. In another embodiment, the first user may rate the second user as 'bad'. In a further embodiment, the first user may be asked for an explanation by the system for rating the second user as 'bad'. (As described earlier at step 1504 in conjunction with the FIG. 15).

In another embodiment, the second user may provide a rating to the first user based on the interaction and experience with the first user. In another embodiment, the second user may rate the first user as 'excellent'. In an embodiment, when the second user rates the first user as highest ('excellent'), the system may allow the second user to recommend the first user. In another embodiment, the system may ask for a recommendation from the second user when the second user rated the first user as 'excellent'. In yet another embodiment, the second user may rate the first user as 'bad'. In a further embodiment, when the second user rates the first user as the lowest ('bad'), the system may ask the second user for an explanation to the provided rating. In an embodiment, the system 108 allows the second user to provide ratings to the first user based on his/her experience and interaction with the first user, at the step 1604. For example, the second user may rate the first user based on the first user's behavior during the exchange of the service. Further, the second user may rate the first user based on the environment of the place where the service was exchanged. It may be appreciated by a person skilled in the art, that there may be various other parameters based on which the second user may analyze the first user and provide ratings to the first user. Therefore, the system may allow the two or more users engaged in an exchange of a service to provide ratings to the other users involved in the service, at the step 1604. This type of rating is referred to as 'public rating' for a user. A profile of a user contains 'public rating' of the user that depicts the other users in the system 108 about his/her behavior, performance of the user for a service. This may, further, help the other users to make a decision about an appropriate user for exchanging a particular service/product/activity.

Further, when the first and the second users have provided 'public ratings' to each other after completion of a service, the respective users are notified about their received ratings. In an embodiment, the system may notify the first and the second users about their 'public ratings' received after the completion of the service via a pop-up message in their respective profiles. In another embodiment, the system 108 may notify about the public ratings to the first and the second users via a message sent to their respective inboxes of their profiles. In a yet another embodiment, the system 108 may notify the first and the second users of their 'public ratings' via an email sent to their respective email id's linked with their profiles in the system 108.

After receiving the respective 'public ratings' on the completion of a service, the system 108 may allow the users to either accept or object their received public ratings. This feature may be implemented by the system 108 to efficiently keep a check on the 'public ratings' provided by the users after the completion of the service. While granting ratings to each other, the users involved in a particular service may not rate each other with total sincerity, and may incorrectly rate the other users. Such an insincere behavior by a user may further, hamper the social image of the other user involved in the service. Further, the other user may lose connections in the system that may furthermore let him/her lose interest in the system. Therefore, to discontinue such events and to further prevent the loss of interest of the users in the system, the system may implement an advantageous feature, at the step 1606 and 1608 that allows the users to either accept or object the received public ratings.

When the first and the second users are involved in a service, the first user may rate the second user after sharing of the service. In such a scenario, the first user may be referred to as 'rater' (hereinafter interchangeably used as 'first user'). The second user may receive the ratings provided by the first user and may be referred to as a 'rating receiver' or 'receiver' (hereinafter interchangeably used as 'second user'). Further, the second user may accept or reject the rating provided to him/her by the first user, which may further depict the authenticity of the first user in rating him/her. Therefore, in an embodiment, the second user may accept the ratings provided to him/her by the first user when a desired service is shared between both of them, as shown by the step 1606. The second user may accept a particular rating provided to him/her by the first user when the ratings are appropriate and justified according to the second user and the work done by him/her in the second user's view. An acceptance of ratings by the second user may further show that the first user honestly provided ratings to the second user.

Further, in an embodiment, the second user may object the rating provided to him/her by the first user, as shown by the step 1608. The second user may object the ratings granted to him/her by the first user, when the second user does not find the granted ratings appropriate and totally justified according to the quality of work delivered by him/her. Therefore, he/she may get offended and object the ratings. In cases like these, the first user may be dishonest and provided an unjustified rating to the second user. Hence, at step 1608, the second user may object to such ratings. The further steps, after the second user objects the received rating, are explained in conjunction with the following FIG. 16B.

In an embodiment, the system 108 may also enable the second user to provide ratings to the first user. The second user may provide ratings to the first user based on the experience and interaction with the first user. In an embodiment, the system may enable the first user to accept the ratings provided to him/her by the second user. In a further embodiment, the first user may raise an objection against the ratings provided to him/her by the second user. (as described earlier at the step 1506 in conjunction with the FIG. 15)

At step 1610, the system may update the public ratings of the second user based on the ratings provided to the second user by the first user. The updated public ratings of the second user may be displayed on the profile of the user. Other users existing in the system may view the second user's profile and may decide whether to interact with the second user for an exchange of service. Further, at step 1612, the system may update the rater's ratings of the first user based on the acceptances of the ratings provided by him/her along. The 'rater's ratings' of the first user may be accessible by other users in the system 108 via his/her profile. Further, as described earlier at step 1510 in conjunction with the FIG. 15, in an embodiment, the system may also update the public ratings of the first user.

In an embodiment, the system provides service specific rating. Therefore, the system provides a rating for a particular service provided by the users in the system. This may help the other users in the system to look into the service specific rating and decide accordingly. In an embodiment, an overall public rating and the service specific rating are accessible from a user's profile. In a further embodiment, the system updates the service specific rating.

Further, at step 1614, the system may notify the first and the second users about the updates in their respective ratings (including public and rater's ratings) after updating the ratings on completion of the service. In an embodiment, the system may notify the users about the updates via a pop up message. In another embodiment, the system may notify the users via a message in the inbox of their profiles in the system. In yet another embodiment, the system may notify the users about the updates via an email sent to their email ids linked with their profiles in the system.

Figure 16B:
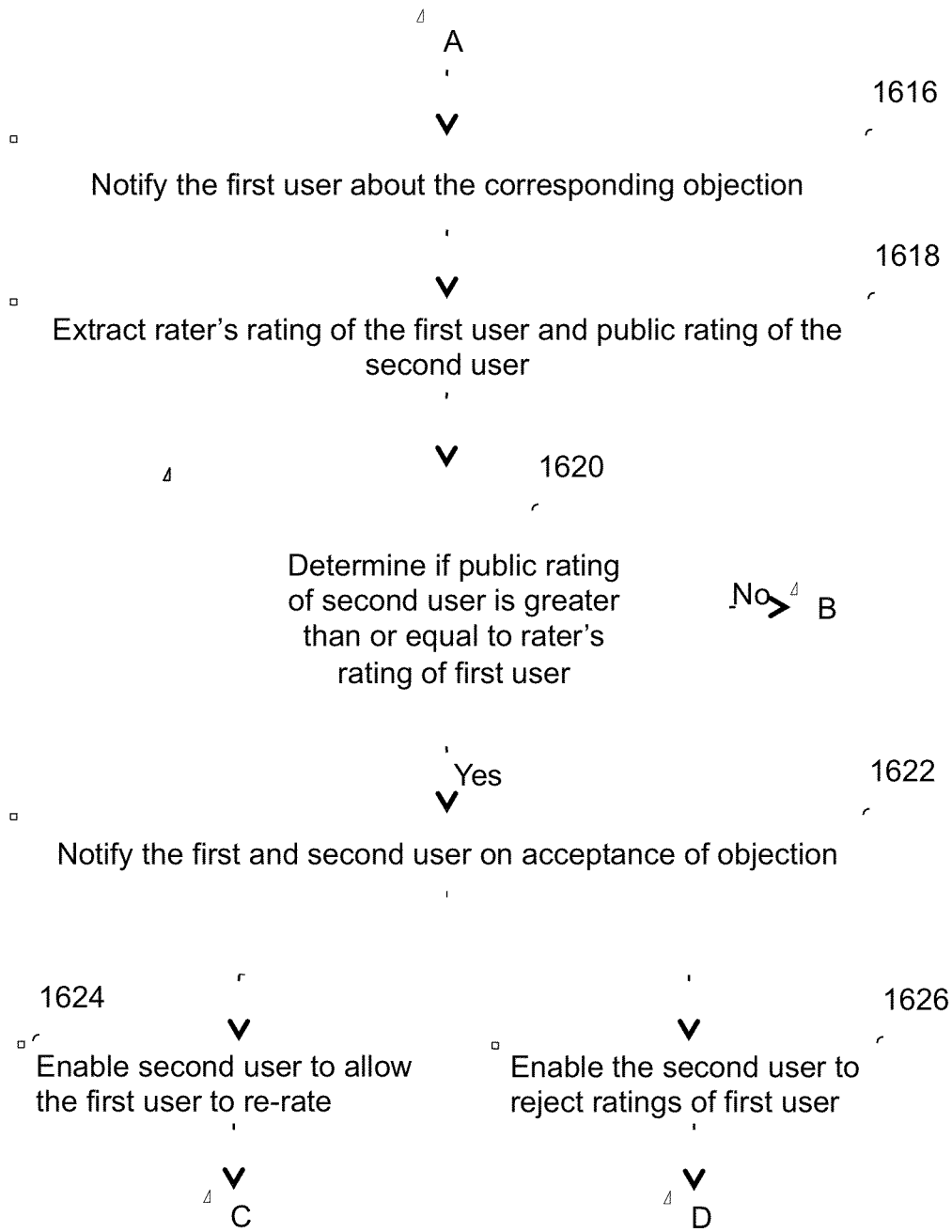
Figure 16C:
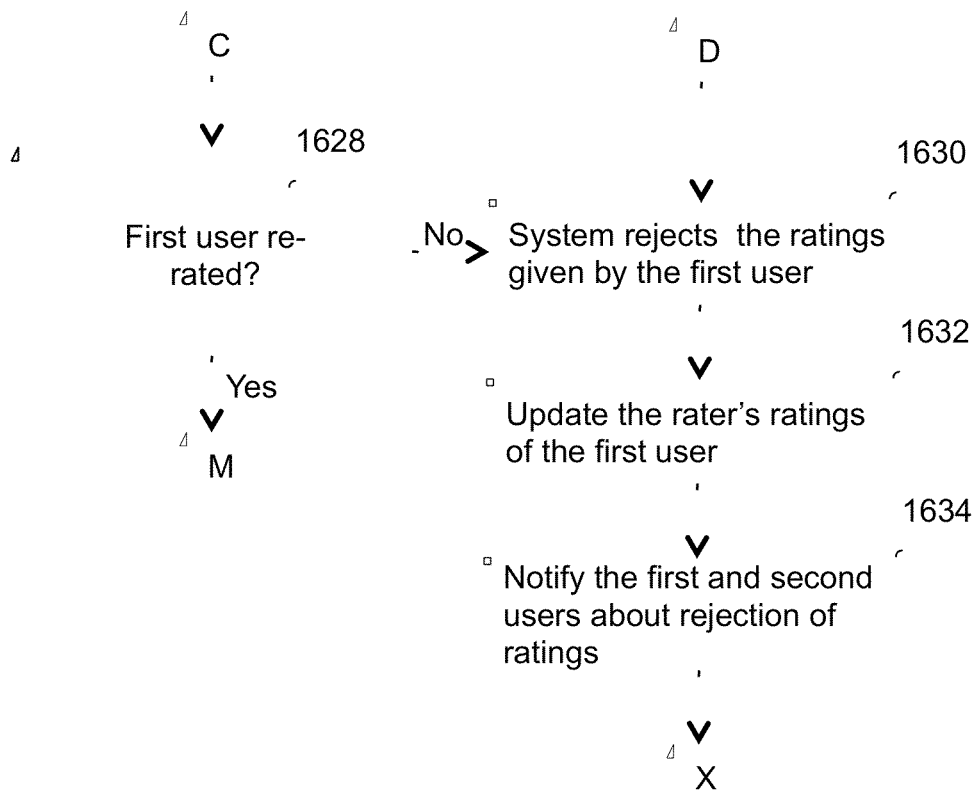

Referring to FIG. 16B, the second user may raise an objection against the ratings provided to him/her by the first user on the completion of a shared service. As soon as an objection is raised against the ratings provided by the first user, a notification may be sent by the system 108 to the first user corresponding to the objection received, at the step 1616. In an embodiment, the system may notify the first user about the objection received via a pop up message. In another embodiment, the system may notify the first user\ via a message in the inbox of his/her profile in the system. In yet another embodiment, the system may notify the first user about the received objection via an email sent to his/her email ID linked with his/her profile in the system. Similarly, a notification may be sent to the second user if an objection is raised by the first user against the ratings provided by the second user.

The number of objections received by the first user, for the ratings he/she provided, may or may not depict about the number of events of rating the second user, where the first user dishonestly rated the second user. This is because, after receiving the ratings, the second user may raise an unjustified objection against the ratings given by the first user. The first user may rate the second user appropriately according to the work done by the second user, but the second user may feel disgrace and raise an objection. Such cases may result in misleading events that may bring disrespect to the first user in front of the other users in the system 108, since 'rater's ratings' is a reflection of the authenticity of the first user in the system for others. Such misleading events may conclude with an incorrect 'rater's ratings' for the first user that may further misrepresent his/her reputation in the system. Hence, to control and avoid such events, the system 108 may introduce a reviewing feature. Therefore, the system scrutinizes the objections received by the users; checks for the credibility of the objections; and further, announces a result that either accepts the objections or rejects them (as explained earlier at step 1508 in conjunction with FIG. 15). Conclusively, events of fair decisions may be brought into action by implementing this reviewing feature by the system 108.

At step 1618, the system 108 may extract public ratings of the second user and rater's ratings of the first user from their respective profiles in the system. In an embodiment, the system may also extract the public rating of the first user and rater's ratings of the second user. Further, at the step 1620, the system may start the analysis process to calculate and declare a fair result. During the analysis, the system may compare the public ratings of the second user and the rater's ratings of the first user and the system may announce a conclusion based on the higher and lower ratings. Implementing such analysis, the system may encounter two situations. Firstly, the public rating of the second user may be greater than or equal to the rater's rating of the first user. Secondly, the public rating of the second user may be less than the rater's rating of the first user. In an embodiment, the public rating of the second user may be greater than the rater's ratings of the first user. Therefore, the system 108 may accept the objection raised by the second user. This may not affect the public ratings of the first user but may bring a negative effect on the rater's ratings of the first user. The underlying reason for this is, after comparing, the system may find out that the public ratings of the second user is higher than the rater's ratings of the first user. This may show that the second user may be a better performer in a sufficient number of events of exchanging services. While, the first user with a lower rater's ratings may be a poor rater who inappropriately rates other users in the system. Therefore, based on this analysis, the system 108 may declare a conclusion in favor of the second user and may further accept the objection raised by him/her. Consequently, the 'rater's ratings' of the first user may be affected, while the public ratings of the first user and that of the second user may remain unaffected.

At the step 1622, a notification is sent to both the first and the second users about the acceptance of the objection by the system 108. In an embodiment, the system may notify the users by a pop-up in the profiles. In another embodiment, the system may notify the users by sending a message in an inbox of their profiles. In yet another embodiment, the system may notify the users by sending an e-mail linked with their profiles in the system 108. In a further embodiment, the second user may raise an objection against the rating provided by the first user after an exchange of a service. Thereafter, the situation may be analyzed by the system 108 that further compares the public ratings of the second user and the rater's ratings of the first user. The system 108 may further find out that the public rating of the second user is equal to the rater's ratings of the first user. Therefore, the system may accept the objection rose. Conclusively, the 'rater's ratings' of the first user may degrade while his public ratings remain unaffected. (as described earlier at the step 1508 in conjunction with the FIG. 15) In a yet another embodiment, the system may find out that the public rating of the second user is less than or equal to the rater's rating of the first user. Therefore, the system may reject the objection raised by the second user against the ratings provided to him/her by the first user. The steps further to this are explained in conjunction with the FIG. 16D.

At step 1622, the system may accept the objection raised by the second user against the ratings received from the first user and notify the users about the acceptance of the objection. Further, the system may ask the second user to allow the first user to re-rate the second user, as shown by the step 1624 or allow the second user to reject the ratings received, as shown by the step 1626. The further steps to this are explained in conjunction with the FIG. 16C.

At step 1624 (as represented in the FIG. 16B), the system may enable the second user to allow the first user to re-rate. When the system accepts the objection raised by the second user, the system further enables the second user to give a chance to the first user. This chance may allow the first user to re-rate the second user. A request may be sent to the first user by the second user, asking him/her for the re-rating. As represented in the following FIG. 16C by the step 1628, the first user may be asked to re-rate the second user. In an embodiment, the first user may accept the request for re-rating. In such a scenario, the previous rating which was initially provided by the first user to the second user, at the step 1604 in the FIG. 16A may get cancelled. Therefore, at this stage, the respective ratings of the first and the second users may not be affected by the previous ratings given by the first user. When, the first user accepts the request to re-rate the second user, and the first user re-rates, as shown by the step 1628, the process moves backward to the step 1606 as represented in the FIG. 16A. Therefore, again the second user may accept the re-rating provided to him/her by the first user. Accordingly, the corresponding ratings of the users involved in the re-rating may be updated by the system 108. Hence, following the procedure for re-rating, a new rating may be granted to the second user by the first user. Consequently, the system may fairly deal in such cases, giving equal priorities and rights to every user in the system and hence, maintaining the interest of the users in the system.

Further, the system may enable the second user to not provide a chance to the first user for re-rating (at the step 1626, as represented in FIG. 16B). Therefore, no second chance is granted to the first user for re-rating. Hence, the second user may request the system 108 to reject the ratings provided by the first user. Referring to the FIG. 16C, at the step 1630, the system may finally reject the previous ratings given to the second user by the first user, on the request of the second user. The system may decide in the favor of the second user, because while the system analyzed the objection at the earlier step 1620 in the FIG. 16B, the system itself accepted the objection raised by the second user. Therefore, the ratings provided by the first user are rejected since the system accepted the objection raised by the second user at the step 1630. Accordingly, the rater's rating of the first user is updated, at the step 1632. Finally, when the system 108 rejects the received ratings, a notification is sent to the first and second users notifying them about the final rejection of the ratings provided to the second user by the first user (as shown by the step 1634).

As mentioned earlier in the FIG. 16B, in an embodiment, the second user may raise an objection against the rating provided to him/her by the first user. The system may analyze and compare the public ratings of the second user and the rater's rating of the first user. Comparing the ratings, the system may find that both the public rating of the second user is equal to the rater's rating of the first user. Therefore, the system may, further continue the analysis and look only for the rater's ratings of the first user. In the further analysis, the system may check and compare the rater's ratings of the first user by a prefixed number. This prefixed number may depict a rating in the rater's ratings. In an embodiment, the prefixed number is '3' depicting 'rater's ratings' as 'average'. In another embodiment, the prefixed number is '4' depicting 'rater's ratings' as 'good'. Therefore, if the 'rater's ratings' of the first user is greater than the prefixed number, the system 108 may reject the objection raised by the second user against the ratings provided by the first user. This furnishes a result in favor of the first user and may further conclude that the first user provided a genuine rating to the second user. Further, the 'rater's ratings' of the first user may be appreciated. In a further embodiment, the system, while comparing the rater's rating of the first user, may deduce that the rater's rating is less than the prefixed number. Consequently, the system may accept the objection raised by the second user. Furthermore, the 'rater's ratings' of the first user may drop down while the public rating of the first user remains unaffected.

In another embodiment, while analyzing and comparing the public rating of the second user and the rater's rating of the first user, the system may find out that the public rating of the second user is less than the rater's rating of the first user. The public rating of the second user being lower than the rater's rating of the first user may show that the second user may not be a better performer, while the first user may be a better rater. Conclusively, the first user may have rated the second user honestly according to the actual performance of the second user. Therefore, the system may reject the objection raised by the second user. Resultantly, the 'rater's ratings' of the first user may be appreciated while the public rating of the first user remains unaffected. Additionally, the public rating of the second user may be affected according to the received ratings. (as described earlier in the FIG. 15)

Figure 16D:
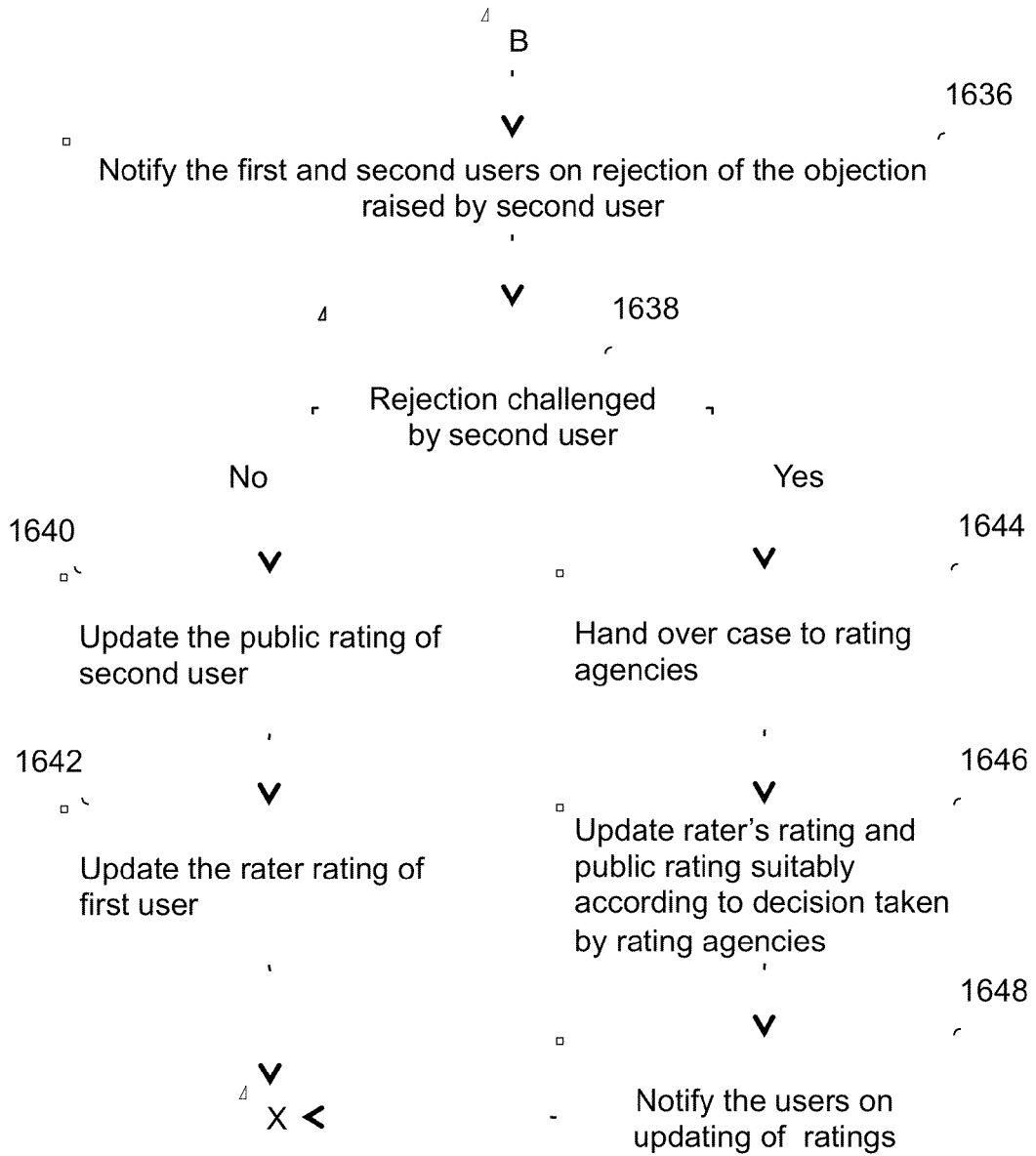

Referring to the FIG. 16D, after the system has taken its decision of rejecting the objection raised by the second user, a notification may be sent to both the first and second users notifying them about the rejection of the objection, at the step 1636. In an embodiment, the system may notify the users via a pop up message. In another embodiment, the system may notify the users via a message in the inbox of their profiles in the system. In yet another embodiment, the system may notify the users via an email sent to their email ids linked with their profiles in the system. Further, checking the notification sent to the second users informing him/her about the rejection of objection, the second user may not be satisfied by the decision taken by the system. Hence, the second user may think about challenging the rejection of the system 108, at the step 1638. Therefore, in order to get the objection further analyzed and accepted, the second user may challenge the rejection decided by the system.

In an embodiment, after getting notified about the rejection of the objection raised by the second user at the step 1636, the second user may not decide for challenging the rejection of the system 108 at the step 1638. In such cases, the rating agencies are not requested for further analysis. The system's decision of rejection may be accepted by the second user as a final decision. Therefore, at step 1640, the public rating of the second user is updated according to the received rating. The rejection of the objection now being the final decision, may affect the rater's rating of the first user positively. Hence, along with the update of the public rating of the second user, the rater's rating of the first user may be updated at the step 1642. In an embodiment, a notification may be sent to the users about the updates. In another embodiment, the system may notify the users via a pop up message. In a further embodiment, the system may notify the users via a message in the inbox of their profiles in the system. In yet another embodiment, the system notifies the users via an email sent to their email ids linked with their profiles in the system.

In another embodiment, at step 1644, if the decision of the system is challenged by the second user then the further analysis of the objection raised by the second user may be analyzed by rating agencies. The rating agencies may look into the public ratings for both the users involved, while also analyzing the rater's ratings of both the users involved in the service. The rating agencies may further examine the system's decision. After the whole examination, the rating agencies may decide accordingly. Thereafter, at the step 1646, the public rating of the second user and the rater's rating of the first user may be updated according to the decision taken by the rating agencies. The updates in the respective ratings are further reflected in the users' profiles. At the step 1648, a notification may be sent to the first and second users informing them about the decision taken by the rating agencies. In an embodiment, the system may notify the users via a pop up message. In another embodiment, the system may notify the users via a message in the inbox of their profiles in the system. In yet another embodiment, the system notifies the users via an email sent to their email ids linked with their profiles in the system.

Further, in an embodiment, when the second user provides a rating to the first user based on the experience during exchange of a service, the first user may object the received rating. The system may further analyze and compare the public rating of the first user and rater's rating of the second user. Therefore, accordingly an objection of the first user may be accepted and rejected. And, duly the 'rater's ratings' of the second user may be updated and displayed in his/her profile, which may further characterize his authenticity in rating other users in the system. Additionally, the public rating of the first user may be updated and displayed in his/her profile depicting his/her behavior and performance while sharing a service.

In conclusion, the number of acceptances of the ratings by the second user, where the first user provided rating to the second user directly shows the number of events of exchanging services between the first and the second user, where the first user provided an honest and appropriate rating. This directly increases the rater's ratings of the first user without influencing the public ratings of the first user. While, the public rating of the second user may be influenced according to the rating provided by the second user after the sharing of a service. Further, the number of acceptances of objections, raised by the second user, concluded in the analysis by the system 108 shows the number of events of exchanging services between the first and the second user, where the system may deduce that the first user provided a dishonest rating according to the actual work done by the second user. This may, further, decreases the rater's ratings of the first user without influencing the public rating of the first user. While, the public rating of the second user may, again, be influenced according to the rating provided by the first user after the sharing of a service. On the other hand, the number of rejections of objections, raised by the second user, determined in the analysis by the system 108 may reflect the number of events of sharing services between the first and second users, where the system may conclude that the first user provided an appropriate rating, without being unfaithful, according to the actual work done by the second user. This, resultantly, increases the rater's ratings of the first user without deflecting the public rating of the first user. Whereas, the public ratings of the second user may be influenced according to the ratings provided by the first user. Therefore, the cases of the acceptances of the ratings and rejections of objections positively influence the rater's ratings of the first user who provides ratings to the second user after completion of a service. While, the cases of acceptances of objections negatively influence the rater's ratings of the first user.

For example, a user ABC has a public rating as '4' referring to 'good' and rater's rating as '4' referring to 'good'. Another user XYZ has a public rating as '3' depicting 'average' and rater's rating as '2' (depicting below average). The user ABC provided a rating to the user XYZ after exchange of service "housekeeping" as '3' depicting 'average'. The user XYZ accepts the rating '3' as given by the user ABC. This positively affects the rater's rating of the user ABC and may increase his overall rater's ratings. The overall public ratings of the user XYZ is affected according to the received rating which is 'average'. Further, if the user XYZ objects to the received rating 'average', then the system comes into picture and starts the analysis. The system compares the public rating of the user XYZ and the rater's rating of the user ABC. After the comparison, it is found that the public rating of the user XYZ which is 3 is less than the rater's rating of the user ABC which is 4. Hence, the system rejects the objection raised by the user XYZ and concludes that the user ABC was true in rating the user ABC. Consequently, the overall rater's rating of the user ABC is increased after this event of exchanging service and the public rating of the user XYZ is influenced according to the received rating that is 'average' or '3'.

FIGS. 17A to 17E illustrates a method for implementing reasoning to the ratings provided to the users in a system, such as system 108, in accordance with an embodiment of the invention. While providing ratings in the system, the users may provide ratings according to the actual performance or behavior of the other users involved in a service, or may rate according to their wishes, which may not be genuine. In order to avoid such events in the system from occurring, the system may implement a logical and an efficient characteristic. The system 108 may ask the users to provide a reason behind their every rating that they provide to the other users. Consequently, a user in the system may be forced to provide a logical reason for the rating he/she is granting to other user. This may keep a further check on false or irrational ratings. Therefore, following this procedure, misleading events of ratings may be avoided to a greater extent. Additionally, a reason may help in providing a proper explanation for a rating that may, further act as a feedback for the user receiving the rating.

At step 1702, the first user may share a desired service with the second user in the system by posting a request in the system (as described earlier in conjunction with the FIG. 15, at the step 1502). In an embodiment of the invention, a notification may be sent to the first user as soon as the second user applies for the request posted by the first user. After the sharing of the service, at step 1704, the first user may rate the second user on the basis of his/her performance or behavior (as represented and described earlier in conjunction with the FIG. 15, at the step 1504). A user may provide ratings to other user in the system, after completion of a service, by selecting an option from a list of options provided by the system (as shown in the FIG. 10A). The options for ratings provided by the system may be in numerical ratings. Therefore, a user may select an option for ratings from a scale on 1-5. The highest option may correspond to rating '5' that further refers to 'excellent'. The lowest rating may correspond to '1' that further may refer to 'bad'. Similarly, the options in between correspond to medium level ratings, such as rating '4' may refer to 'good', '3' may correspond to 'average', while '2' may depict 'below average'. Hence, using the rating scale, the first user may rate the second user on the basis of the second user's performance and behavior after the completion of a shared service.

Further, the rating provided to the second user after the completion of the service may be reflected in the public ratings of the second user. The public ratings of the second user may be accessible from his/her profile in the system. Furthermore, based on the acceptances and objections received for every rating provided by the first user, the system may provide a rater's rating to the first user. The rater's rating may have a similar rating scale as that of public rating, and may be displayed similarly in the user's profile as public ratings. The system may further have definitions linked with each rating. In an embodiment, the second user may provide rating to the first user based on the first user's behavior and the overall experience during the sharing of service. Additionally, the first user may accept or object the rating provided to him by the second user (as explained earlier in conjunction with the FIG. 15).

While the first user selects an option for the ratings, the system may further ask the first user to provide details for the option he/she has selected at step 1706. Therefore, for any option the first user selects, the system may force the first user to provide some reasons, or details corresponding to the selected option. In this way, the system may successfully bring out details and reasons for the ratings provided by the users. The first user may provide details regarding the performance of the second user or may provide details about the overall experience with the second user during the exchange of a service. Further, the user may provide some extra details, such as providing some suggestions or feedback to the second user. Furthermore, the first user may simply write the reason of his/her rating. Therefore, at the step 1706, the first user provides details in regard with any rating he/she selects from the rating list.

In order to accomplish a more logical and rational networking, the system 108 may further administer a feature in the rating process. The system 108 may establish a pre-set value from the list of rating options. In an embodiment, the pre-set value appointed by the system may be '3' depicting 'average'. In another embodiment, the pre-set value may be '4' referring to 'good'. As the first user provides a rating to the second user, selecting from the numerical rating furnished by the system, the system starts analyzing the rating. At step 1708, the system may check the rating provided by the first user and may, further compare the rating with the pre-set value. Therefore, if the rating received from the first user is below the pre-set value, the first user is prompted to provide a rational reason for the ratings he/she is granting. Thereafter, a series of steps takes place, which are further described in conjunction with the FIG. 17D. On the other hand, if the rating is not below the pre-set value, the system may check that whether the rating provided by the first user is equal to or above the pre-set value, at step 1710. Therefore, at the step 1710, if the system finds out that the rating from the first user is above the pre-set value, then the second user may accept the received ratings. Further, the steps following this condition are described in conjunction with the FIG. 17E. On the contrary, if the system, at the step 1710, determines that the rating received from the first user is equal to the pre-set value, the second user may be allowed to accept or object the rating provided to him. Further, the following steps are described in conjunction with the FIG. 17B.

Referring to FIG. 17B, when the first user provides a rating to the second user which is equal to the pre-set value, the system may allow the second user to either accept or object the received ratings. Therefore, the second user is prompted by the system to either accept or object the rating given by the first user, at step 1712. In an embodiment, the system may prompt the users via a pop-up message. In another embodiment, the system may prompt the users via a dialog box. In a further embodiment, the system may prompt the user by sending a message in the inbox of the users' profiles. Thereafter, at step 1714, the second user may decide about accepting or objecting the rating received from the first user. The second user may be satisfied by the received ratings, and therefore may accept the rating. This shows that the first user was honest in rating the second user. This may cumulatively increase the rater's rating of the first user. Hence, at the step 1716, the rater's rating of the first user is updated. Along with this, the public rating of the second user is affected according to the ratings given by the first user. Following this, at step 1718, a notification is sent to the first and second users, informing them about the updates in their corresponding influenced ratings (as described earlier in conjunction with the FIG. 15, from the step 1508 to the step 1512).

At step 1714, the second user may not accept the ratings provided to him/her by the first user. This may be because, the second user may not be totally convinced by the received ratings. But, there also may be a case, when the second user irrationally objects to the rating provided by the first user. Therefore, to prevent such irrationality in the system by the users, the system 108 may additionally implement a feature at the step 1720. At the step 1720, the system may ask the second user for providing details corresponding to the objection he/she has raised. Therefore, the second user is prompted to provide details. In an embodiment, the system may prompt the users via a pop-up message. In another embodiment, the system may prompt the users via a dialog box. In a further embodiment, the system may prompt the user by sending a message in the inbox of the users' profiles. The second user may provide some detailed description in regard to his/her objection. Further, the second user may provide some reasons/supports in favor of the raised objection. Furthermore, as soon as the second user raises an objection, the first user may be prompted to re-rate the second user at step 1722, and provide a new rating to the second user. The first user may or may not decide to re-rate the second user. Therefore, after taking a decision at the step 1724, the first user may re-rate the second user and provide a new rating to the second user. Once, the first user provides a new rating to the second user, the second user may accept or object the new rating provided given by the first user. Therefore, the process moves back to the step 1712. Further, the flow of steps is again according to the flow chart described in the FIG. 17B (as described earlier in the FIG. 16B in conjunction with the FIG. 16C).

In contrast, the system may prompt the first user for re-rating the second user. After deciding at the step 1724, the first user may not provide a re-rating to the second user. Since, the first user may reject to re-rate the second user and grant the second user with a new rating, therefore, the rating which was initially provided to the second user, at the step 1704 (as represented in the FIG. 17A), may now be considered. Since, it may become apparent in the FIG. 17B at the step 1724 that the first user has decided not to re-rate the second user, the system furthermore, may reject the objection raised by the second user. Conclusively, the ratings provided by the first user at the earlier step 1704 may be accepted by the system. Hence, referring to FIG. 17C, at step 1726, a notification is sent to the first and second user by the system 108 corresponding to final rejection of the objection provided by the second user. Accordingly, at step 1728, the rater's rating of the first user and the public rating of the second user are updated by the system. The respective updates may be reflected in the public ratings of the second user in his/her profile and in the respective rater's ratings of the first user. Following the updates, notifications may be sent to the first and the second users by the system about the updates in the ratings, at step 1730 (as described earlier in conjunction with the FIGS. 16B and 16C).

As represented in the FIG. 17A, by the step 1704, the system may enable the first user to rate the second user on the basis of the second user's performance, after the completion of a shared service. Additionally, at the step 1706, the system may ask the first user to provide details in regard of his/her provided ratings. The system may furnish a pre-set value and further compare the rating provided by the first user with the pre-set value. Therefore, if at the step 1708, the system finds out that the rating provided by the first user is below the pre-set value, then the further steps are referred from the FIG. 17D.

As represented in the FIG. 17D, since the first user provided the second user with a rating that is below the pre-set value, therefore, at step 1732, the system may provide a list of reasons for the first user to choose a suitable reason for providing low ratings. Hence, in case, when the first user provides a low rating to the second user, the first user may be compelled by the system 108 to provide an appropriate reason in support of the rating provided by him/her. Adopting this rating process, the system may appreciably bring out rationality from the rating process and avoid misleading events of ratings. Conclusively, a user when providing a low rating to the other user in the system, the user may be asked to provide a reason in support of his/her rating. Further, the system may provide a list of reasons to the user, from which the user has to select a suitable reason. Following the step 1732, when the first user may select a suitable reason from the list of reasons provided, at step 1734, the system may enable the first user to submit the rating he/she provided to second user, along with the supporting reason that is selected from the list of reasons for providing a low rating to the second user. As soon as the first user submits the low rating to the second user with the suitable reason, the first user may be notified for the received rating. When the second user is notified about the ratings given by the first user, the system may, further, display the ratings and the supporting reason for the ratings provided to the second user.

Furthermore, the second user may or may not be satisfied with the received ratings. Therefore, at the step 1736, the system may prompt the second user to accept or object the rating provided to him/her by the first user. The second user may take a decision for accepting or objecting the received ratings at step 1738. In conclusion, the second user may be contented by the received ratings and hence, may accept the rating provided to him or her by the first user. Therefore, the second user's decision favored the first user's rating. Consequently, the second user's decision depicted that the first user honestly rated the second user according to the actual work done by the second user. Further, the rater's ratings of the first user may be influenced positively. Also, the public ratings of the second user may be affected according to the rating provided by the first user. Duly, the system may update the rater's ratings of the first user and the public ratings of the second user at step 1740. Thereafter, the system may send notifications to the first and second user communicating them about the respective updates in their ratings, at step 1742. (As described earlier in conjunction with the FIG. 15 from the steps 1506 to 1512)

On the other hand, as the second user is notified about the low ratings provided by the first user, the second user may not be satisfied with the rating and along with supporting the reason. Resultantly, the second user may take a decision against the ratings provided at the step 1738 and object the ratings provided to him/her. Therefore, the second user's decision may predict that the first user may not be appropriate in rating the second user. Subsequently, the case may be handed over to the rating agencies at step 1744. The ratings agencies may analyze the whole situation along with the respective ratings of the both the first and second users and take the decision accordingly. Thereafter, the first and the second users may be notified about the decision made by the rating agencies at step 1746. (As described earlier in conjunction with the FIG. 16D).

As represented earlier in the FIG. 17A, at the step 1704, the first user may provide a rating to the second after exchange of a service. The system may establish a pre-set value, for analyzing the rating. Therefore, at the step 1710, the system may find out that the rating provided by the first user is above the pre-set value. Subsequently, the steps illustrated in FIG. 17E are followed further. After analyzing the ratings, the system may notify the second user of the rating provided to him/her by the first user. Further, the system may display the rating along with the details provided in support of the ratings by the first, at the earlier steps 1704 and 1706 (in the FIG. 17A), to the second user. Receiving an appreciable rating, the second user may accept the rating. Thereafter, the system may send notifications to the first and second user informing both the users about the acceptance of the rating by the second user at step 1748. Since, the first user provided an appreciable rating to the second user that depicts the second user as a good performer. Hence, the system may ask the first user to provide a recommendation in favor of the second user at step 1750.

The recommendation may illustrate the experience of the first user during the sharing of a service with the second user along with the appreciation of second user's performance. The recommendation may characterize the second user as a better performer in the system, and hence may be useful in welcoming new service requests for the second user. Further, the social image of the second user may be acknowledged. In an embodiment, the recommendation is accessible from a user's profile in the system. In a further embodiment, while recommending the second user, the first user may write a testimonial in favor of the second user. Further, at step 1752, it may be determined whether the first user has written recommendation for the second user. If the first user writes the recommendation then the method proceeds to step 1754 otherwise the method may proceed to step 1756. Therefore, when the first user writes a recommendation for the second user, the second user may be notified accordingly by the system at step 1754.

In an embodiment, the system may notify the users for the recommendation by a pop-up in the profiles. In another embodiment, the system may notify the users by sending a message in an inbox of their profiles. In yet another embodiment, the system may notify the users by sending an e-mail linked with their profiles in the system. Subsequently, the rater's rating of the first user is acknowledged and updated by the system at step 1756. Simultaneously, the 'public ratings' of the second user is influenced according to the received rating from the first user and the system updates the public ratings of the second user at step 1756. Accordingly, the first and the second users are notified as the system updates the respective ratings of both the users. On the other hand, after provided a rating to the second user above the pre-set value, the first user may not decide to provide a recommendation for the second user. Consequently, the system may update the rater's ratings of the first user and the public rating of the second user at step 1756 and notify both the users about their respective updates at step 1758.

Illustrating an example for the above method described, a user A requests a service in the system for 'housekeeping'. Another user B applies to the service, to which the user A approves. After the completion of the service, the user A is provided with a list of rating options by the system from which the user A has to select an appropriate rating to rate the user B according to the work done by the user B during 'housekeeping'. The pre-set value selected by the system is '3'. In a case, the user A selects a rating for the user B depicting 'average' referring to rating '3'. Further, the user A provides details in regard to his provided rating to the user B. On receiving the rating, the user B accepts the 'average' rating. Therefore, the user A appropriately rated the user B. The rater's rating of the user A and the public rating of the user B are updated accordingly. In another case, the user B may not accept the 'average' rating and hence, objects the ratings provided to him by the user A. Further, the user B while objecting the rating provides details for his objection explaining "the rating was incorrect because of a miscommunication". Furthermore, the user B asks the user A to re-rate him. In case the user A does not re-rate, the previous rating which was 'average' is considered. As 'average' rating was already objected by the user B, therefore, a final rejection occurs. Both the users may be notified of the final rejection and the system may update their respective ratings accordingly.

In yet another case, the user A provides a low rating that is 'below average' referring to rating '2' to the user B. Since, the system has selected the pre-set value as '3', the system finds out that the provided rating is below the pre-set value. Hence, the user A is asked to provide details along with a suitable reason in support of his low rating '2'. The user A selects a reason from a list of reasons provided by the system to him. The user A may select a reason explaining 'the user left the work incomplete, or dint show up to the work'. As the user A submits the rating 'below average' along with the reason, the user B receives the rating. The user B accepts the rating, which shows the user A honestly rated the user B. Consequently, the rater's rating of the user A is appreciated. The system, further, updates the respective ratings of the users A and B. On the other hand, the user B objects the rating 'below average' provided by the user A. While objecting, the user B needs to provide a reason for his objection. Subsequently, the case is handed over to the rating agencies. The rating agencies analyses the whole situation and takes a decision accordingly.

In still another case, the user A provides a rating to the user B after completion of the service 'housekeeping' that is 'good' depicting rating '4'. The system compares the rating '4' with the pre-set value '3', and finds out that the provided rating is higher than the pre-set value. Therefore, the system asks for a recommendation from the user A for user B since the ratings provided by the user A to the user B showed that the user B is a good performer. The user A recommends the user B illustrating the experience and the performance of the user B. The user B accepts the received rating. Both the users are notified for the recommendation and the updates in their respective ratings. In contrast to the above case, the user A may not provide a recommendation to the user B and may just submit the rating. The user B accepts the rating and both the users A and B and notified of their corresponding updates in their ratings.

FIGS. 18A and 18B illustrate a flow diagram of a method for enabling a user of the system to re-rate the ratings provided to another user of the system, in accordance with an embodiment of the invention. In an embodiment of the invention, the first user may post a request for a service in the system 108. The second user may apply for the post for the first user to approve. Thereafter, the first and the second user may exchange the requested service. At step 1802, the first user may rate the second user based on the experience during the sharing of the service and the quality of the work done by the second user. In an embodiment, the first user may rate the second user as 'excellent'. In another embodiment, the system may ask the first user to recommend the second user when the first user rates the second user as 'excellent'. In a further embodiment, the first user may rate the second user as 'average'. In yet another embodiment, the first user may rate the second user as 'below average'. Following the rating by the first user, at step 1804, the second user is notified by the system 108 about the rating provided by the first user. In an embodiment, the system may notify the second user via a pop-up message.

In another embodiment, the system may notify the second user by sending a message in inbox of the user's profile. In a yet another embodiment, the system may notify the second user by sending an email. Receiving the rating, the second user may or may not be satisfied by the ratings given by the first user. Therefore, at step 1806, the system enables the second user to either accept or object the rating provided to him/her. Effectively, the second user may take a decision at step 1808 about accepting or objecting the received rating. Succeeding to the step 1808, the second user may object the rating provided to him/her and the second user may be provided with a list of reasons by the system at step 1810. Therefore, the second user may select a suitable reason, at the step 1810, from the list of reasons. According to the objection, the first user may be notified about the objection by the second user at step 1812. Further, the second user may allow the first user to re-rate the second user, since the previous rating provided by the first user, at the step 1802, was already objected by the second user. The following steps are described further in the next FIG. 18B.

Besides objecting the rating provided to the second user by the first user, the second user may decide not to object the rating at step 1814. Therefore, the second user may accept the rating. The acceptance of the objection may further depict that the first user genuinely rated the second user. Hence, the rater's rating of the first user is positively affected and the public rating of the second user is affected according to the received ratings. The system may further update the respective changes in the ratings of the first and the second user at step 1814. Conclusively, at step 1816, the first and second users are notified by the system 108 about the corresponding updated.

Referring to FIG. 18B, as the second user raises an objection against the rating provided by the first user, a request may be directly send to the first user enabling him/her to re-rate the second user. Therefore, at step 1818, the system may enable the first user to re-rate. Consequently, the first user may decide, at step 1820, to re-rate the second user. In case, the first user re-rates the second user and gives him a new rating, the second user may be notified about the re-rating and is provided with the new rating given by the first user. Hence, the process moves back to the step 1804 in the earlier FIG. 18A and the further steps mentioned in the flow chart are followed.

On the contrary, the first user may decide not to re-rate the second user at the step 1820. In this case, since the first user has decided not to re-rate the second user, therefore, the rating provided earlier at the step 1802 may now be considered. Apparent from the earlier step 1820 that the first user has already decided not to re-rate, a final rejection may be provided by the system at step 1822. In consequence, the ratings provided earlier at the step 1802, may now be finally accepted and the rater's rating of the first user may be updated accordingly at step 1824 and the first user may be further notified about the corresponding update in his/her rater's ratings at step 1826. The process depicted from the flowcharts in the FIGS. 18A and 18B may be continued again and again as the second user keeps on raising an objection against the rating provided by the first user and the first user may keep on re-rating the second user. While, if at the step 1822, the process is continued in a loop, till the first user decides not to re-rate the second user that further, shows the rating was appropriate according to the first user. Hence, the system by analyzing the situation may finally reject the objection raised by the second user. The rejection of the objection may affect negatively on the public rating of the second user and may positively affect on the rater's rating of the second user. The system may then notify the users corresponding to the update in the ratings.

Further, the method is not restricted to above information as mentioned herein. Moreover, the invention is not limited to above-mentioned embodiments and examples and many other embodiments and examples may be implemented in light of the invention without departing from the scope of the invention. Also, the usage of terminology such as 'first user', 'second user' may not be considered as restrictive aspect of the present invention as such terminologies are used just for the purpose of better explanation.

Advantageously, the present invention provides a method and system to support sharing/exchanging/purchasing/selling any activity/service/product with one or more users. Further, the present invention allows each user to share/exchange resources/information with users having some credibility value. Furthermore, the present invention facilitates the user to determine the credibility value of other users by analyzing rater's rating of the user before sharing/exchanging any activity/service/product therewith. Again further, the present invention enables the system to determine genuineness in any rating provided by a user to another user. Moreover, the present invention may enable the rating receivers to object to any rating received from another user of the system. The system may analyze the objection raised by the users and may either accept or reject the objection. Additionally, the present invention may enable the users to further object on the decision made by the system corresponding to the acceptance or rejection of the objection raised by the users by inviting rating agencies to solve the conflicts. Thus, this enables each user of the system to determine the credibility of other users of the system with more accuracy and precision to enrich the experience of social activities.

It may be appreciated by a person skilled in the art that the invention is not limited to the advantages as mentioned here above. Further many other advantages may be understood in light of the description given above without departing from the scope of the invention. For example, in an embodiment, the user may be facilitated to receive notifications when one or more activities/services are accepted by any user of the system. Due to this, the user who posts any activity/service need not check time and again for determining whether any response is received from any suitable user.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions that execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, mini-computers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for enhancing reliability of ratings provided to users in a social network, the system comprising:
   (a) a processor;
   (b) a memory coupled to the processor, the memory comprising:
      (1) a database comprising:
         (i) profile information corresponding to each user, the profile information comprising information corresponding to one or more types of ratings received by each user, the ratings being received based on at least one of sharing, exchanging, and selling one of activity, service or product;
      (2) instructions executable by the processor to enable a first user to provide rating to a second user based on at least one of sharing, exchanging, and selling one of activity, service or product;
      (3) instructions executable by the processor to enable the second user to raise an objection on the rating provided by the first user;
      (4) instructions executable by the processor to accept or reject the objection raised by the second user, the objection being accepted or rejected by analyzing the information corresponding to at least one of the one or more types of ratings corresponding to the first user and the second user; and
      (5) instructions executable by the processor to update the at least one of the one or more types of ratings corresponding to the first user and the second user, the at least one of the types of ratings being updated based on acceptance or rejection of the objection raised by the second user.

2. The system of claim 1, wherein the memory further comprising instructions executable by the processor to provide a notification to the first user and the second user for one of acceptance or rejection of the objection raised by the second user.

3. The system of claim 1, wherein the memory further comprising instructions executable by the processor to provide a notification to the first user and the second user, the notification corresponds to updating the at least one of the types of ratings of the first user and the second user.

4. The system of claim 1, wherein the at least one of the one or more types of ratings comprises public rating of the second user and rater rating of the first user, the public rating of the second user corresponds to overall rating received by the second user, the rater rating of the first user comprises a rating corresponding to genuineness of the first user in providing rating to one or more other users in the social network.

5. The system of claim 1, wherein the memory further comprising instructions executable by the processor to enable the second user to perform one or more tasks to manage the rating provided by the first user, the user being enabled to perform the one or more tasks based on acceptance or rejection of the objection raised by the second user.

6. The system of claim 5, wherein the one or more tasks comprise one of;
   (a) allowing the first user to re-rate the second user; and
   (b) rejecting the rating provided by the first user,
wherein the second user is enabled to perform the one or more tasks when the objection raised by the second user is accepted.

7. The system of claim 1, wherein the memory further comprising instructions executable by the processor to enable the second user to accept the rating provided by the first user.

8. The system of claim 7, wherein the memory further comprising instructions, executable by the processor, to update the at least one of the one or more types of ratings corresponding to the first user and the second user based on accepting the rating provided by the first user.

9. The system of claim 1, wherein the second user is enabled to challenge the rejection of the objection to involve one or more rating agencies to manage the rating provided by the first user.

10. The system of claim 9, wherein the at least one of the one or more types of ratings corresponding to the first user and the second user is updated based on managing the rating, provided by the first user to the second user, by the rating agencies.

11. A system for enhancing reliability of ratings provided to users in a social network, the system comprising:
  (a) a processor;
  (b) a memory coupled to the processor, the memory comprising:
    (1) a database comprising:
      (i) profile information corresponding to each user, the profile information comprising information corresponding to one or more types of ratings received by each user, the ratings being received based on at least one of sharing, exchanging, and selling one of activity, service or product;
    (2) instructions executable by the processor to enable a first user to provide rating to a second user based on at least one of sharing, exchanging, and selling one of activity, service or product;
    (3) instructions executable by the processor to analyse the rating, provided by the first user, with respect to a pre-set value of rating, the rating being analysed to determine whether the rating is above, below or equal to the pre-set value of rating;
    (4) instructions executable by the processor to perform one or more tasks to enable at least one of the first user and the second user to perform one or more acts corresponding to the rating, the at least one of the first user and the second user being enabled to perform the one or more acts based on analysis of the rating; and
    (5) instructions executable by the processor to update the at least one of the one or more types of ratings corresponding to the first user and the second user, the at least one of the types of ratings being updated based on the one or more acts performed by at least one of the first user and the second user.

12. The system of claim 11, wherein the one or more tasks comprise performing at least one of:
  Providing a list of options to the first user for enabling the first user to select at least one option therefrom to provide at least one reason for providing low rating to the second user, the list of options being provided to the first user when the rating, provided by the first user to the second user, is below the pre-set value of the rating;
  Notify the second user for acceptance of the rating provided by the first user, the notification of acceptance of the rating being provided when the rating is above the pre-set value of rating; and
  Prompt the first user to recommend the second user when the rating, provided by the first user to the second user, is above the pre-set value of rating.

13. The system of claim 12, wherein the memory further comprising instructions, executable by the processor, to provide notification to the second user for the recommendation provided by the first user.

14. The system of claim 12, wherein the memory further comprising instructions, executable by the processor, to update the at least one or more types of ratings corresponding to the first user and the second user when the rating provided by the first user is accepted by the second user.

15. The system of claim 11, wherein the memory further comprising instructions, executable by the processor, to enable the second user to raise an objection on the rating provided by the first user, the second user being enabled to raise the objection when the rating provided by the first user is below the pre-set value of rating.

16. The system of claim 15, wherein the memory further comprising instructions executable by the processor to:
  enable the first user to accept the objection to re-rate the second user based on the objection raised by the second user;
  enable the first user to reject the objection raised by the second user; and
  update the at least one of the one or more types of ratings corresponding to the first user and the second user based on at least one of the acceptance and the rejection of the objection raised by the second user.

17. The system of claim 15, wherein the memory further comprising instructions, executable by the processor, to involve one or more rating agencies to manage the rating provided by the first user, the rating agencies being involved to manage the rating when the second user raises the objection on the rating provided by the first user.

18. The system of claim 17, wherein the at least one of the one or more types of ratings corresponding to the first user and the second user is updated based on managing the rating, provided by the first user to the second user, by the rating agencies.

19. The system of claim 11, wherein the at least one of the one or more types of ratings comprises public rating of the second user and rater rating of the first user, the public rating of the second user corresponds to overall rating received by the second user, the rater rating of the first user comprises a rating corresponding to genuineness of the first user in providing rating to one or more other users in the social network.

20. The system of claim 11, wherein the memory further comprising instructions executable by the processor to provide a notification to the first user and the second user, the notification corresponds to updating the at least one of the types of ratings of the first user and the second user.

* * * * *